(12) United States Patent
Ikeyama et al.

(10) Patent No.: US 11,679,578 B2
(45) Date of Patent: Jun. 20, 2023

(54) NANOFIBER SHEET, METHOD FOR USING SAME, AND METHOD FOR PRODUCING SAME

(71) Applicant: Kao Corporation, Tokyo (JP)

(72) Inventors: Suguru Ikeyama, Haga-gun (JP); Hideo Kobayashi, Moka (JP); Takehiko Tojo, Utsunomiya (JP); Koji Saito, Utsunomiya (JP); Yuting Yang, Utsunomiya (JP); Shunetsu Yonaiyama, Utsunomiya (JP); Ikuo Fukuda, Chikusei (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 17/296,881

(22) PCT Filed: Nov. 25, 2019

(86) PCT No.: PCT/JP2019/046040
§ 371 (c)(1),
(2) Date: May 25, 2021

(87) PCT Pub. No.: WO2020/111014
PCT Pub. Date: Jun. 4, 2020

(65) Prior Publication Data
US 2022/0024172 A1    Jan. 27, 2022

(30) Foreign Application Priority Data

Nov. 26, 2018  (JP) .............................. JP2018-220763
Nov. 26, 2018  (JP) .............................. JP2018-220764
(Continued)

(51) Int. Cl.
*B32B 3/26* (2006.01)
*B32B 5/02* (2006.01)
(Continued)

(52) U.S. Cl.
CPC ................ *B32B 3/263* (2013.01); *B32B 5/02* (2013.01); *D01D 5/04* (2013.01); *D04H 1/4374* (2013.01);
(Continued)

(58) Field of Classification Search
CPC ....... B32B 3/263; B32B 5/02; B32B 2262/02; B32B 2307/732; B32B 3/28; B32B 3/30;
(Continued)

(56) References Cited

U.S. PATENT DOCUMENTS

2012/0244291 A1  9/2012  Bisht et al.
2014/0352031 A1  12/2014  Chol et al.
(Continued)

FOREIGN PATENT DOCUMENTS

CN    106702506 A    5/2017
CN    106420371 B    8/2020
(Continued)

OTHER PUBLICATIONS

International Search Report dated Jan. 14, 2020 in PCT/JP2019/046040 filed on Nov. 25, 2019, 3 pages.
(Continued)

*Primary Examiner* — Catherine A. Simone
(74) *Attorney, Agent, or Firm* — Oblon, McClelland, Maier & Neustadt, L.L.P.

(57) ABSTRACT

A nanofiber sheet includes: a substrate layer; and a nanofiber layer located on one surface side of the substrate layer and containing nanofibers of a polymer compound. A peripheral edge of the nanofiber layer has a thickness of from 0.1 to 10 μm. The nanofiber layer includes a gradation region having a thickness that gradually increases inward from the peripheral edge. The distance W1 between the peripheral edge of the nanofiber layer and a maximum thickness portion where the thickness becomes the greatest in the gradation region is
(Continued)

at least 3 mm. A nanofiber sheet manufacturing method involves depositing nanofibers onto a collecting unit by moving at least either a nozzle or the collecting unit, to thereby manufacture a predetermined nanofiber sheet including a gradation region.

17 Claims, 15 Drawing Sheets

(30) Foreign Application Priority Data

Oct. 21, 2019 (JP) .............................. JP2019-192102
Oct. 21, 2019 (JP) .............................. JP2019-192103

(51) Int. Cl.
*D01D 5/04* (2006.01)
*D04H 1/4374* (2012.01)
*D04H 1/728* (2012.01)

(52) U.S. Cl.
CPC .......... *D04H 1/728* (2013.01); *B32B 2262/02* (2013.01); *B32B 2307/732* (2013.01)

(58) Field of Classification Search
CPC .. B32B 5/26; B32B 5/028; B32B 7/04; B32B 7/05; B32B 7/06; Y10T 428/28; Y10T 428/24479; Y10T 428/24488; Y10T 428/24777; A45D 44/22; A45D 2200/1018; D04H 1/728; D04H 1/42; D04H 1/4374; C09J 7/21; C09J 7/403; C09J 7/405; D01D 5/04
USPC .............................. 428/40.1, 41.8, 156, 192
See application file for complete search history.

(56) References Cited

U.S. PATENT DOCUMENTS

| | | |
|---|---|---|
| 2015/0272855 A1 | 10/2015 | Kim |
| 2015/0328631 A1 | 11/2015 | Chou et al. |
| 2018/0214321 A1 | 8/2018 | Ashraf et al. |
| 2019/0352819 A1 | 11/2019 | Lima |

FOREIGN PATENT DOCUMENTS

| | | | |
|---|---|---|---|
| EP | 3 206 757 | 8/2017 | |
| JP | 2008-198061 A | 8/2008 | |
| JP | 2008-280651 A | 11/2008 | |
| JP | 2009-108422 A | 5/2009 | |
| JP | 2010-106396 A | 5/2010 | |
| JP | 2011-84841 A | 4/2011 | |
| JP | 2011-84842 A | 4/2011 | |
| JP | 2013-28552 A | 2/2013 | |
| JP | 2013-227688 A | 11/2013 | |
| JP | 2014-152160 A | 8/2014 | |
| JP | 2014-534040 A | 12/2014 | |
| JP | 2016-5871 A | 1/2016 | |
| JP | 2016-52721 A | 4/2016 | |
| JP | 2017-171614 A | 9/2017 | |
| JP | 6265416 B2 | 1/2018 | |
| JP | 2018-100469 A | 6/2018 | |
| JP | 2020-74847 A | 5/2020 | |
| JP | 2021-54733 A | 4/2021 | |
| JP | 2021-54734 A | 4/2021 | |
| TW | 201542634 A | 11/2015 | |
| WO | WO 2006/049664 A1 | 5/2006 | |
| WO | WO 2011/050161 A1 | 4/2011 | |
| WO | WO 2014/191962 A2 | 12/2014 | |
| WO | WO 2014/191962 A3 | 12/2014 | |
| WO | WO-2015051042 A2 * | 4/2015 | ............. A61K 35/12 |
| WO | WO 2016/035472 A1 | 3/2016 | |
| WO | WO 2016/050227 A1 | 4/2016 | |

OTHER PUBLICATIONS

Extended European Search Report dated Jul. 12, 2022 in European Patent Application No. 19889050.1, 9 pages.

* cited by examiner

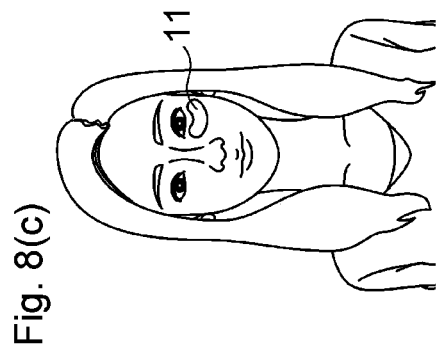
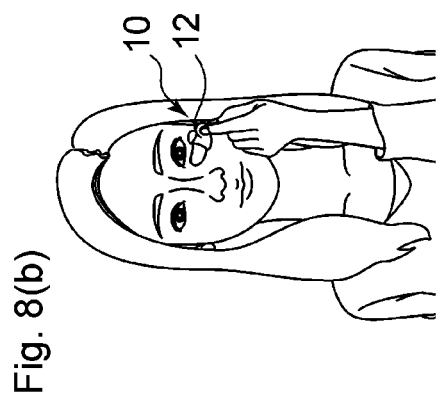
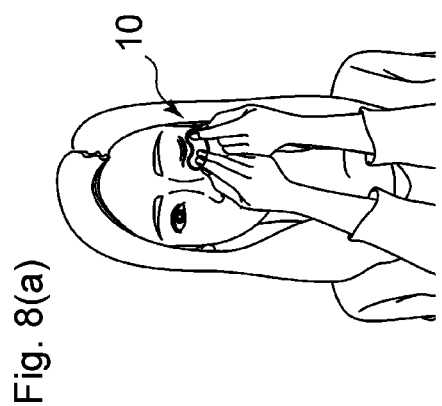

Fig. 9
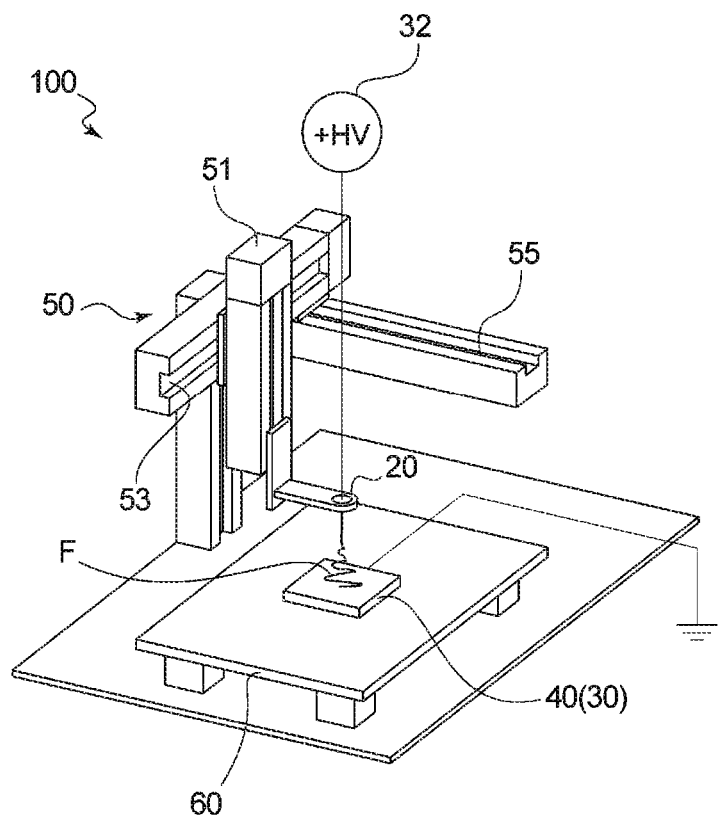
Fig. 10(a)
Fig. 10(b)
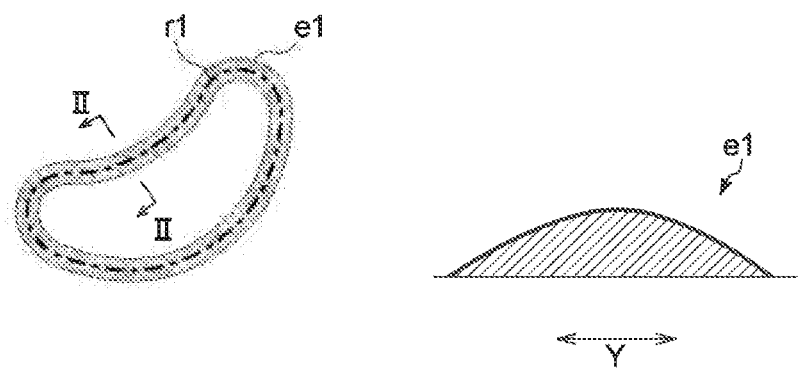

NANOFIBER SHEET, METHOD FOR USING SAME, AND METHOD FOR PRODUCING SAME

TECHNICAL FIELD

The present invention relates to nanofiber sheets, methods for using the same, and methods for manufacturing the same.

BACKGROUND ART

Fiber sheets made by depositing nanosize-diameter fibers (also referred to as "fibers" hereinafter) by electrospinning are known for use as cosmetic sheets that are attached to the skin to conceal spots and wrinkles. For example, Patent Literature 1 discloses a cosmetic sheet including a hydrophilized substrate sheet, a nanofiber sheet, and a cover sheet. Patent Literature 2 discloses a cosmetic sheet made from a nanofiber nonwoven fabric impregnated with a cosmetic serum containing a component serving as an adhesive.

As a method for manufacturing the aforementioned nanofiber sheet, Patent Literature 3 discloses a nanofiber sheet manufacturing method wherein nanofibers are deposited by ejecting a polymer solution from an ejection opening applied with a high voltage, while moving a jetting device in a zigzag manner. Patent Literature 4 discloses a manufacturing method wherein a nanofiber nozzle is located at a position that allows nanofibers, which have fallen outside the end portions of a collection sheet, to be electrically adsorbed onto a portion on the back-surface side of the collection sheet. Patent Literature 4 describes that the disclosed manufacturing method can yield a sheet in which nanofibers are deposited so as to go around to the back-surface side of the collection sheet. Patent Literature 5 discloses a manufacturing method including an end-surface processing means that removes the width wise end portions of a nanofiber nonwoven fabric obtained by electrospinning. According to Patent Literature 5, it is possible to manufacture a nanofiber sheet having a constant thickness up to its end portions.

Patent Literature 6 discloses a method for manufacturing a polyurethane nanofiber nonwoven fabric, involving: ejecting a polyurethane resin solution while moving the tip end of a nozzle in a circular motion; and depositing the polyurethane resin solution on a collector that moves linearly while rotating. Patent Literature 7 discloses a nanofiber film manufacturing method, wherein an ejection means ejects a material liquid while reciprocating back and forth within a plane parallel to a collection surface which is arranged in opposition to the ejection means.

CITATION LIST

Patent Literature

Patent Literature 1: International Publication WO2014/125407
Patent Literature 2: JP 2013-28552A
Patent Literature 3: JP 2008-196061A
Patent Literature 4: JP 2011-84842A
Patent Literature 5: JP 2013-227688A
Patent Literature 6: JP 2009-108422A
Patent Literature 7: JP 2011-084841A

SUMMARY OF INVENTION

The present invention relates to a nanofiber sheet including: a substrate layer; and a nanofiber layer located on one surface side of the substrate layer and containing nanofibers of a polymer compound.

Preferably, a peripheral edge of the nanofiber layer has a thickness of from 0.1 to 10 µm.

Preferably, the nanofiber layer includes at least 3 mm of a gradation region having a thickness that gradually increases inward from the peripheral edge.

The present invention relates to a method for using the aforementioned nanofiber sheet.

In the aforementioned method for use, it is preferable to place the nanofiber layer in contact with a surface of an object, and use the nanofiber layer in a moistened state.

The present invention relates to a laminate sheet including: a substrate layer, and an ultrathin sheet located on one surface of the substrate layer.

Preferably, the ultrathin sheet has a thickness of from 5.1 to 500 µm.

Preferably, the ultrathin sheet has a contour shape corresponding to an application-target section to which the ultrathin sheet is to be applied.

Preferably, the ultrathin sheet includes a tapered peripheral edge region having a thickness that gradually increases inward from a peripheral edge of the ultrathin sheet.

Preferably, the substrate layer includes a region that extends outward from the peripheral edge of the ultrathin sheet.

The present invention relates to a method for manufacturing a nanofiber sheet, involving ejecting a material liquid from a nozzle while applying a high voltage between the nozzle and a counter electrode, and depositing, onto a collecting unit, nanofibers produced from the material liquid by electrospinning.

Preferably, in the manufacturing method, the nanofibers are deposited onto the collecting unit by moving at least either the nozzle or the collecting unit.

In the manufacturing method, it is preferable to manufacture a predetermined nanofiber sheet including a gradation region having a thickness that gradually increases inward from a peripheral edge.

The present invention relates to a device for manufacturing a nanofiber sheet, including: a nozzle configured to eject a material liquid (spinning liquid); a counter electrode located in opposition to the nozzle and configured to create an electric field between the nozzle and the counter electrode; a collecting unit configured to collect nanofibers produced by electrically stretching the material liquid; and a mechanism configured to move at least either the nozzle or the collecting unit.

Preferably, the manufacturing device is configured to be capable of depositing the nanofibers onto the collecting unit while moving at least either the nozzle or the collecting unit based on data of a movement path inputted to a control unit.

Preferably, in the manufacturing device, data on the movement path determined in a path calculation step is inputted or is inputtable to the control unit.

The present invention relates to an ultrathin sheet manufacturing method for manufacturing an ultrathin sheet by ejecting a material liquid from a nozzle and depositing, onto a collecting unit, fibers or particles produced from the material liquid.

Preferably, the ultrathin sheet has a thickness from 5.1 to 500 μm.

Preferably, the ultrathin sheet manufacturing method involves an intended-shape forming step of ejecting, based on information relating to an intended contour shape of the ultrathin sheet, the material liquid within a range of the contour shape of the ultrathin sheet while moving at least either the nozzle or the collecting unit.

Preferably, in the intended-shape forming step, the material liquid is ejected so as to form a tapered peripheral edge region having a width of 5 mm or less and having a thickness that gradually increases inward from a peripheral edge of the contour shape.

BRIEF DESCRIPTION OF DRAWINGS

FIG. 8 is a schematic diagram for illustrating a method for using the nanofiber sheet illustrated in FIG. 1.

FIG. 9 is a perspective view illustrating an embodiment of a nano fiber sheet manufacturing device usable in a nanofiber sheet manufacturing method of the present invention.

FIG. 10(*a*) is a plan view illustrating a deposit of nanofibers formed by a nanofiber sheet manufacturing method of the present invention, and FIG. 10(*b*) is a cross-sectional view taken along line II-II in the plan view.

FIG. 13(*a*) is a schematic diagram illustrating a state wherein condition (1) is not satisfied, FIG. 13(*b*) is a schematic diagram illustrating a state wherein conditions (1) and (2) are satisfied, and FIG. 13(*c*) is a schematic diagram illustrating a state wherein condition (1) is satisfied but condition (2) is not satisfied.

DESCRIPTION OF EMBODIMENTS

There are cases where, when a cosmetic sheet is attached to the skin, the sheet becomes visible. This makes the presence of the cosmetic sheet recognizable. Particularly, applying a cosmetic, such as a foundation, onto the cosmetic sheet after attaching the sheet to the skin makes the cosmetic sheet stand out, which makes it difficult to obtain a natural-looking finish.

The cosmetic sheets of Patent Literatures 1 and 2 are visible when attached to the skin, and are thus inadequate in terms of natural-looking finish. Patent Literatures 3 to 7 do not disclose any technique for making a nanofiber sheet less visible when attached to the skin.

The present invention therefore relates to nanofiber sheets, methods for using the same, methods for manufacturing the same, and nanofiber sheet manufacturing devices, capable of overcoming the drawbacks of the conventional art.

Figure 1:
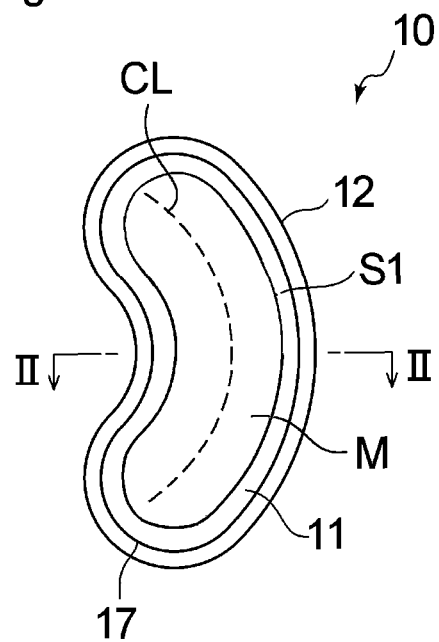
FIG. 1 is a plan view schematically illustrating an embodiment of a nanofiber sheet of the present invention.
Figure 2:
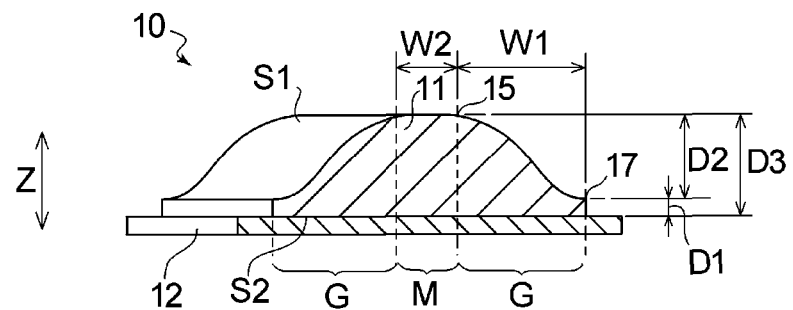
FIG. 2 is a cross-sectional view taken along line II-II of FIG. 1.
Figure 3:
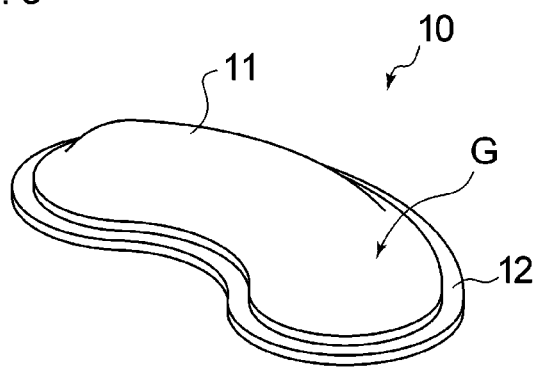
FIG. 3 is a perspective view of the nanofiber sheet illustrated in FIG. 1.

The present invention will be described below according to preferred embodiments thereof with reference to the drawings. FIGS. 1 to 3 illustrate an embodiment of a nanofiber sheet of the present invention.

As illustrated in FIG. 1, a nanofiber sheet 10 includes a substrate layer 12, and a nanofiber layer 11 containing nanofibers of a polymer compound. The substrate layer 12 is located on one surface side of the nanofiber layer 11. In the present embodiment, the nanofiber layer 11 and the substrate layer 12 are located adjacent to one another.

The nanofiber layer 11 in the nanofiber sheet 10 is a layer containing nanofibers of a polymer compound. Herein, a "nanofiber" typically has a thickness of from 10 to 3000 nm, more preferably from 10 to 1000 nm, in terms of equivalent circle diameter. The thickness of the nanofiber can be measured, for example, with a scanning electron microscope (SEM) by: observing the fibers at a magnification of 10000×; discretionarily choosing, from the two-dimensional image, 10 pieces of fibers, excluding defected fibers (clumps of nanofibers, intersecting sections of nanofibers, and polymer liquid droplets); and directly reading the fiber diameter along a line orthogonal to the length direction of each fiber.

As illustrated in FIG. 2, the nanofiber layer 11 of the present embodiment has a protuberance on the surface on the opposite side from the side of the substrate layer 12, whereas the nanofiber layer's surface facing the substrate layer 12 is flat. Hereinbelow, the nanofiber layer 11's surface on the opposite side from the side of the substrate layer 12 is referred to as "first surface S1" and the nanofiber layer's surface facing the substrate layer 12 is referred to as "second surface S2". As illustrated in FIG. 2, the nanofiber layer 11 of the present embodiment has a structure wherein the first surface S1 side bulges toward the inner side. It should be noted that the nanofiber layer 11 is actually extremely thin, but for the sake of explanation, the nanofiber layer 11 is illustrated extremely large in FIGS. 2 and 3.

A peripheral edge 17 of the nanofiber layer 11 constitutes the contour of the nanofiber layer 11 in a planar view, in the present embodiment, it is preferable that the thickness becomes the smallest at the peripheral edge 17 within the nanofiber layer 11.

In the nanofiber layer 11, the thickness D1 of the peripheral edge 17 is from 0.1 to 10 µm. In cases where the thickness D1 of the peripheral edge 17 varies depending on the position within the nanofiber layer 11, it is preferable that the minimum value and the maximum value of the thickness of the peripheral edge 17 are within the aforementioned range.

The thickness D1 (see FIG. 2) of the peripheral edge 17 is preferably 0.3 µm or greater, more preferably 0.5 µm or greater, and 10 µm or less, preferably 9 µm or less, more preferably 8 µm or less, and preferably from 0.3 to 9 µm, more preferably from 0.5 to 8 µm. The thickness D1 of the peripheral edge 17 can be measured according to the following "Method for Measuring Three-dimensional Shape of Nanofiber Layer".

Method for Measuring Three-Dimensional Shape of Nanofiber Layer:

The thickness D1 of the peripheral edge 17 of the nanofiber layer 11 is found by measuring the three-dimensional surface shape of the first surface of the nanofiber layer with a laser three-dimensional shape measurement system (e.g., a combination of Measurement System EMS2002AD-3D from COMS Co., Ltd. and Displacement Sensor LK-2000 from Keyence Corporation). First, the nanofiber sheet is set by placing the substrate layer on the auto-stage. Next, the laser displacement meter is scanned while moving the auto-stage in the X-axis direction, to measure the surface height of the first surface of the nanofiber layer at a predetermined measurement pitch $X_P$. Then, the auto-stage is shifted by a measurement pitch $Y_P$ in the Y-axis direction orthogonal to the X-axis, and thereafter, the laser displacement meter is scanned while moving the auto-stage in the X-axis direction, to measure the surface height of the first surface of the nanofiber layer at a predetermined measurement pitch $X_P$. This operation is repeated, to thereby obtain surface shape data of the first surface of the nanofiber layer. The measurement pitch in the X-axis direction is set to 0.235 mm, the measurement pitch $Y_P$ in the Y-axis direction is set to 0.350 mm, and the resolution in the height (Z-axis) direction is set to 0.1 µm. The measurement range is set to a range that includes the entire nanofiber layer in a planar view—i.e., in the X-axis direction and Y-axis direction. The measurement pitches may be changed as appropriate depending on the measurement target. The aforementioned measurement is performed under no-load. The thickness of the peripheral edge of the nanofiber layer is measured based on the measured three-dimensional shape data. A method for measuring the thickness of the peripheral edge will be described in further detail below. Unless specifically stated otherwise, "thickness" in the following description refers to a value measured based on the three-dimensional shape data.

Method for Measuring Thickness of Peripheral Edge:

First, a planar contour outline indicating the contour shape of the nanofiber layer in a planar view is determined. The planar contour outline may be obtained based on the three-dimensional shape data, or may be obtained by observing the nanofiber layer under magnification using a microscope or the like. Typically, in a nanofiber layer containing nanofibers, fibers will be sticking out from the surface, and sections with smaller or greater amounts of fibers will be formed locally. Thus, noise may be included in a graph—more specifically, the planar contour outline, later-described sectional contour outline, or 80%-thickness isoline—obtained by position-by-position plotting of measurement values, such as thicknesses, based on the three-dimensional shape data. From the viewpoint of removing such noise, the planar contour outline, sectional contour outline, or 80%-thickness isoline is subjected to a curve fitting process by polynomial approximation. In cases where the aforementioned process yields a plurality of approximate curves, the approximate curve closest to the three-dimensional shape data is selected. Next, a planar contour curve, which is obtained by approximation (curve fitting) of the planar contour outline, is associated with the three-dimensional shape data, to thereby determine the peripheral edge of the nanofiber layer in the three-dimensional shape data and measure the thickness of the peripheral edge.

More simply, the thickness D1 of the peripheral edge 17 of the nanofiber layer 11 may be measured using a contact-type film-thickness meter (e.g., Litematic VL-50A, with a 5-mm-radius spherical carbide contact point, from Mitutoyo Corporation). The load to be applied to the measurement target during measurement is set to 0.01 Pa.

The nanofiber layer 11 includes a gradation region G having a thickness that gradually increases inward from the peripheral edge 17. The gradation region G is a region, including the peripheral edge 17 of the nanofiber layer 11, that protrudes from the peripheral edge 17 toward the inner side. In a cross section taken along an orthogonal line that is orthogonal to a central line CL of the contour of a later-described inner region M when viewing the nanofiber layer 11's first surface S1 in a plan view, the gradation region G is a region that is inclined (sloped) toward the inner region M (see FIG. 2). Stated differently, the gradation region is a region where the surface of the nanofiber layer 11 is inclined (sloped) in the aforementioned cross section. The "cross section taken along an orthogonal line" is, for example, the cross section taken along line II-II in FIG. 1. Such a cross section can be found based on the aforementioned three-dimensional shape data. A method for determining the gradation region will be described in detail below.

Figure 23:
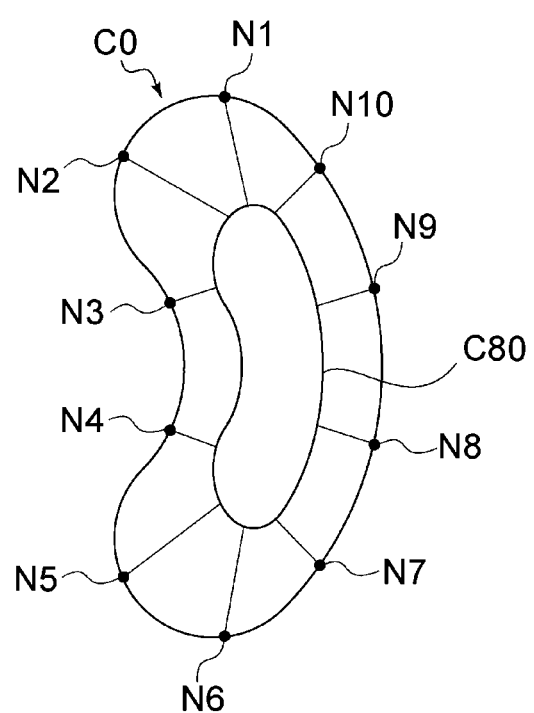
FIG. 23 is a plan view illustrating an example of a method for determining a gradation region.

Method for Determining Gradation Region:

First, the position having the largest thickness in the aforementioned three-dimensional shape data is determined as the apex position, and the thickness of the nanofiber layer at the apex position is obtained. Next, an isoline indicating a contour of a region where the thickness is 80% the thickness of the apex position (also referred to hereinafter as "80%-thickness isoline") is determined based on the three-dimensional shape data, and the positions on the isoline are reflected onto the three-dimensional shape data, together with the aforementioned planar contour curve. For example, as illustrated in FIG. 23, the planar contour curve CO and the 80%-thickness isoline C80 are reflected onto the three-dimensional shape data. Note that the 80%-thickness isoline used here has been subjected to the aforementioned curve fitting process. Next, an arbitrary position on the planar contour curve is defined as the first point, and then ten points—i.e., first to tenth points—which divide the perimeter of the planar contour curve into ten equal parts are set cm the planar contour curve. The reference signs N1 to N10 indicated in FIG. 23 are examples of the first to tenth points. Then, a sectional contour outline of the nanofiber layer in the three-dimensional shape data is obtained at each of the first to tenth points. A "sectional contour outline" is a contour outline of a cross-sectional surface found when the nanofiber layer in the three-dimensional shape data is cut along a line segment that connects each of the first to tenth points, on the planar contour curve in a planar view, to the 80%-thickness isoline with the shortest distance. The respective sectional contour outlines at each of the first to tenth points are subjected to the aforementioned curve fitting process, to obtain respective sectional contour curves. Next, for each obtained sectional contour curve, the position of the corresponding one of the first to tenth points is reflected onto the sectional contour curve, to determine the position of the nanofiber layer's peripheral edge on the sectional contour curve. Then, in each obtained sectional contour curve, an inclined region is determined, the inclined region having a width of at least 3 mm and having a thickness that gradually increases inward from the peripheral edge toward the inner side of the nanofiber layer. Here, the "width" refers to a length, in the sectional contour curve, from the peripheral edge to the apex position, or a length from the peripheral edge to the later-described maximum thickness portion. Examples of patterns according to which the thickness gradually increases along the sectional contour curve may include, patterns in which the thickness increases linearly; patterns in which the thickness increases along a curve, such as a sigmoid curve or an exponential curve; and patterns in which the thickness increases in multiple stages. Then, the number of points, among the first to tenth points, at which the corresponding sectional contour curve includes the aforementioned inclined region is counted. When the counted number of points at which the sectional contour curve includes the aforementioned inclined region is defined as "n", the percentage (%) of the number of inclined-region-including sectional contour curves with respect to the total of ten points (first to tenth points) can be calculated from the expression (n/10)×100(%). Stated differently, it is possible to assess the percentage occupied by the gradation region within the entire length of the peripheral edge of the nanofiber layer. For example, if there are five points, among the first to tenth points, at which the sectional contour curve includes the aforementioned inclined region, then it can be assessed that the nanofiber layer being measured includes the gradation region in 50% of the entire length of the peripheral edge of the nanofiber layer.

Note that, unless specifically stated otherwise, the various dimensions of the gradation region G and the inner region M—e.g., the later-described maximum thickness portion 15's thickness, inclination angle, etc., of the gradation region G—are arithmetic mean values of measurement values found from the respective sectional contour curves at the points including the aforementioned inclined region.

The nano fiber layer 11 of the present embodiment includes the aforementioned gradation region G and an inner region M surrounded by the gradation region G. As illustrated in FIG. 2, in the nanofiber layer 11 of the present embodiment, the thickness of the gradation region G gradually increases in one direction, whereas the thickness in the inner region M is substantially constant. The thickness of the inner region M may slightly vary depending on the position. For example, it is permissible that the thickness varies within a range of around ±25% with respect to the average thickness. In the present embodiment, the thickness of the inner region M is the same as the thickness D3 of the maximum thickness portion 15 of the gradation region G (see FIG. 2). The "maximum thickness portion 15 of the gradation region G" is the portion of the gradation region G where the thickness becomes the greatest, and is the inner end of the gradation region G, and is the end on the inner region M side in the present embodiment. The inner region M is a region wherein the thickness is preferably 80% or greater, more preferably 90% or greater, with respect to the thickness at the apex position of the nanofiber layer 11. The inner region M can be determined based on the aforementioned sectional contour curves. The nanofiber layer 11 may include both the gradation region G and the inner region M as in the present embodiment, or may include only the gradation region between the peripheral edge and the apex position, without including an inner region.

From the viewpoint of manufacturability and handleability, it is preferable that the maximum length of the nanofiber layer 11 in a planar view is preferably 500 mm or less, more preferably 300 mm or less, even more preferably 150 mm or less. From the same viewpoint, it is preferable that the maximum length of the nanofiber layer 11 in a planar view is preferably 10 mm or greater. "Maximum length" refers to the maximum length spanning the nanofiber layer 11 in a planar view.

From the viewpoint of further improving adhesiveness with which the nanofiber layer 11 adheres to the surface of an object, it is preferable that, when the entire length of the peripheral edge of the nanofiber layer 11 is defined as 100%, the total length of sections where the gradation region G exists within the entire length of the peripheral edge is preferably 60% or greater, more preferably 80% or greater, even more preferably 90% or greater, even more preferably 100%. From the same viewpoint, it is preferable that the gradation region G exists over the entire length of the peripheral edge of the nanofiber layer 11.

For convenience of measurement, the percentage of the total length of sections where tire gradation region G exists with respect to the entire length of the peripheral edge of the nanofiber layer 11 can be calculated as the percentage (%) of the number of sectional contour curves including the aforementioned inclined region with respect to the total of ten points (first to tenth points), as found in the aforementioned "Method for Determining Gradation Region." For example, if there are six points at which the sectional contour curve includes the aforementioned inclined region, then the total length of sections where the gradation region G exists will be 60% with respect to the entire length of the peripheral edge of the nanofiber layer 11.

In a cross section along the thickness direction of the nanofiber sheet 10, the width W2 (see FIG. 2) of the inner region M is 200 mm or less, preferably 150 mm or less. The width W2 of the inner region M is the distance between the maximum thickness portions 15 of the gradation region G in the aforementioned cross section. In the present embodiment, the nanofiber sheet 10 has an inner region M in the nanofiber layer 11, but the nanofiber sheet 10 does not have to include an inner region M. Stated differently, the distance W2 between the maximum thickness portions 15 of the gradation region G in the aforementioned cross section may be substantially 0 mm, and the nanofiber sheet 10 may include only the gradation region having a thickness that gradually increases from the peripheral edge 17 toward the apex position. In this case, the maximum thickness portion, which is the inner end of the gradation region G, serves as the apex position.

In the nanofiber layer 11, the distance W1 between the peripheral edge 17 and the maximum thickness portion IS of the gradation region G is at least 3 mm. The distance W1 between the peripheral edge 17 and the maximum thickness portion 15 of the nanofiber layer is the separation distance from the peripheral edge 17 to a portion of the gradation region G where the thickness becomes the greatest, and is the width of the gradation region G. Stated differently, the nanofiber layer 11 includes at least 3 mm of the gradation region G. In cases where the distance W1 between the peripheral edge 17 and the maximum thickness portion 15 of the nanofiber layer 11, or the distance W1 between the peripheral edge 17 and the apex position, varies depending on the position along the peripheral edge of the nanofiber layer 11, the minimum length of the distance W1 may be at least 3 mm. As described above, the distance between the peripheral edge 17 and the apex position in the nanofiber layer 11, or the distance between the peripheral edge 17 and the maximum thickness portion 15, is also referred to as the width W1 of the gradation region G.

The nanofiber sheet 10 is used by peeling the substrate layer 12 and attaching the nanofiber layer 11 to an object, such as the skin.

In the nanofiber sheet 10, by setting the thickness of the peripheral edge of the nanofiber layer 11, including the gradation region G, within a range from 0.1 to 10 μm and setting the width W1 of the gradation region G to 3 mm or greater, the outer edge of the nanofiber layer 11 will be less conspicuous and the nanofiber layer 11 will be harder to visually recognize in a state where the nanofiber layer is attached to an object such as the skin. By attaching the nanofiber layer 11 of such a nanofiber sheet 10 to the skin, for example, spots and wrinkles on the skin can be concealed effectively, while making the presence of the nanofiber layer 11 hard to recognize. Further, even when a cosmetic, such as a foundation, is applied onto the nanofiber layer 11 attached to the skin, the outer edge (peripheral edge) of the nanofiber layer 11 will be less conspicuous, and a natural finish can be obtained, with an appearance conforming seamlessly to the skin.

In contrast, if a cosmetic sheet including a nanofiber layer with a constant thickness is attached to the skin, the outer edge of the cosmetic sheet may stand out, and the presence of the cosmetic sheet may become easily recognizable. Further, when a cosmetic, such as a foundation, is applied onto the cosmetic sheet attached to the skin, the outer edge may become more conspicuous, and also, the cosmetic sheet may take on a color (shade) different from the skin, thus making the cosmetic sheet easily recognizable. Moreover, reducing the maximum thickness of the nanofiber layer will make it difficult to achieve the effect of concealing spots and wrinkles.

From the viewpoint of achieving the effect of concealing spots and wrinkles more reliably, it is preferable that the thickness D3 of the maximum thickness portion 15 in the gradation region G is preferably 5.1 μm or greater, more preferably 10 μm or greater, and preferably 500 μm or less, more preferably 400 μm or less, even more preferably 100 μm or less, and preferably from 5.1 to 500 μm, more preferably from 10 to 400 μm, even more preferably from 10 to 100 μm.

From the same viewpoint, it is preferable that the thickness at the apex position of the nanofiber layer 11 is within the aforementioned preferable range for the thickness D3 of the maximum thickness portion 15.

Figure 4:
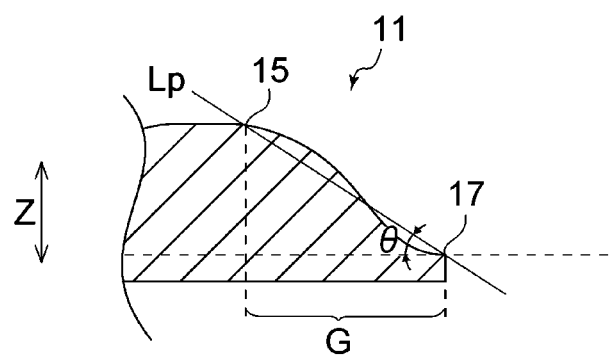
FIG. 4 is a schematic diagram for illustrating an inclination angle of a gradation region illustrated in FIG. 2.

As described above, the gradation region G is inclined in a cross section along the thickness direction Z of the nanofiber sheet 10. From the viewpoint of making the nanofiber layer 11 even less conspicuous when attached to the skin, it is preferable that the inclination angle θ (see FIG. 4) of the gradation region G is preferably 0.001° or greater, more preferably 0.002° or greater, and preferably 10° or less, more preferably 8° or less, and preferably from 0.001° to 10°, more preferably from 0.002° to 8°. The inclination angle θ of the gradation region G is an inclination angle formed between a horizontal plane and a virtual straight line Lp connecting the peripheral edge 17 of the nanofiber layer and the maximum thickness portion 15 of the gradation region G (see FIG. 4) in the aforementioned cross section taken along the orthogonal line. The inclination angle θ can be calculated from the thickness D3 of the maximum thickness portion IS of the gradation region G, the width W1 of the gradation region G, and a difference D2 in thickness between the peripheral edge 17 of the nanofiber layer 11 and the maximum thickness portion 15. The peripheral edge 17 and the maximum thickness portion 15 can be determined by the aforementioned "Method for Measuring Thickness of Peripheral Edge" and "Method for Determining Gradation Region."

From the viewpoint of improving the effect of concealing spots and wrinkles on the skin and also making the nanofiber layer even less conspicuous, it is preferable that the ratio (D3/D1) of the thickness D3 (see FIG. 2) of the maximum thickness portion 15 of the gradation region G to the thickness D1 of the peripheral edge 17 is preferably 5000 or less, more preferably 4000 or less. For example, the ratio is preferably 50 or greater, more preferably 100 or greater. Further, the ratio is preferably from 50 to 5000, more preferably from 100 to 4000.

From the same viewpoint, it is preferable that the ratio of the thickness at the apex position of the nanofiber layer 11 to the thickness D1 of the peripheral edge 17 is within the aforementioned preferable range for the ratio D3/D1.

From the same viewpoint, it is preferable that the difference D2 (see FIG. 2) in thickness between the peripheral edge 17 and the maximum thickness portion 15 of the gradation region G is preferably 5 μm or greater, more preferably 10 μm or greater, and preferably 500 μm or less, more preferably 400 μm or less, and preferably from 5 to 500 μm, more preferably from 10 to 400 μm. The maximum thickness portion 15 of the gradation region G is the inner end of the gradation region—i.e., the inner end of the aforementioned inclined region. The difference in thickness between the inner end of the gradation region G and the peripheral edge is equivalent to the difference D2 in thickness between the peripheral edge 17 and the maximum thickness portion 15 of the gradation region G.

From the viewpoint of improving attachability of the nanofiber layer to the skin, it is preferable that the planar-view shape of the nanofiber layer 11 is: a shape including, in its contour, a plurality of curvilinear sections having different curvatures; a shape including, in its contour, a plurality of rectilinear sections; or a shape including, in its contour, both the curvilinear sections and the rectilinear sections. Examples of shapes including, in the contour, a plurality of curvilinear sections having different curvatures may include a shape like an ellipse which includes a plurality of curvilinear sections with different curvatures, or a shape in which a plurality of curvilinear sections with different curvatures are formed as projections and depressions (see FIG. 1) in a planar view. Examples of shapes including, in the contour, a plurality of rectilinear sections may include polygonal shapes, such as rectangular, triangular, square or hexagonal, an arrow shape, a star shape, or the like, in a planar view. Examples of shapes including, in the contour, both curvilinear sections and rectilinear sections may include a sector shape, a tear shape, a semicircular shape, a heart shape, or the like. A nanofiber layer 11 having such a shape can easily conform to complex shapes on the face or the like, and can be attached easily.

From the viewpoint of further improving attachability, it is preferable that the contour outline of the nanofiber layer 11 in a planar view is a shape wherein more than half the length, of the entire length of the contour outline, is constituted by a curve. In this case, from the viewpoint of further improving conformability of the nanofiber layer 11 to the surface of an object, it is preferable that the contour outline of the nanofiber layer 11, in a planar view, is a shape wherein curvilinear sections occupy preferably at least 60%, more preferably at least 70%, even more preferably at least 80%, of the entire length of the contour outline, and it is further preferable that the entire length of the contour outline is constituted by curves. The contour outline of the nanofiber layer 11 in a planar view can be determined from the planar contour curve as described above in "Method for Measuring Thickness of Peripheral Edge."

The substrate layer 12 is a layer that enables the nanofiber sheet to maintain its shape retainability, and may be constituted by a single layer or a plurality of layers.

For the substrate layer 12, it is possible to use, for example, a film made of synthetic resin such as polyolefin resin or polyester resin, or a fiber sheet such as a nonwoven fabric. In cases of peelably layering the substrate layer 12 to the nanofiber layer 11, from the viewpoint of improving peelability, it is preferable to apply silicone resin, or apply a peeling treatment such as a corona discharge treatment, to the surface of the film facing the nanofiber layer 11. Further, in cases of using a synthetic resin-made film etc. as the substrate layer 12, from the viewpoint of improving peelability, it is preferable to provide a powder or particle layer formed by sprinkling powder or particles on the surface of the film.

In the nanofiber sheet 10 of the present embodiment, the nanofiber layer 11 and the substrate layer 12 are integral before use; and at the time of use, the nanofiber layer 11 and the substrate layer 12 are peeled apart to remove the substrate layer 12. From the viewpoint of improving workability for peeling the substrate layer 12 from the nanofiber layer 11, it is preferable that the substrate layer 12 has air permeability. This allows air to enter between the nanofiber layer 11 and the substrate layer 12, which can make it easy to peel the nanofiber layer 11 and the substrate layer 12.

For the substrate layer 12 having air permeability, it is preferable to use a fiber sheet or a sponge. More specifically, examples of fiber sheets may include various types of nonwoven fabrics, woven fabrics, knitted fabrics, paper, mesh sheets, and laminates thereof. Examples of usable nonwoven fabrics may include, although not limited to, meltblown nonwoven fabrics, spunbond nonwoven fabrics, air-through nonwoven fabrics, and spun-laced nonwoven fabrics. Fibers or strands constituting these nonwoven fabrics or mesh sheets may have a thickness in the order of nanofibers, or may be thicker. For the fibers, it is possible to use fibers made from fiber-formable synthetic resin, or cellulose-based natural fibers such as cotton or pulp. Examples of sponges may specifically include porous materials, e.g., foamed resin, made by foaming synthetic resin or natural resin. Examples of usable synthetic resin and natural resin may include, although not limited to, urethane, polyethylene, melamine, natural rubber, chloroprene rubber, ethylene propylene rubber, nitrile rubber, silicone rubber, and fluororubber. For the foamed resin, various materials can be used so long as an air-permeable structure can be formed.

From the viewpoint of facilitating adhesion of the nanofiber layer 11 to the skin, it is preferable that the substrate layer 12 is a nonwoven fabric.

It is preferable that the substrate layer 12, when located adjacent to the nanofiber layer 11, has, on its surface facing the nanofiber layer 11, a plurality of depressions or projections each having a width greater than the fiber diameter of the nanofiber. This structure is advantageous in improving workability at the time of peeling the substrate layer 12 from the nanofiber layer 11 in cases where the substrate layer 12 does not have air permeability.

The thickness of the substrate layer 12 is preferably 5 μm or greater, more preferably 10 μm or greater, and preferably 20 mm or less, more preferably 15 mm or less, and preferably from 5 μm to 20 mm, more preferably from 10 μm to 15 mm.

The nanofiber sheet 10 may be used in a state where the nanofiber layer 11 contains a liquid substance such as cosmetic serum. In this case, from the viewpoint of preventing the nanofiber layer 11 from being dissolved by the liquid substance such as cosmetic serum, it is preferable that the nanofiber layer 11 is water-insoluble. Herein, "water-insoluble" refers to a property wherein, in an environment of 1 atm. and 23° C., when 1 g of the nanofiber layer 11 is immersed in 10 g of ion-exchanged water, more than 0.5 g of the immersed nanofiber layer 11 remains undissolved—more preferably, more than 0.8 g remains undissolved—after 24 hours. Stated differently, "water-insoluble" refers to a property wherein, in an environment of 1 atm. and 23° C., when 1 g of the nanofiber layer 11 is immersed in 10 g of ion-exchanged water, less than 0.5 g of the immersed nanofiber layer 11 dissolves—more preferably, less than 0.2 g dissolves—after 24 hours.

The nanofiber layer 11 is formed by depositing nanofibers containing a fiber-formable polymer compound. From the viewpoint of making the nanofiber layer 11 water-insoluble, it is preferable that the nanofiber layer 11 includes nanofibers of a water-insoluble polymer compound as a fiber-formable polymer compound. With this construction, the shape retainability of the nanofiber layer 11 can be maintained, even when the nanofiber layer is impregnated with a water-soluble component used in a cosmetic. Examples of the water-insoluble polymer compound may include completely saponified polyvinyl alcohol that can be made insoluble after formation of nanofibers, partially saponified polyvinyl alcohol that can be cross-linked after formation of nanofibers when used in combination with a cross-linking agent, oxazoline-modified silicone such as poly(N-propanoylethyleneimine)-graft-dimethylsiloxane/γ-aminopropylmethylsiloxane copolymer, zein (primary component of corn protein), polylactic acid (PLA), polyester resins such as polyethylene terephthalate resins and polybutylene terephthalate resins, polyacrylonitrile resins, acrylic resins such as polymethacrylate resins, polystyrene resins, polyvinyl butyral resins, polyurethane resins, polyamide resins such as nylon, polyimide resins, and polyamide imide resins. The water-insoluble polymer compound may be used singly, or two or more types may be used in combination.

The nanofiber layer 11 may contain nanofibers of a water-soluble polymer compound. Examples of the water-soluble polymer compound may include: natural polymers, e.g., pullulan, mucopolysaccharides such as hyaluronic acid, chondroitin sulfate, poly-γ-glutamic acid, modified corn starch, β-glucan, glucooligosaccharide, heparin, and keratosulfate, cellulose, pectin, xylan, lignin, glucomannan, galacturonic acid, psyllium seed gum, tamarind seed gum, gum arabic, tragacanth gum, water-soluble soybean polysaccharides, alginic acid, carrageenan, laminaran, agar (agarose), fucoidan, methyl cellulose, hydroxypropyl cellulose, and hydroxypropyl methylcellulose; and synthetic polymers, e.g., partially saponified polyvinyl alcohol (not used in combination with a cross-linking agent), low-saponification polyvinyl alcohol, polyvinyl pyrrolidone (PVP), polyethylene oxide, water-soluble nylon, water-soluble polyester, and sodium polyacrylate. One type of the water-soluble polymer compound may be used singly, or two or more types may be used in combination.

The nanofiber layer 11 may contain polymer compounds other than the aforementioned water-insoluble polymer compound and water-soluble polymer compound. Typical examples of other polymer compounds may include polypropylene, polyethylene, polystyrene, polyvinyl alcohol, polyurethane, polyethylene oxide, polyethylene terephthalate, polybutylene terephthalate, polyethylene naphthalate, poly-m-phenylene terephthalate, poly-p-phenylene isophthalate, polyvinylidene fluoride, polyvinylidene fluoride-hexafluoropropylene copolymer, polyvinyl chloride, polyvinylidene chloride-acrylate copolymer, polyacrylonitrile, polyacrylonitrile-methacrylate copolymer, polycarbonate, polyarylate, polyester carbonate, nylon, aramid, polycaprolactone, polylactic acid, polyglycolic acid, collagen, polyhydroxybutyric acid, polyvinyl acetate, and polypeptide. The aforementioned polymer compound may be used singly, or a plurality of compounds may be used as a mixture.

In cases where the nanofiber layer 11 is rendered water-insoluble, the content of the water-insoluble polymer compound(s) contained in the nanofiber layer 11, with respect to the entire mass of the nanofiber layer 11, is preferably greater than 50 mass %, more preferably 80 mass % or greater, and the content of the water-soluble polymer compound(s) contained in the nanofiber layer 11, with respect to the entire mass of the nanofiber layer 11, is preferably less than 50 mass %, more preferably 20 mass % or less.

The nanofiber layer 11 may be constituted only by nanofibers, or may contain other components in addition to nanofibers. Examples of other components that can be used herein include components which are substances other than nanofibers and are used in cosmetics. Usable examples may include medicinal components, moisturizing components, various vitamins, perfumes, anti-UV agents, surfactants, coloring pigments, body pigments, dyes, stabilizers, antiseptics, and antioxidants. One of the aforementioned components may be used singly, or two or more types may be used in combination.

In cases where the nanofiber layer 11 contains other components in addition to nanofibers, the content of nanofibers occupying the nanofiber layer 11 is preferably from 40 to 95 mass %, more preferably from 70 to 90 mass %.

The content of other components in the nanofiber layer 11 is preferably from 5 to 60 mass %, more preferably from 10 to 30 mass %.

In cases where the nanofiber layer 11 is formed by nanofibers containing other components, such nanofibers can be prepared, for example, by completely dissolving the water-soluble polymer compound and the other components in water and mixing the same in this state. As another example, such nanofibers can be obtained by using nanofibers having hollow sections, and including an emulsion of the other components in those hollow sections. Depending on the type of reaction of the other component(s), a single type of component may be included in the nanofibers, or two or more components may be included.

From the viewpoint of effectively concealing spots and wrinkles on the skin, it is preferable that the basis weight of the inner region M of the nanofiber layer 11 is 0.01 g/m² or greater, more preferably 0.1 g/m² or greater, and preferably 50 g/m² or less, more preferably 40 g/m² or less, and preferably from 0.01 to 50 g/m², more preferably from 0.1 to 40 g/m². The basis weight of the inner region M of the nanofiber layer 11 can be measured by: cutting out a 10 mm×10 mm measurement piece from the inner region M; measuring the mass of the measurement piece with a scale; and dividing the mass by the area (100 mm²) of the measurement piece. From the same viewpoint, it is preferable that the basis weight at the apex position of the nanofiber layer 11 is within the aforementioned preferable range for the basis weight of the inner region M.

Figure 5:
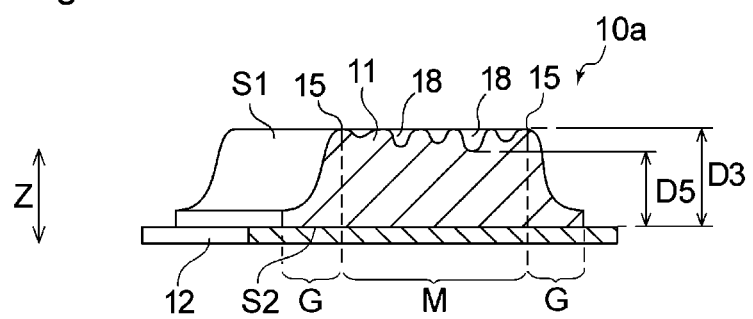
FIG. 5 is a diagram, corresponding to FIG. 2, schematically illustrating another embodiment of a nanofiber sheet of the present invention.
Figure 6:
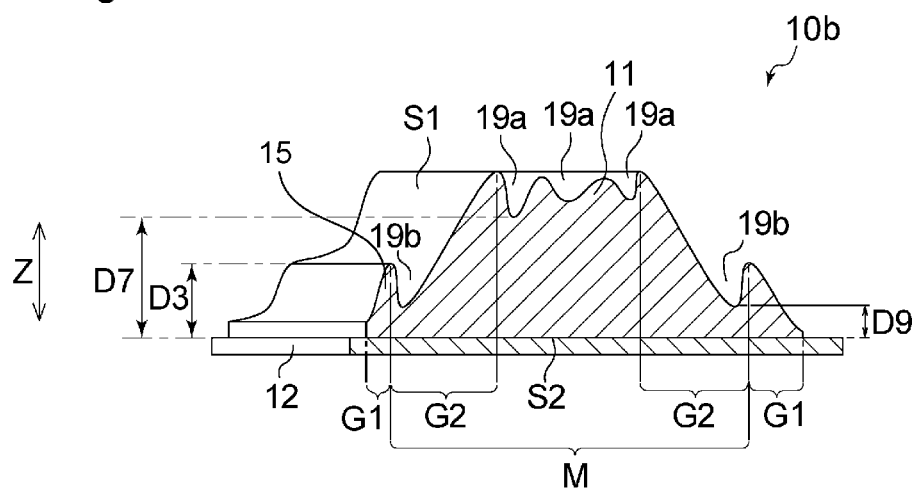
FIG. 6 is a diagram, corresponding to FIG. 2, schematically illustrating yet another embodiment of a nanofiber sheet of the present invention.

In the foregoing embodiment, the thickness of the inner region M is substantially constant over its entire region. However, the thickness of the inner region M may vary depending on the position, as illustrated in FIG. 5 and FIG. 6. In the embodiment illustrated in FIG. 5 and FIG. 6, the explanation on the nanofiber sheet of the foregoing embodiment applies as appropriate, unless there are contradictions. The nanofiber sheet 10a illustrated in FIG. 5 includes a plurality of depressions 18 respectively having different depths on the first surface S1 side of the inner region M. The thickness D5 (see FIG. 5) at the depression 18 of the inner region M is smaller than the thickness D3 at the maximum thickness portion 15 of the gradation region G. From the viewpoint of improving tight-adhesiveness of the nanofiber layer 11, it is preferable that the thickness D5 (see FIG. 5) at the depression 18 of the inner region M, with respect to the thickness D3 at the maximum thickness portion 15, is preferably 50% or greater, more preferably 60% or greater, and preferably 100% or less, more preferably 90% or less, and preferably from 50 to 100%, more preferably from 60 to 90%.

From the viewpoint of improving the nanofiber layer 11's concealability of spots and wrinkles, it is preferable that the thickness D5 (see FIG. 5) at the depression 18 of the inner region M is preferably 5.1 μm or greater, more preferably 10 μm or greater, and preferably 500 μm or less, more preferably 400 μm or less, and preferably from 5.1 to 500 μm, more preferably from 10 to 400 μm. In cases where the thickness D5 at the depression 18 of the inner region M varies for each depression 18, it is preferable that the minimum value of the thickness D5 at the depression 18 of the inner region M is within the aforementioned range.

As in the nanofiber sheet 10b illustrated in FIG. 6, the inner region M may include a depression 19b forming a section having a smaller thickness than the maximum thickness portion 15 of the gradation region G, in addition to a depression 19a forming a section having a greater thickness than the maximum thickness portion 15 of the gradation region G. Hereinbelow, in the inner region M, the depression 19a forming a section having a greater thickness than the maximum thickness portion 15 of the gradation region G is also referred to as "shallow depression 19a," and the depression 19b forming a section having a smaller thickness than the maximum thickness portion 15 of the gradation region G is also referred to as "deep depression 19b." In the inner region M, the deep depression 19b is formed along the peripheral edge of the inner region M and more toward the outside than the shallow depressions 19a. Further, in the inner region M, the thickness gradually increases inward from the bottom portion of the deep depression 19b. Stated differently, the nanofiber layer 11 in the embodiment illustrated in FIG. 6 includes: a gradation region G1 formed along the nanofiber layer's peripheral edge; and a gradation region G2 formed more inward than the gradation region G1 and along the peripheral edge of the inner region M.

From the viewpoint of improving the nanofiber layer 11's concealability of spots and wrinkles, it is preferable that the thickness D7 (see FIG. 6) at the shallow depression 19a in the inner region M is preferably 5.1 µm or greater, more preferably 10 µm or greater, and preferably 500 µm or less, more preferably 400 µm or less, and preferably from 5.1 to 500 µm, more preferably from 10 to 400 µm, on the premise that the thickness D7 is greater than the thickness D3 of the maximum thickness portion 15 of the gradation region G. In cases where the thickness D7 at each shallow depression 19a in the inner region M varies for each shallow depression, it is preferable that the minimum value of the thickness D7 is within the aforementioned range.

From the same viewpoint, it is preferable that the thickness D9 (see FIG. 6) at the deep depression 19b in the inner region M is preferably 5.1 µm or greater, more preferably 10 µm or greater, and preferably 500 µm or less, more preferably 400 µm or less, and preferably from 5.1 to 500 µm, more preferably from 10 to 400 µm, on the premise that the thickness D9 at the deep depression 19b is smaller than the thickness D3 of the maximum thickness portion 15 and the thickness D7 of the shallow depression 19a. In cases where the thickness D9 at each deep depression 19b in the inner region M varies for each deep depression, it is preferable that the minimum value of the thickness D9 is within the aforementioned range.

In cases where the nanofibers, i.e. fibers, are deposited directly on the substrate layer, the nanofiber layer 11 will be located adjacent to the substrate layer 12. However, the nanofiber layer 11 does not have to be located adjacent to the substrate layer 12, and for example, as illustrated in FIG. 7 which will be described later, an adhesive layer adherable to the surface of an object may be interposed between the substrate layer 12 and the nanofiber layer 11.

From the viewpoint of easily attaching the nanofiber sheet to the skin, it is preferable that the nanofiber sheet includes an adhesive layer 13 adherable to the surface of an object. The adhesive layer 13 is used for attaching the nanofiber layer 11 to an object such as the skin. The adhesive layer 13 may be located between the substrate layer 12 and the nanofiber layer 11—i.e., on the second surface S2 side of the nanofiber layer 11—or may be located on the nanofiber layer 11's surface opposite from the substrate layer 12—i.e., on the first surface S1 side of the nanofiber layer 11.

Figure 7:
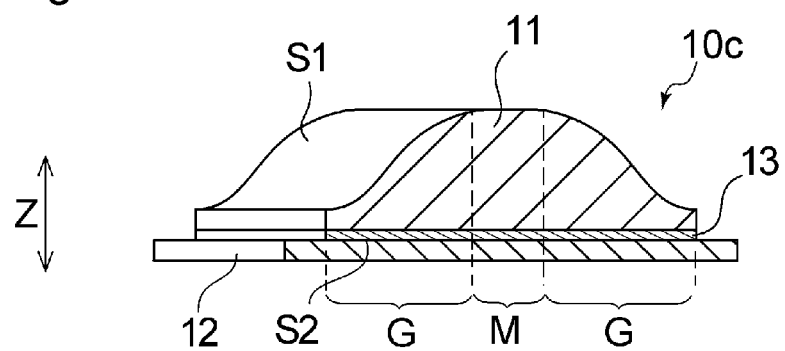
FIG. 7 is a diagram, corresponding to FIG. 2, schematically illustrating yet another embodiment of a nanofiber sheet of the present invention.

From the viewpoint of maintaining adhesive force of the adhesive layer 13, it is preferable that the adhesive layer 13 is located on the second surface S2 side of the nanofiber layer 11, as illustrated in FIG. 7. The nanofiber sheet 10c illustrated in FIG. 7 is used by peeling between the adhesive layer 13 and the substrate layer 12 and then attaching the adhesive layer 13 to the skin.

In cases where the adhesive layer 13 is located on the first surface S1 side of the nanofiber layer 11, the nanofiber sheet is used by attaching the adhesive layer 13 to the skin, with the substrate layer 12 being peeled from the nanofiber layer 11 either before or after attaching the nanofiber sheet to the skin.

Examples of adhesives that may be used for constituting the adhesive layer 13 may include adhesives such as oxazoline-modified silicone adhesives, acrylic resin adhesives, olefin resin adhesives, and synthetic rubber adhesives. From the viewpoint of maintaining strong adhesive force, it is preferable to use an acrylic resin adhesive for the adhesive constituting the adhesive layer 13.

The thickness of the adhesive in the adhesive layer 13 is not particularly limited. From the viewpoint of attaching the nanofiber layer 11 to the skin more reliably and improving the nanofiber sheet's feel upon use and texture to the touch, it is preferable that the thickness of the adhesive in the adhesive layer 13 is preferably 10 nm or greater, more preferably 50 nm or greater, and preferably 100 µm or less, more preferably 50 µm or less, and preferably from 10 nm to 100 µm, more preferably from 50 nm to 50 µm.

In the nanofiber sheet 10c, either one of the nanofiber layer 11, the substrate layer 12 or the adhesive layer 13 may be peelable, or each layer may be peelable independently. More specifically, the substrate layer 12 may be peelable from the adhesive layer 13 and the nanofiber layer 11, or the nanofiber layer 11 may be peelable from the substrate layer 12 and the adhesive layer 13, or each layer may be peelable independently. To form a peelable layer, the peeling layer (i.e., the layer to be peeled) and the non-peeling layer (i.e., the layer that is not peeled) may be layered in a state where Van der Waals force or electrostatic force is created therebetween, or the peeling layer's surface facing the non-peeling layer may be applied with silicone resin or may be subjected to a peeling treatment such as a corona discharge treatment.

Next, a method for using the nanofiber sheet of the present invention will be described according to preferred embodiments thereof with reference to the drawings. FIGS. 8(a) to 8(c) illustrate an embodiment of a method for using a nanofiber sheet, using the nanofiber sheet 10 illustrated in FIG. 1.

According to a method for using the nanofiber sheet 10, the nanofiber sheet 10 is attached, i.e. made to adhere, to the surface of an object. The nanofiber sheet 10's object is the object to which the nanofiber layer 11 is attached. The object is typically the skin of a human being, but other examples may include teeth, gums, or hair of a human being, the skin, teeth, or gums of a non-human mammal, or the surface of a plant such as the branches or leaves. FIGS. 8(a) to 8(c) illustrate a method for use wherein the nanofiber sheet 10 is attached to the face in a section below the eye, but the attachment position is not limited thereto.

At the time of using the nanofiber sheet 10, the nanofiber layer 11 is placed in contact with and attached to the surface of an object such that the nanofiber layer 11's first surface S1 or second surface S2 faces the object's surface. For example, as illustrated in FIG. 8(a), the first surface S1 of the nano fiber layer 11 of the nanofiber sheet 10 is attached to the skin. In this case, the surface on the side of the substrate layer 12 will be located on the opposite side from the skin.

In cases where the nanofiber sheet includes the aforementioned adhesive layer, the adhesive layer is attached to the object's surface such that the nanofiber layer 11's surface on the side of the adhesive layer faces the object's surface. Stated differently, in cases where the nanofiber sheet includes an adhesive layer, the nanofiber layer 11 is attached to the object's surface via the adhesive layer 13.

In the method for using the nanofiber sheet 10 illustrated in FIG. 8, after making the nanofiber layer 11 adhere to the object's surface, the substrate layer 12 is peeled and removed from the nanofiber layer 11 as illustrated in FIG. 8(b). Thus, as illustrated in FIG. 8(c), only the nanofiber layer 11 is attached to the object's surface.

It is preferable to place the nanofiber layer in contact with object's surface, and use the nanofiber layer in a slate moistened with a liquid substance. Herein, "in a moistened state" refers to a state where the nanofiber layer 11 is dampened (impregnated) with a liquid substance and thereby the nanofiber layer 11 is in a moist (damp) state.

"Liquid substance" refers to a substance that is in a liquid state at 20° C. Examples of liquid substances may include liquids such as water, aqueous solutions and aqueous dispersions, gel-state substances thickened by thickeners, oils and fats that are either liquid or solid at 20° C., oily agents containing at least 10 mass % of such oils/fats, and emulsions (O/W emulsions, W/O emulsions) containing the aforementioned oil/fat and a surfactant such as a nonionic surfactant.

In cases where the aforementioned liquid substance contains a polyol that is liquid at 20° C., examples of the polyol may include one or more types selected from ethylene glycol, propylene glycol, 1,3-butane diol, dipropylene glycol, polyethylene glycol having a weight-average molecular weight of 2000 or less, glycerin, and diglycerin.

In cases where the aforementioned liquid substance contains an oil that is liquid at 20° C., examples of the oil may include: one or more types of hydrocarbon oils selected from liquid paraffin, squalane, squalene, n-octane, n-heptane, cyclohexane, light isoparaffin and liquid isoparaffin; one or more types of ester oils selected from esters of linear or branched fatty acids and linear or branched alcohols or polyols, such as octyldodecyl myristate, myristyl myristate, isocetyl stearate, isocetyl isostearate, cetearyl isononanoate, diisobutyl adipate, di-2-ethylhexyl sebacate, isopropyl myristate, isopropyl palmitate, diisostearyl malate, neopentyl glycol dicaprate and alkyl (C12-15) benzoate, and triglycerol fatty acid esters (triglycerides) such as caprylic/capric triglyceride; and one or more types of silicone oils selected from dimethyl polysiloxane, dimethyl cyclopolysiloxane, methylphenyl polysiloxane, methylhydrogen polysiloxane and higher alcohol-modified organopolysiloxane. The aforementioned oil may be used singly, or two or more types may be used in combination.

In cases where the aforementioned liquid substance contains a fat that is solid at 20° C., examples of the fat may include one or more types selected from vaseline, cetanol, stearyl alcohol, and ceramide.

Methods for using the nanofiber layer 11 in a state moistened with the aforementioned liquid substance may include, for example: (1) a method of making the nanofiber layer 11 adhere to the object's surface in a state where the object's surface is moistened with a liquid substance; (2) a method of moistening the nanofiber layer 11 with a liquid substance in a state where the nanofiber layer 11 is adhering to the object's surface; and (3) a method of making the nanofiber layer 11 adhere to the object's surface in a state where the nanofiber layer 11 is moistened with a liquid substance. By moistening either the object's surface or the nanofiber layer's surface by applying a liquid substance before or after bringing the surface of the nanofiber layer 11 into contact with the object's surface, the liquid substance gets supported by the nanofiber layer or the liquid substance adheres to the surface of the fibers in the nanofiber layer, and thereby, the nanofiber layer 11 becomes more transparent, which can make the peripheral edge 17 even less conspicuous.

In the method (1), by bringing the nanofiber layer 11 into contact with the object's surface moistened by applying a liquid substance, the liquid substance on the object's surface can be transferred to the nanofiber layer 11 by capillary action of the nanofiber layer 11.

In the aforementioned methods (1) to (3), in order to moisten the surface of an object, or the nanofiber layer 11 attached to the object's surface, with a liquid substance, the liquid substance may simply be applied or sprayed onto the surface. The liquid substance used for application or spraying may be a substance that includes a liquid component at the temperature at which the nanofiber sheet 10 is attached and that has a viscosity (viscosity measured with an E-type viscometer) of around 5000 mPa·s or less at that temperature. Examples of such a liquid substance may include water, aqueous solutions, ester oils, hydrocarbon oils and silicone oils that are liquid at 20° C., polyols that are liquid at 20° C. such as glycerin and propylene glycol, and aqueous dispersions containing one or more of the aforementioned components. For the liquid substance, it is also possible to use, for example, emulsions such as O/W emulsions, or aqueous liquids thickened by various thickeners such as thickening polysaccharides.

As described above, in the method for using the nanofiber sheet according to the present embodiment, the nanofiber layer 11 is used by being attached to the surface of an object. This method of use aims at improving the appearance of the object or the state of the surface by attaching the nanofiber layer 11 to the object's surface. For example, in cases where the skin is the object, the appearance of the skin can be improved by attaching the nanofiber layer 11 to the skin to thereby conceal spots and wrinkles on the skin. Further, the surface state of the skin can be improved by attaching the nanofiber layer 11 to the skin to thereby improve the spreadability of foundation, i.e., the condition/state of application of foundation.

Next, methods for manufacturing the nanofiber sheet of the present invention will be described according to preferred embodiments thereof with reference to the drawings. FIG. 9 schematically illustrates an embodiment (first embodiment) of an electrospinning device used in a method for manufacturing the nanofiber sheet illustrated in FIG. 1. The electrospinning device 100 illustrated in FIG. 9 includes: a nozzle 20 configured to eject a material liquid; a counter electrode 30 configured to create an electric field between the nozzle 20 and the counter electrode; a collecting unit 40 configured to collect nanofibers (fibers F) produced from the material liquid; and a nozzle-moving mechanism 50 configured to move the nozzle 20. "Material liquid" refers to a solution or a dispersion liquid of a material resin for the nanofibers.

The electrospinning device 100 ejects a solution or a dispersion liquid of a material resin (also referred to collectively as "material liquid" hereinafter) from the nozzle 20, to thereby form small-diameter fibers F by electrospinning. The nozzle 20 is mounted to a later-described nozzle-moving mechanism 50. The nozzle 20 is a member for ejecting a material liquid that is supplied from a material liquid supplying unit (not illustrated), and is in communication with the material liquid supplying unit via a material liquid supplying path (not illustrated). The material liquid supplying unit is configured so as to be capable of supplying the material liquid to the nozzle 20 quantitatively by a known means such as a pressure-loading device. The material liquid supplying unit supplies the material liquid to the nozzle 20 either continuously or intermittently.

In the present embodiment, the nozzle 20 is made from an electroconductive material such as metal, and is electrically connected to a voltage application unit 32. More specifically, a positive or negative voltage can be applied to the nozzle 20.

The counter electrode 30 is a member made from an electroconductive material such as metal, and is located in opposition to the nozzle 20. The counter electrode 30 is grounded, and thereby, an electric field can be created between the nozzle 20 and the counter electrode 30. The counter electrode 30 may be electrically connected to a voltage application unit 32 such as a direct-current high-voltage power supply, so that voltage can be applied. In the present embodiment, the counter electrode 30 also serves as a later-described collecting unit 40.

In this electrospinning device 100, a potential difference is created between the nozzle 20 and the counter electrode 30 by applying a positive voltage to the nozzle 20, or by applying a negative voltage to the counter electrode 30, or both. It is also preferable to create a potential difference between the nozzle 20 and the counter electrode 30 by applying a negative voltage to the nozzle 20, or by applying a positive voltage to the counter electrode 30, or both. From the viewpoint of improving the electrification properties of the material liquid, it is preferable that the potential difference applied between the nozzle 20 and the counter electrode 30—i.e., the potential difference applied between the nozzle 20 and the collecting unit 40—is preferably 1 kV or greater, more preferably 10 kV or greater, and, from the viewpoint of preventing discharge, the potential difference is preferably 100 kV or less, more preferably 50 kV or less.

The collecting unit 40 is a member for collecting/accumulating fibers F produced by electrically stretching the material liquid. In the present embodiment, the collecting unit 40 is located in opposition to the nozzle 20. The collecting unit 40 also serves as the aforementioned counter electrode 30, and is grounded or electrically connected to the voltage application unit 32, so that a voltage can be applied. Stated differently, in the present embodiment, an electric field can be created between the nozzle 20 and the collecting unit 40.

The nozzle-moving mechanism 50 is configured so that it can make the nozzle 20 movable in a planar direction. In the present embodiment, the nozzle-moving mechanism 50 includes: a slider 51 configured to retain the nozzle 20; and rails 53 and 55 extending respectively along the X-axis direction and Y-axis direction. The rail 53 moves on the rail 55, and the slider 51 moves on the rail 53. The nozzle-moving mechanism 50 is electrically connected to a control unit (not illustrated). Based on data about a movement path for the nozzle as inputted to the control unit, or based on an operation signal inputted by an operator to the control unit via a controller, the nozzle-moving mechanism 50 can deposit fibers F onto the collecting unit 40 while making the nozzle 20 move. The control unit is configured such that data on a nozzle movement path determined in a later-described path calculation step is inputted or is inputtable to the control unit. Inputting of data on the movement path to the control unit may be achieved by input via a storage medium such as a USB memory, or by input via a network such as the Internet or an intranet.

In the present embodiment, the electrospinning device 100 includes a stage 60 made from a non-electroconductive material. The collecting unit 40, which is the counter electrode 30, is mounted on the stage 60. The nozzle-moving mechanism 50 is capable of moving the nozzle 20 in the planar direction within a range where the stage 60 is provided.

In a method for manufacturing a nanofiber sheet according to the present embodiment, the electrospinning device 100 configured as above is used to deposit, onto the collecting unit, fibers F produced from a material liquid by electrospinning. In a state where an electric field is created between the nozzle 20 and the counter electrode 30, a material liquid is supplied to the nozzle 20, and the material liquid is ejected from the nozzle. The ejected material liquid is repeatedly subjected to electric repulsion and evaporation of the material liquid's solvent, and is thereby spun so as to be drawn toward the counter electrode 30 while forming fibers F. The nanofibers are deposited onto the collecting unit 40, which is also the counter electrode 30, to thereby form a deposit of nanofibers (fibers F). This deposit becomes the nanofiber layer 11.

In cases where the nanofiber layer 11 is configured such that the inner region M has a large thickness and the gradation region G has a thickness that gradually increases toward one direction as described above, from the viewpoint of easily forming the gradation region G, it is preferable to deposit the fibers F while moving the nozzle 20 in the planar direction, and it is more preferable to deposit the fibers F while moving the nozzle 20 in the planar direction such that the nozzle 20 follows a predetermined circulating path. Examples may include: depositing the fibers F by moving the nozzle 20 such that the nozzle follows paths in which deposition positions of the fibers F partially overlap; or depositing the fibers F by moving the nozzle 20 while varying, at each of the deposition positions, the deposition time or deposition amount for depositing the fibers F. In this way, the deposition amount of the fibers F can be partially varied, thereby enabling the formation of a gradation region G having a deposition amount distribution wherein the deposition amount of the fibers F gradually increases in one direction. Particularly, from the viewpoint of forming the gradation region G efficiently, it is preferable to deposit the fibers F by moving the nozzle 20 while varying, at each of the deposition positions, the deposition time for depositing the fibers F. Instead of the nozzle 20, the counter electrode 30 may be moved in the planar direction.

Below, a method for manufacturing a nanofiber sheet by depositing fibers F while moving the nozzle 20 will be described in detail according to a preferred embodiment thereof.

In the nanofiber sheet manufacturing method according to the present embodiment, nanofibers (fibers F) are deposited onto the collecting unit 40 while moving the nozzle 20, as described above. For example, when the nozzle 20 moves along the planar-view shape of the nanofiber sheet 10, a first deposition region e1, which is constituted by a deposit of nanofibers that is linear along the planar-view shape, is formed as illustrated in FIG. 10(*a*). The deposition amount of nanofibers ejected from the nozzle tends to be greater at the center of the ejection hole of the nozzle 20 than on the outer edge side of the ejection hole. Thus, the deposit of nanofibers formed along the movement path of the nozzle 20 will be formed such that its outer edge section has a region whose thickness gradually increases from the outer edge toward the center (see FIG. 10(*b*)). Stated differently, with the nanofiber sheet manufacturing method of the present embodiment, it is possible to manufacture a nanofiber sheet including a gradation region.

Further, by forming a deposit of nanofibers by moving the nozzle 20, the nanofibers will be deposited along the movement path of the nozzle 20. Thus, the planar-view shape of the deposit of nanofibers will have a shape conforming to the movement trajectory of the nozzle 20. Thus, it is possible to easily form a nanofiber layer 11 having a desired planar-view shape.

In the present embodiment, fibers F are deposited onto the collecting unit 40 while moving the nozzle 20, but according to the nanofiber sheet manufacturing method of the present invention, the collecting unit 40 onto which the fibers F are deposited may be moved, or both the nozzle 20 and the collecting unit 40 may be moved. Forming a nanofiber layer while moving both the nozzle 20 and the collecting unit 40 is advantageous in terms that the shape of the nanofiber layer can easily be adjusted to an arbitrary shape. As described above, in the nanofiber sheet manufacturing method of the present invention, fibers F are deposited onto the collecting unit 40 while moving at least either the nozzle 20 or the collecting unit 40.

Examples of movement mechanisms for moving the collecting unit 40 may include: a mechanism including a stage that holds the surface of the collecting unit 40 opposite from the surface onto which nanofibers are deposited, and a plurality of motors for moving the stage in the planar direction; or a collecting unit-moving mechanism 80 provided in an electrospinning device 100A described further below.

In the nanofiber sheet manufacturing method of the present invention, a deposit of nanofibers is formed while moving at least either the nozzle 20 or the collecting unit 40. Therefore, factors, such as the speed for ejecting the material liquid from the nozzle 20 and the speed for moving at least either the nozzle 20 or the collecting unit 40, will affect the deposition thickness of the nanofibers. So, the nanofiber sheet manufacturing method of the present embodiment includes: a path calculation step for determining a movement path of the nozzle 20; and a deposition step for depositing nanofibers in accordance with the movement path. In this way, the thickness of the nanofiber layer can be controlled accurately, and the gradation region G can be formed more reliably.

In the path calculation step, the movement path of the nozzle 20 is determined based on a correlation between factors relating to the deposition distribution of nanofibers and the deposition thickness of the nanofibers. The movement path is for enabling formation of a predetermined nanofiber sheet. "Predetermined nanofiber sheet" is a nanofiber sheet including a gradation region G, and having a predetermined planar-view shape and predetermined thickness. "Predetermined thickness" is a set value determined in accordance with product specifications etc., and may be the minimum thickness or maximum thickness of the nanofiber layer 11, or may be the minimum thickness or maximum thickness of the gradation region G. From the viewpoint of enabling concealment of wrinkles and spots and also facilitating penetration of functional agents, such as cosmetic serum, into the skin, it is preferable to set the minimum thickness D5 of the inner region M as the predetermined thickness of the nanofiber sheet in cases where the nanofiber sheet includes an inner region M, and to set the thickness D3 of the maximum thickness portion 15 of the gradation region G as the predetermined thickness in cases where the nanofiber sheet does not include an inner region M. It should be noted that, although the movement path of the nozzle 20 is determined in the path calculation step in the present embodiment, it is instead possible to determine the movement path(s) of either one, or both, of the nozzle 20 and the collecting unit 40 in the path calculation step.

"Deposition distribution of nanofibers" is the distribution of the deposition amount of nanofibers deposited on the collecting unit 40. Examples of factors relating to the deposition distribution of nanofibers may include: the movement speed of the nozzle 20 or the collecting unit 40; the ejection speed of the material liquid; the potential difference between the nozzle 20 and the counter electrode 30; the distance between the nozzle 20 and the collecting unit 40; the inner diameter of the nozzle 20; and the material of the nozzle. One or more factors selected from the above may be used in combination. By adjusting the values of each of the aforementioned factors, the thickness of the nanofiber layer can be increased/decreased. Among the aforementioned factors relating to the deposition distribution of nanofibers, "the material of the nozzle" is a factor that affects the amount of charge of the nozzle 20.

The path calculation step will be described below according to an example wherein the movement speed of the nozzle 20 (also referred to hereinafter as "Factor A"), the ejection speed of the material liquid (also referred to hereinafter as "Factor B"), and the distance between the nozzle 20 and the collecting unit 40 (also referred to hereinafter as "Factor C") are employed as the factors relating to the deposition distribution of nanofibers. The movement speed of the nozzle 20 (Factor A) and the ejection speed of the material liquid (Factor B) serve to increase/decrease the deposition amount of nanofibers per unit area, which in turn increases/decreases the deposition thickness of the nanofibers. The distance between the nozzle 20 and the collecting unit 40 (Factor C) serves to increase/decrease the area of the deposit of nanofibers per unit time. As can be understood, Factors A to C are factors that cause changes in the deposition distribution of nanofibers.

The path calculation step involves finding a correlation between the Factors A to C and the thickness of the deposit of nanofibers. This correlation can be found, for example, by: setting the factors relating to the deposition distribution of nanofibers to predetermined values; producing a test deposit of nanofibers by moving the nozzle 20 along a predetermined path; and measuring the thickness distribution of the test deposit. For example, a test deposit of nanofibers is produced by setting the Factors A to C to predetermined values and then moving the nozzle 20 in one direction as illustrated in FIG. 10, to acquire data on the test deposit's thickness within a cross section taken in a direction orthogonal to the test deposit's extending direction (also referred to hereinafter as "simulation data"). The simulation data can be acquired by measurements using, for example, a laser three-dimensional shape measurement system (e.g., a combination of Measurement System EMS2002AD-3D from COMS Co., Ltd. and Displacement Sensor LK-2000 from Keyence Corporation). Based on the aforementioned simulation data and the planar-view shape of the nanofiber layer 11 to be set, the formable nanofiber thickness is simulated, and the movement path is determined. As the simulation data, it is possible to use data with setting values of the aforementioned Factors A to C being set according to the same condition, or to use a plurality of pieces of data with different setting values for the factors relating to the deposition distribution of nanofibers.

In the path calculation step, calculation is performed such that the thickness of the nanofiber sheet takes on a predetermined value by adjusting the setting values of the factors relating to the deposition distribution of nanofibers (e.g., the aforementioned Factors A to C) or by providing the movement path with sections where the nanofiber deposition positions either overlap or do not overlap. The calculated movement path will be a path along the planar-view shape of the nanofiber layer 11 set according to the product specifications etc., and this path can be set, for example, by using software such as SEL Generator (from IAI Corporation). In the movement path calculation step, movement path calculation—i.e., movement path simulation—is repeated until it is possible to obtain a movement path that is along the nanofiber layer 11's planar-view shape to be set and that satisfies conditions for giving the nanofiber thickness a predetermined value.

In the deposition step, nanofibers are deposited, while moving at least either the nozzle 20 or the collecting unit 40, in accordance with the movement path determined in the path calculation step. In the electrospinning device 100 of the present embodiment, data on the movement path as determined in the path calculation step is transmitted to the control unit, and, based on an operation signal transmitted from the control unit, the nozzle-moving mechanism 50 is operated to thereby make the nozzle 20 move along the movement path. By making at least either the nozzle 20 or the collecting unit 40 move along the movement path in this way, it is possible to form a nanofiber layer having the planar-view shape and thickness as simulated at the time of setting the movement path.

In cases where the nanofiber sheet includes an inner region M, like the nanofiber sheet 10 illustrated in FIG. 2, it is preferable to calculate the movement path in the path calculation step such that the minimum thickness of the inner region M becomes equal to or greater than a predetermined set value. The minimum thickness $D5$ of the inner region M is the thickness at a portion of the inner region M having the smallest thickness (see FIG. 2). In this case, in the path calculation step, a movement path is determined such that the minimum thickness of the inner region M takes on a desired set value and the nanofiber layer 11 takes on a desired planar-view shape.

Depending on the planar-view shape and/or area of the nanofiber layer 11 to be set, sections where nanofiber deposition positions overlap one another may be provided on the movement path of at least either the nozzle 20 or the collecting unit 40. In such cases, from the viewpoint of improving the precision of the thickness of the nanofiber layer 11, it is preferable to provide the deposition step with the following first and second steps. In the first step, either one of the nozzle 20 or the collecting unit 40 is moved along a first movement path r1 such that a deposited portion of the nanofibers forms a continuous first deposition region e1. In the second step, either one of the nozzle 20 or the collecting unit 40 is moved along a second movement path such that the deposited portion of the nanofibers forms a second continuous deposition region e2 having a portion, in the width direction, that continuously overlaps a portion, in the width direction, of the first deposition region e1 or of a previously-formed continuous deposition region (see FIG. 11(a)). Depending on the planar-view shape or area of the nanofiber layer 11, the deposition step may include one or a plurality of second steps.

The first and second steps will be described by employing the nanofiber sheet manufacturing method of the present embodiment as an example. The nano fiber sheet manufacturing method of the present embodiment includes the aforementioned first and second steps. The first step of the present embodiment forms a continuous first deposition region e1 in which nanofibers have been deposited. The first deposition region e1 is formed by moving at least either the nozzle 20 or the collecting unit 40 along a first movement path. The first deposition region, as well as the later-described second continuous deposition region, has a path direction X along the movement path, and a width direction Y orthogonal to the path direction. In the present embodiment, the first deposition region e1 forms a portion constituting the peripheral edge of the nanofiber layer 11. The first movement path r1 is located so as to surround a plurality of second movement paths r2 described below.

Figure 11A:
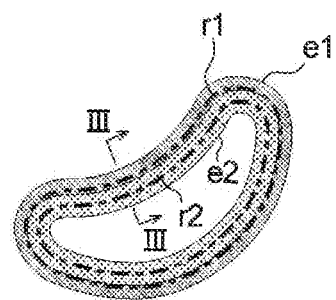
FIG. 11(*a*) is a plan view illustrating a first deposition region and a second continuous deposition region formed respectively by first and second steps in a deposition step, and FIG. 11(*b*) is a cross-sectional view taken along line III-III in the plan view.

The second step of the present embodiment forms a second continuous deposition region e2 in which nanofibers have been deposited (see FIG. 11(a)). The second continuous deposition region e2 is formed by moving at least either the nozzle 20 or the collecting unit 40 along a second movement path r2. The second continuous deposition region e2 is formed so as to continuously overlap the first deposition region e1 along the movement path, in a manner partially overlapping the first deposition region e1 in the width direction Y. In the present embodiment, the second continuous deposition region e2 is formed within a region surrounded by the first deposition region e1, and a portion of the second continuous deposition region e2 on the peripheral edge side in the width direction Y continuously overlaps an inner-side portion of the first deposition region e1 on the inner side along the path direction X (see FIGS. 11(a) and 11(b)). The present embodiment includes a plurality of second steps, and the movement path calculation step calculates inner-side paths s1 to s3 (see FIG. 12) surrounded by the first movement path r1, as second movement paths r2 to be used for the respective second steps. The inner-side paths s1 to s3 are movement paths for respectively forming second continuous deposition regions. Moving either one of the nozzle 20 or the collecting unit 40 along these inner-side paths respectively forms first to third inner deposition regions surrounded by the first deposition region. Hereinbelow, a region in which one deposition region overlaps another deposition region is also referred to as an overlap region E (see FIG. 11(b)). Examples of configurations of overlap regions E may include a region in which the first deposition region e1 overlaps the second continuous deposition region e2, and a region in which the second continuous deposition region e2 overlaps another continuous deposition region.

Figure 11B:
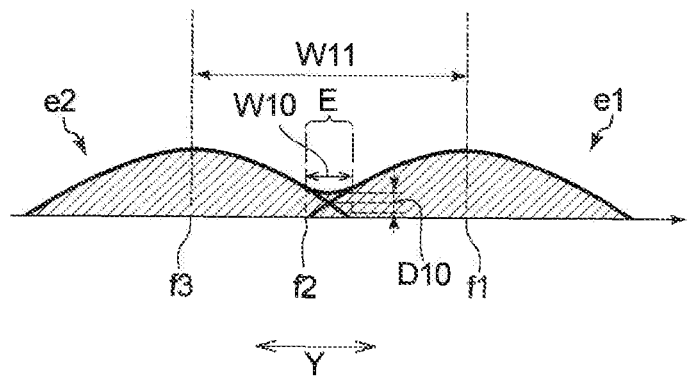

From the viewpoint of forming the gradation region G more reliably, it is preferable that, in the width direction Y, the overlap region E is located between the midpoint f1 of one deposition region and an outer edge f2 of that deposition region located on the side of another deposition region, as illustrated in FIG. 11(b). It is also preferable that the overlap region E is provided such that, in the width direction Y, the midpoint f1 of that deposition region and the midpoint f3 of the second continuous deposition region e2 are both located within the range of the overlap region E. The midpoint f1 or D of a deposition region is a position that bisects (i.e., divides into two equal parts) the length, in the width direction Y, of the respective continuous deposition region. In FIG. 11(b), the overlap region E is located between, in the width direction Y, the midpoint f1 of the first deposition region e1 and the outer edge f2 thereof located on the side of the second continuous deposition region e2. From the same viewpoint as described above, it is preferable to calculate the second movement path r2 in the movement path calculation step such that the second continuous deposition region partially overlaps the first deposition region between the first deposition region's midpoint f1 and the first deposition region's outer edge 12 located on the side of the second continuous deposition region, or such that the midpoint f1 of the deposition region and the midpoint f3 of the second continuous deposition region e2 are both located within the range of the overlap region E. Hereinbelow, calculation of the second movement path r2 according to the aforementioned method is also referred to as Calculation J1. In cases where the deposition step includes a plurality of second steps, it is preferable to determine the second movement paths r2 to be used in the respective second steps by performing Calculation J1 in the path calculation step.

As described above, the nanofiber layer 11 includes a gradation region G in its outer edge portion. As regards the overlap region E wherein the outer edge portion of the first deposition region and the outer edge portion of the second continuous deposition region overlap one another in the width direction, increasing the width W10 of the overlap region E will increase the thickness D10 of the overlap region E, and reducing the width W10 of the overlap region E will reduce the thickness D10 of the overlap region E. In other words, by adjusting the width W10 of the overlap region E, the minimum thickness D5 of the inner region M can be adjusted. In this case, it is preferable that, in the movement path calculation step, the second movement path r2 is calculated by adjusting the width W10 of the overlap region E in a manner such that the thickness D10 of the overlap region E becomes equal to or greater than a predetermined thickness based on the design of the nanofiber layer 11—e.g., such that the thickness D10 becomes equal to or greater than the design minimum thickness D5 of the inner region M. Hereinbelow, calculation of the second movement path r2 according to the aforementioned method is also referred to as Calculation J2. In cases where the deposition step includes a plurality of second steps, it is preferable to determine the second movement paths r2 to be used in the respective second steps by performing Calculation J2 in the path calculation step.

In the aforementioned Calculation J1 and Calculation J2, a separation distance between the first movement path r1 and the second movement path r2 is calculated based on a degree of overlap between nanofiber deposited portions (see FIG. 11(b)).

From the viewpoint of securing the minimum thickness D5 of the inner region M more reliably and improving the effect of concealing spots and wrinkles by attaching the nanofiber layer, it is preferable that the dimensions of the overlap region E are within the following ranges.

The thickness D10 (see FIG. 11(b)) of the overlap region in the width direction Y with respect to the minimum thickness D5 of the inner region M is preferably 100% or greater, more preferably 125% or greater, and preferably 250% or less, more preferably 200% or less, and preferably from 100 to 250%, more preferably from 125 to 200%. The thickness D10 of the overlap region E in the width direction Y is the minimum thickness in the overlap region E.

The thickness D10 (see FIG. 11(b)) of the overlap region E is preferably 0.2 μm or greater, more preferably 1 μm or greater, and preferably 100 μm or less, more preferably 10 μm or less, and preferably from 0.2 to 100 μm, more preferably from 1 to 10 μm.

The overlap region's width W10 (see FIG. 11(b)) with respect to the separation distance W11, in the width direction Y, between the midpoint of one deposition region and the midpoint of another deposition region is preferably 1% or greater, more preferably 5% or greater, and preferably 90% or less, more preferably 80% or less, and preferably from 1 to 90%, more preferably from 5 to 80%.

The overlap region's width W10 (see FIG. 11(b)) in the width direction Y is preferably 1 mm or greater, more preferably 4 mm or greater, and preferably 80 mm or less, more preferably 60 mm or less, and preferably from 1 to 80 mm, more preferably from 4 to 60 mm.

The aforementioned dimensions (width and thickness) of the overlap region E can be set by using the aforementioned simulation data obtained by the measurement using a laser three-dimensional shape measurement system (e.g., a combination of Measurement System EMS2002AD-3D from COMS Co., Ltd. and Displacement Sensor LK-2000 from Keyence Corporation). For example, in cases where it is assumed that two deposition regions are to overlap one another with a predetermined width W10 in the width direction, the overlap region's thickness D10 can be calculated based on deposition distribution data measured by scanning, in the width direction Y, each of the two deposition regions before being overlapped. Spreadsheet software may be used for this calculation.

In the present embodiment, the inner-side paths s1 to s3 are calculated in the movement path calculation step such that each inner-side path s1 to s3 can be formed within a range surrounded by a movement path adjacent thereto on the outside. Stated differently, in the present embodiment, a first inner-side path s1 is calculated within a range surrounded by the first movement path r1, a second inner-side path s2 is calculated within a range surrounded by the first inner-side path s1, and a third inner-side path s3 is calculated within a range surrounded by the second inner-side path s2 (see FIG. 12). The movement path calculation step of the present embodiment calculates the inner-side paths s1 to s3 according to the aforementioned Calculations J1 and J2, and also Calculation J3 described below.

As regards the inner-side paths, the more inward each inner-side path is located from the first deposition region e1, the more difficult it becomes to form a circulating path having a similar shape to the planar-view shape of the nanofiber layer 11. To address this, in the present embodiment, the third inner-side path s3 is formed as a linear path extending in one direction. It is preferable that, in the movement path calculation step, circulating paths, or non-circulating paths, are calculated depending on the area and/or shape of the range in which the movement paths are to be set. Hereinbelow, calculation of the second movement path r2—i.e., calculation of the inner-side path—according to the aforementioned method is also referred to as Calculation J3.

In the present embodiment, the Calculation J3 is performed as follows.

First, a region surrounded by a previously-determined movement path is determined. This previously-determined movement path is also referred to as a "determined path h", and a region surrounded by the determined path h is also referred to as a "determined-path inner region H". In Calculation J3, assessment is made regarding whether or not it is possible to render, inside the determined-path inner region H, a circulating movement path having a substantially similar shape to the planar-view shape of the nanofiber layer 11 (also referred to as "similar path k" hereinafter). The similar path k corresponds to the determined path h forming the determined-path inner region H; thus, in cases where a path line forming the similar path k can fit within the determined-path inner region H, it is judged that the similar path k can be rendered. Stated differently, it is assessed whether or not a similar path k can be arranged in a manner such that mutually corresponding sections in the determined path h and the similar path k are adjoined adjacent to one another.

Figure 13A:
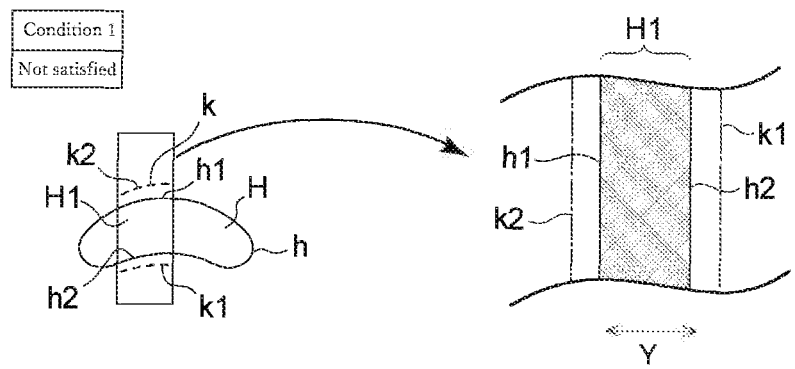
FIG. 13 is a diagram for illustrating conditions (1) and (2) in Calculation J3.
Figure 13B:
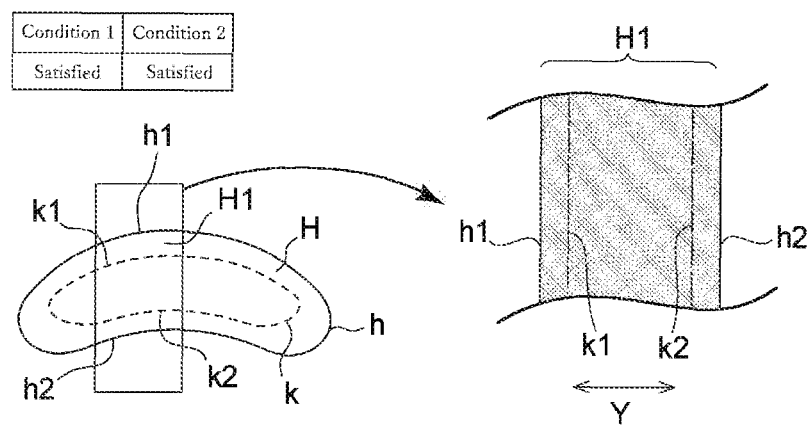
Figure 13C:
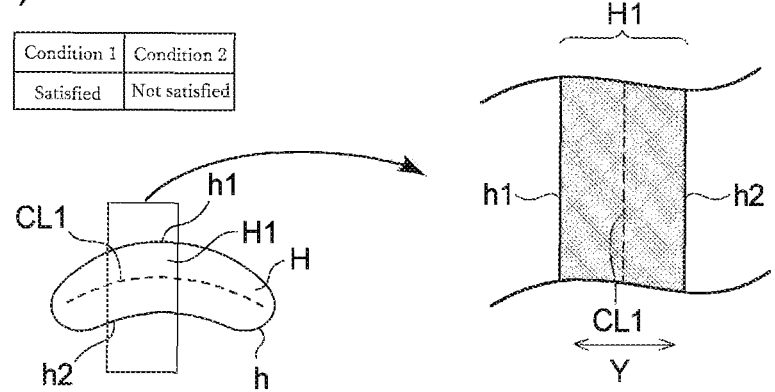

Particularly, in Calculation J3, when focusing on a section H1 in the determined-path inner region H, which is a section where portions h1 and h2 of the determined path h oppose one another, it is assessed whether or not the determined path's portion h1 and a portion k1 of a similar path k corresponding to the determined path's portion h1 can be adjoined adjacent to one another within the section H1, and it is also assessed whether or not the determined path h's other portion h2—which opposes the determined path h's portion h1—and a portion k2 of the similar path k corresponding to the determined path's other portion h2 can be adjoined adjacent to one another within the section H1. Hereinbelow, in the aforementioned opposing section H1, a portion of the determined path is also referred to as "portion h1", another portion of the determined path opposing the portion h1 is also referred to as "portion h2", a portion of a similar path corresponding to the portion h1 is referred to as "portion k1", and another portion of a similar path corresponding to the portion h2 is referred to as "portion k2" (see FIGS. 13(a) to 13(c)).

Figure 14:
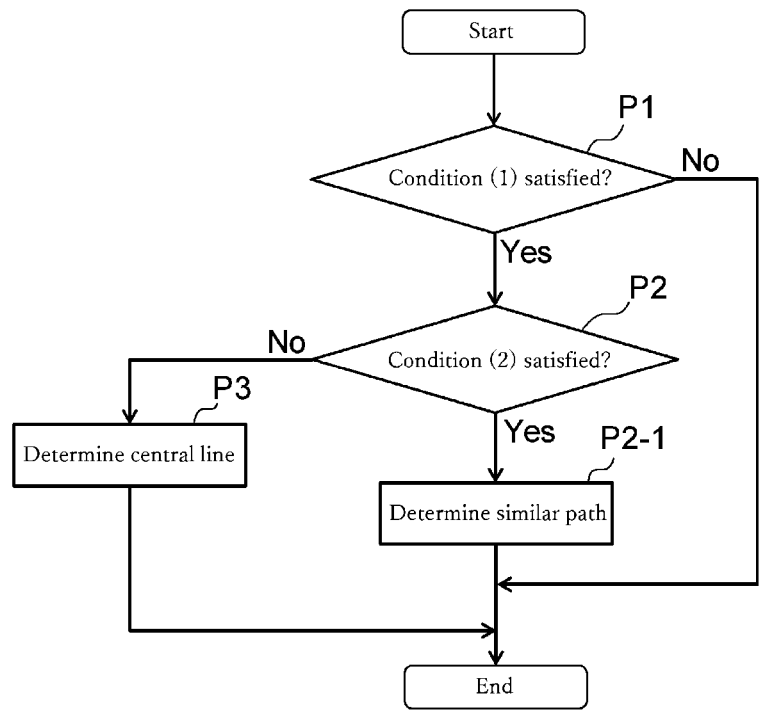
FIG. 14 is a flowchart illustrating an example of a process flow for calculating the movement paths illustrated in FIG. 13.

Determination of a movement path in the aforementioned section H1 wherein the portions h1 and h2 of the determined path oppose one another is performed, for example, according to the process illustrated in FIG. 14. In the flow illustrated in FIG. 14, the following steps (1) to (3) are performed.

Step (1): In P1, it is assessed whether or not the following condition (1) is satisfied. If condition (1) is satisfied, P2 in step (2) is performed as the next process. If condition (1) is not satisfied, it is determined that a similar path cannot be rendered within the section H1 where the portions h1 and h2 of the determined path h oppose one another (see FIG. 13(a)). Further, if condition (1) is not satisfied, it is determined that a later-described non-circulating path cannot be rendered either.

Condition (1): Portion k1 of the similar path k is located on the inner side of portion h2 of the determined path, and also, the other portion k2 of the similar path is located on the inner side of the other portion h1 of the determined path.

Step (2): In P2, it is assessed whether or not the following condition (2) is satisfied. If condition (2) is satisfied, it is determined that a similar path can be rendered within the section H1 where the portions h1 and h2 of the determined path oppose one another (see FIG. 13(b)), and the similar path is determined (P2-1 illustrated in FIG. 14). If condition (2) is not satisfied, P3 in step (3) is performed as the next process.

Condition (2): Portion k1 of the similar path is located adjacent to portion h1 of the determined path, and also, the other portion k2 of the similar path is located adjacent to the other portion h2 of the determined path.

An example of a state where the aforementioned condition (2) is not satisfied may be a case where the portion k1 of the similar path is located adjacent to the other portion h2 of the determined path, and the other portion k2 of the similar path is located adjacent to the portion h1 of the determined path.

If the condition (2) is not satisfied, then in step (3) P3, a central line CLI that bisects (divides into two equal parts) the separation distance between the similar path's portion k1 and the other portion k2 in the width direction Y is determined as a movement path. Different from similar paths, the central line CLI is a non-circulating path.

The aforementioned Calculation J3 may be performed repeatedly depending on the planar-view shape and thickness of the nanofiber sheet. From the viewpoint of improving the accuracy for adjusting the thickness of the nanofiber layer, it is preferable that the Calculation J3 is performed for each section H1 where the portions h1 and h2 of the determined path oppose one another.

In the nanofiber sheet manufacturing method of the present embodiment, the first to third inner-side paths s1, s2 and s3 are calculated according to the aforementioned Calculations J1, J2 and J3 in the path calculation step. More specifically, the separation distance between adjacent paths is calculated by Calculations J1 and J2, and, based on the separation distance, the first to third inner-side paths s1, s2 and s3 are calculated by Calculation J3. In this way, the nanofiber sheet manufacturing method may determine movement paths by Calculation J1, Calculation J2, Calculation J3, or a combination of two or more of the above calculations.

Figure 12:
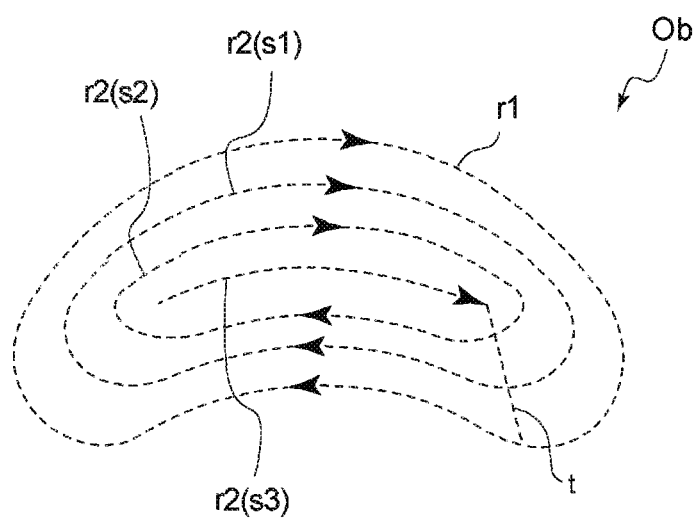
FIG. 12 is a plan view illustrating movement paths for forming the nanofiber sheet illustrated in FIG. 1.

In the nanofiber sheet manufacturing method of the present embodiment, a plurality of movement paths is determined in the path calculation step, and the nozzle 20 is moved along the plurality of movement paths in the deposition step. In the present embodiment, the movement path Ob is a combination of a path group that includes, in a nested manner, a plurality of circulating paths substantially similar to one another, and a crossover line path that connects the plurality of paths constituting the path group (see FIG. 12). As illustrated in FIG. 12, the path group is constituted by the first movement path located on the outermost side, and the first to third inner-side paths s1 to s3 located on the inner side of the first movement path, and a crossover line path t connects these paths. From the viewpoint of forming the gradation region G more accurately, it is preferable that the plurality of circulating paths constituting the path group in the movement path are connected to the crossover line path t. The crossover line path t connects the plurality of circulating paths; the crossover line path may intersect with or be in contact with each of the circulating paths.

The crossover line path t may be a rectilinear path that connects the plurality of circulating paths constituting the path group. Incidentally, in the present electrospinning device 100, it is preferable to eject the material liquid continuously from the viewpoint of facilitating control of the ejection speed of the material liquid. So, in this case, from the viewpoint of suppressing the thickness of the nanofiber layer from increasing excessively, it is preferable to form the crossover line path t as a rectilinear path that connects the respective termination points of the circulating paths constituting the path group. Stated differently, it is preferable that, in the path calculation step, calculation is performed such that the crossover line path t becomes a rectilinear path that connects the respective termination points of the circulating paths constituting the path group.

In calculating the movement path Ob, the movement path Ob may be constituted by paths that move from the outside toward the inside, or may be constituted by paths that move from the inside toward the outside, or may be a combination of paths that move from the outside toward the inside and paths that move from the inside toward the outside. The movement path Ob may be constituted by paths oriented in a single movement direction, or may be a combination of paths oriented in different movement directions. In calculating the movement path Ob illustrated in FIG. 12, an example of a configuration for moving from the outside toward the inside may be a configuration that moves in the following order: the first movement path r1, the first inner-side path s1, the second inner-side path s2, and the third inner-side path s3. An example of a configuration for moving from the inside toward the outside may be a configuration that moves in the following order: the third inner-side path s3, the second inner-side path s2, the first inner-side path s1, and the first movement path r1.

Hereinbelow, the first movement path constituting the movement path Ob may be also referred to simply as r1, and the first to third inner-side paths located inside the first movement path may be also referred to simply as s1 to s3, respectively.

From the viewpoint of improving the accuracy of the thickness of the nanofiber layer 11 and from the viewpoint of forming the gradation region G more reliably, it is preferable that, in the deposition step, nanofibers are deposited while at least either the nozzle or the collecting unit moves repeatedly along at least a portion of the path(s) constituting the path group. For example, in the case of the movement path Ob illustrated in FIG. 12, at least either the nozzle or the collecting unit repeats, a plurality of times, the operation of moving along either one of the plurality of circulating paths r1, s1-s3. In this case, an operation of moving along the same path may be repeated a plurality of times before migrating to the movement along another path. Alternatively, an operation of moving along each path, once for each path, may be repeated a plurality of times. The aforementioned "same path" may refer to each of the circulating paths r1, s1, s2, or may refer to the non-circulating path s3. In the case of the movement path Ob illustrated in FIG. 12, r1 may be performed once, s1 may be repeated twice, s2 may be repeated three times, and s3 may be repeated three times. Alternatively, each of the paths from r1 to s3 may be performed once, and then, each of the paths from s1 to s3 may be performed once, and then, each of the paths s2 and s3 may be performed once.

From the same viewpoint, it is preferable that the path calculation step calculates the number of times of repetitions according to which at least either the nozzle or the collecting unit repeats the movement along the same path, such that the thickness of the nanofiber layer takes on a predetermined set value—e.g., the thickness of the nanofiber layer becomes equal to or greater than the design minimum thickness D5 of the inner region M. Hereinbelow, this calculation is also referred to as Calculation J4. Calculation J4 calculates, for each movement path, the number of times to repeat movement along each path, such that the thickness at a predetermined position in the nanofiber layer 11 becomes a preset thickness—e.g., the thickness of the nanofiber layer becomes equal to or greater than the design minimum thickness D5 of the inner region M. Calculation J4 is effective in cases where the upper limit of the thickness of the overlap region E as calculated by the aforementioned Calculation J2 does not become equal to or greater than a predetermined design thickness.

In the deposition step, at least either the nozzle or the collecting unit may repeat movement along the same circulating path, or may move along each of a plurality of circulating paths having substantially similar shapes, as described above.

Figure 15:
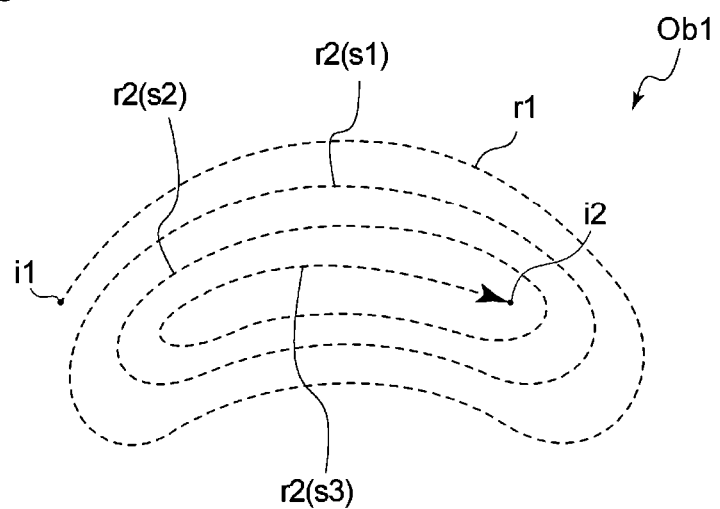
FIG. 15 is a plan view illustrating another movement path for forming the nanofiber sheet illustrated in FIG. 1.

The movement path Ob of the present embodiment is constituted by a combination of a path group and a crossover line. However, as illustrated in FIG. 15, the movement path Ob1 may be a linear shape that can be rendered in one stroke. "A linear shape that can be rendered in one stroke" refers to a shape consisting of a single continuous line, wherein the line has no overlapping section. With this configuration, the material liquid can be ejected continuously, and ejection of the material liquid can be controlled even further. An example of a movement path having a linear shape that can be rendered in one stroke may be a spiral shape as illustrated in FIG. 15.

The movement path Ob1 having a linear shape that can be rendered in one stroke can be calculated by the movement path calculation step using the aforementioned Calculations J1, J2 and J3. In the spiral-shaped movement path illustrated in FIG. 15, the outermost path line corresponds to the first movement path r1, and path lines located inside the outermost path line correspond to the first to third inner-side paths s1 to s3.

In calculating the movement path Ob1 having a linear shape that can be rendered in one stroke, the movement path Ob1 may be a path moving from the outside toward the inside, or may be a path moving from the inside toward the outside. Of the endpoints of the movement path Ob1 illustrated in FIG. 15, when the endpoint on the first movement path r1 side is defined as i1 and the endpoint on the third inner-side path s3 side is defined as i2, the movement path Ob1 may be a path starting from i1 as the start point and moving to i2 as the termination point, or may be a path starting from i2 as the start point and moving to i1 as the termination point.

From the viewpoint of improving the accuracy of the thickness of the nanofiber layer 11 and forming the gradation region G more reliably, it is preferable that, in the deposition step, at least either the nozzle or the collecting unit repeats movement along the movement path Ob1 having a linear shape that can be rendered in one stroke. For example, in cases where at least either the nozzle or the collecting unit moves along the movement path Ob1 illustrated in FIG. 15, the nozzle and/or the collecting unit may start from the endpoint i1 and move from the first movement path r1 to the endpoint i2 on the third inner-side path s3 side, and may then move from the first inner-side path s1 via the second inner-side path s2 up to the endpoint i2 on the third inner-side path s3 side, and may then further move from the second inner-side path s2 up to the endpoint i2 on the third inner-side path s3 side.

From the viewpoint of suppressing fluctuations in the ejection area of nanofibers ejected from the ejection hole of the nozzle 20 and forming the gradation region G accurately, it is preferable to move either one, or both, of the nozzle 20 and the collecting unit 40 at a constant speed. From the same viewpoint, the movement speed of either one of the nozzle 20 or the collecting unit 40 is preferably 5 mm/second or greater, more preferably 50 mm/second or greater, and preferably 1000 mm/second or less, more preferably 150 mm/second or less, and preferably from 5 to 1000 mm/second, more preferably from 50 to 150 mm/second.

As illustrated in FIG. 1, the nano fiber sheet 10 of the present embodiment includes a substrate layer 12 and a nanofiber layer 11 containing nanofibers. The substrate layer 12 is located on one surface side of the nanofiber layer 11. Such a nanofiber sheet 10 including a substrate layer 12 can be manufactured by arranging the substrate layer 12 on the collecting unit 40, and depositing the nanofibers on the substrate layer 12. Further, from the viewpoint of shaping the nanofiber sheet, after deposition of the nanofibers, into a desired shape and size, it is preferable that the nanofiber sheet manufacturing method includes a cutting step of cutting the obtained nanofiber sheet 10, the substrate layer 12, or both the nanofiber sheet and the substrate layer. For the cutting step, it is possible to use, for example: a cutting device including a cutter roller having, on the roller's circumferential surface, a cutting blade extending in the circumferential direction, and an anvil roller for receiving the blade on the cutter roller, or a known cutting device such as an ultrasonic cutter.

The horizontal sectional shape of the ejection hole of the nozzle 20 is not particularly limited, and may be formed in an arbitrary shape, such as a circular planar shape or a shape with an acute angle. In cases where the nozzle 20 has a circular cylindrical shape as illustrated in FIG. 9, from the viewpoint of depositing fibers F efficiently, it is preferable that the diameter at the tip end of the nozzle 20—i.e., the diameter of the ejection hole—is preferably from 0.1 to 20 mm, more preferably from 0.1 to 15 mm.

A supplying end of the material liquid supplying path is preferably arranged in the vicinity of the nozzle 20, and, for example, is preferably arranged within a range within 10 mm from the nozzle 20.

From the viewpoint of easily forming the gradation region G, the separation distance between the tip end of the nozzle 20 and the counter electrode 30 in the electrospinning device 100 may preferably be 30 mm or greater, more preferably 50 mm or greater, and may preferably be 350 mm or less, more preferably 300 mm or less.

Next, other embodiments of electrospinning devices usable in nanofiber sheet manufacturing methods will be described with reference to FIGS. 16 to 21. As regards electrospinning devices 100A, 100B, 100C, 100D according to the following second to fifth embodiments, features that are different from the electrospinning device 100 of the foregoing first embodiment will be described below. Features that are not particularly explained are the same as those in the electrospinning device according to the foregoing first embodiment, and the explanation on the aforementioned electrospinning device is applicable as appropriate.

Figure 16:
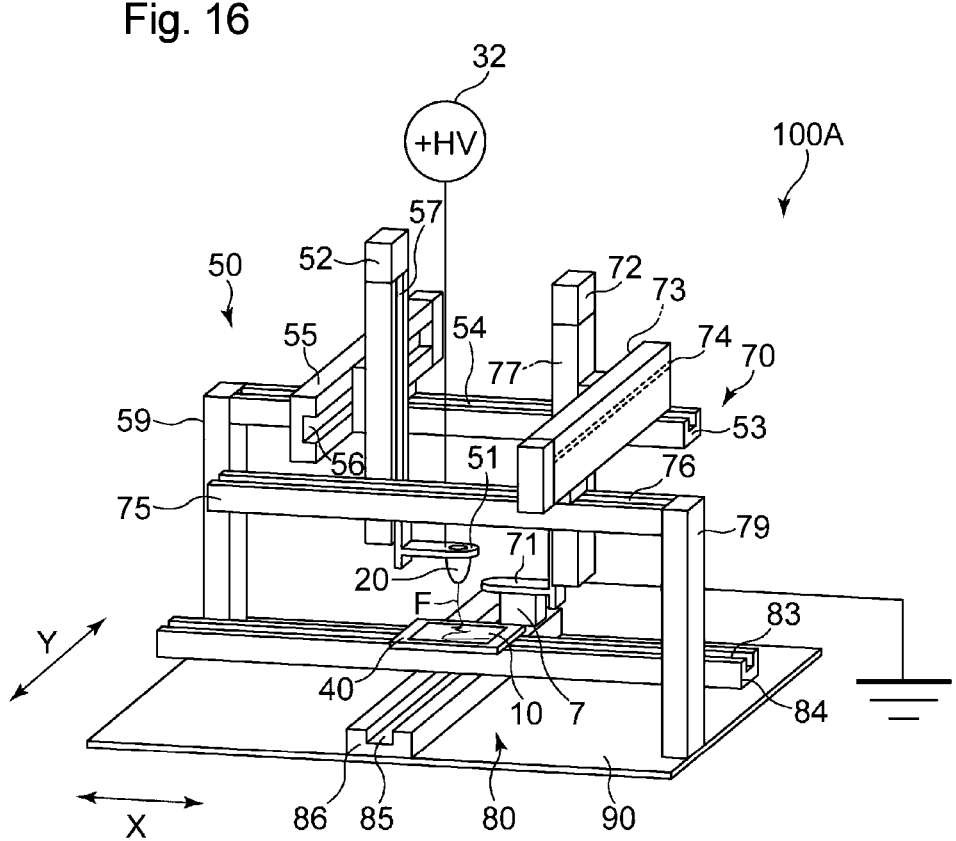
FIG. 16 is a perspective view illustrating another embodiment of a manufacturing device for manufacturing a nanofiber sheet of the present invention.

FIG. 16 illustrates a second embodiment of an electrospinning device. The electrospinning device 100A illustrated in FIG. 16 includes: a nozzle 20 configured to eject a material liquid; a voltage application taut 32 serving as a power supply configured to apply a voltage to the nozzle 20; a collecting unit 40 configured to collect fibers F (nanofibers) produced from the material liquid; a nozzle-moving mechanism 50 configured to move the nozzle 20; and a cutting unit 7 configured to cut the nanofiber sheet into a predetermined contour shape. In the present embodiment, the collecting unit 40 is constituted by an electroconductive material such as metal. The collecting unit 40 is located in opposition to the nozzle 20. The collecting unit 40 is grounded. Thus, applying a positive or negative voltage to the nozzle 20 will create an electric field between the nozzle 20 and the collecting unit 40.

The cutting unit 7 is for cutting the nanofiber sheet 10 formed on the collecting unit 40 into a predetermined contour shape. The cutting unit 7 is mounted to a later-described cutting unit-moving mechanism 70. Examples of the cutting unit 7 may include laser processing machines that perform melting-and-cutting by irradiation with a laser beam, and ultrasonic cutters that perform melting-and-cutting by frictional heat caused by ultrasonic vibrations. Herein, a laser processing machine can preferably be used from the viewpoint of enabling cutting into fine details shapes while being compact in size.

In cases of using a laser processing machine as the cutting unit 7, examples of lasers emitting laser beams may include $CO_2$ lasers, excimer lasers, argon lasers, semiconductor lasers, and YAG lasers. From the viewpoint of cutting the nanofiber sheet efficiently, it is preferable to use a $CO_2$ laser. The laser beam output is preferably 1.5 W or higher, more preferably 5 W or higher, and 150 W or lower, more preferably 50 W or lower. The laser beam irradiation time is preferably 1 mm/second or greater, more preferably 20 mm/second or greater, and preferably 1200 mm/second or less, more preferably 300 mm/second or less.

It is preferable that the collecting unit 40 is made from an air-permeable member from the viewpoint of preventing burning of the nanofiber layer's surface facing the substrate layer at the time of cutting the nanofiber sheet 10 by irradiation with a laser beam.

The electrospinning device 100A includes a base 90. The base 90 may be made from a non-electroconductive material or an electroconductive material. The base 90 has a longitudinal direction which is the X-axis direction in a planar view, and a lateral direction which is the Y-axis direction orthogonal to the X-axis direction. The principal surface of the base 90 consisting of the X-axis direction and the Y-axis direction is in opposition to the nozzle 20. As illustrated in FIG. 16, a collecting unit-moving mechanism 80 is placed in a central portion of the principal surface of the base 90. The nozzle-moving mechanism 50 and a cutting unit-moving mechanism 70 are arranged in peripheral edge portions of the base 90 at positions so as not to interfere with one another.

The collecting unit-moving mechanism 80 includes an X-axis rail 84 extending in the X-axis direction and a Y-axis rail 86 extending in the Y-axis direction. The X-axis rail 84 has a depressed-shape guide groove 83 formed along the X-axis direction. The Y-axis rail 86 has a depressed-shape guide groove 85 formed along the Y-axis direction. The collecting unit 40 is attached to the X-axis rail 84 in an electrically insulated state. The collecting unit 40 is slidable along the guide groove 83 in the X-axis direction. The X-axis rail 84 is attached to the Y-axis rail 86 in an electrically insulated state. The X-axis rail 84 is slidable along the guide groove 85 in the Y-axis direction. The Y-axis rail 86 is placed and fixed on the principal surface of the base 90 so as to pass along the base 90's center position in the X-axis direction. The collecting plane of the collecting unit 40 is parallel to the principal surface of the base 90. According to the collecting unit-moving mechanism 80 configured as above, the collecting unit 40 can move freely within its collecting plane in the X-axis direction and Y-axis direction.

The nozzle-moving mechanism 50 is configured so as to be able to move the nozzle 20 at least within a range in which the collecting unit 40 is movable. The nozzle-moving mechanism 50 includes: a slider 51 configured to retain the nozzle 20; X-axis rail 53 and Y-axis rail 55 extending respectively along the X-axis direction and Y-axis direction; and a Z-axis rail 52 extending in the Z-axis direction which is the vertical direction orthogonal to the X-axis direction and Y-axis direction. The Z-axis rail 52 has a guide groove 57 formed in a depressed-shape along the Z-axis direction. The slider 51 is fitted in the guide groove 57, and is slidable along the guide groove 57 in the Z-axis direction. The Y-axis rail 55 has a Y-axis guide groove 56 extending in the Y-axis direction. The X-axis rail 53 has an X-axis guide groove 54 extending in the X-axis direction. The Z-axis rail 52 is attached to the Y-axis rail 55 in an electrically insulated state. The Z-axis rail 52 is slidable along the Y-axis guide groove 56 in the Y-axis direction. The Y-axis rail 55 is attached to the X-axis rail 53 in an electrically insulated state. The Y-axis rail 55 is slidable along the X-axis guide groove 54 in the X-axis direction. One end of the X-axis rail 53 is fixed to a support column 59 provided so as to stand on the principal surface of the base 90. According to the nozzle-moving mechanism 50 configured as above, the nozzle 20 can move freely in the X-axis direction, the Y-axis direction, and the Z-axis direction.

The cutting unit-moving mechanism 70 is configured so as to be able to move the cutting unit 7 at least within a range in which the collecting unit 40 is movable. The cutting unit-moving mechanism 70 includes: a slider 71 configured to retain the cutting unit 7; a Y-axis rail 73 and an X-axis rail 75 extending respectively along the Y-axis direction and X-axis direction; and a Z-axis rail 72 extending in the Z-axis direction which is the vertical direction orthogonal to the X-axis direction and Y-axis direction. The Z-axis rail 72 has a guide groove 77 formed in a depressed-shape along the Z-axis direction. The slider 71 is fitted in the guide groove 77, and is slidable along the guide groove 77 in the Z-axis direction. The Y-axis rail 73 has a Y-axis guide groove 74 extending in the Y-axis direction. The X-axis rail 75 has an X-axis guide groove 76 extending in the X-axis direction. The Z-axis rail 72 is attached to the Y-axis rail 73 in an electrically insulated state. The Z-axis rail 72 is slidable along the Y-axis guide groove 74 in the Y-axis direction. The Y-axis rail 73 is attached to the X-axis rail 75 in an electrically insulated state. The Y-axis rail 73 is slidable along the X-axis guide groove 76 in the X-axis direction. One end of the X-axis rail 75 is fixed to a support column 79 provided so as to stand on the principal surface of the base 90. According to the cutting unit-moving mechanism 70 configured as above, the cutting unit 7 can move freely in the X-axis direction, the Y-axis direction, and the Z-axis direction.

The collecting unit-moving mechanism 80, the nozzle-moving mechanism 50, and the cutting unit-moving mechanism 70 are electrically connected to a control unit (not illustrated). Based on data about a movement path as inputted to the control unit, and/or based on an operation signal inputted by an operator to the control unit via a controller, the collecting unit 40, the nozzle 20, and the cutting unit 7 can be moved. The control unit is configured such that data on a movement path is inputted or is inputtable to the control unit. Inputting of data on the movement path to the control unit may be achieved by input via a storage medium such as a USB memory, or by input via a network such as the Internet or an intranet.

In the electrospinning device 100A of the present embodiment, the support column 59 of the nozzle-moving mechanism 50 and the support column 79 of the cutting unit-moving mechanism 70 are supported by the base 90, which serves as a common support. Stated differently, the nozzle-moving mechanism 50 and the cutting unit 7 are supported by a common support. As a result, the electrospinning device 100A includes, in a single device: a manufacturing unit configured to manufacture the nanofiber sheet 10 by depositing fibers F on the collecting unit 40 while moving the nozzle 20 freely in biaxial directions by the nozzle-moving mechanism 50; and a cutting unit configured to cut the nanofiber sheet 10 into a predetermined contour shape while moving the cutting unit 7 freely in triaxial directions by the cutting unit-moving mechanism 70. Thus, the electrospinning device 100A of the present embodiment is compact as a whole. By taking advantage of this compact configuration, the electrospinning device 100A of the present embodiment can, for example, be easily installed at a counter of a store selling nanofiber sheets, and provide, on site, nanofiber sheets with desired contour shapes in accordance with the customers' requests.

"The nozzle-moving mechanism 50 and the cutting unit 7 are supported by a common support" means that the nozzle-moving mechanism 50 and the cutting unit 7 are mounted to the support in a manner that, by moving the support, the nozzle-moving mechanism 50 and the cutting unit 7 are also moved simultaneously. In this sense, the nozzle-moving mechanism 50 and the cutting unit 7 are not supported by a common support in cases where only one of the nozzle-moving mechanism 50 or the cutting unit 7 is moved when the support is moved, and the other does not move.

A preferred embodiment of a method for manufacturing a nanofiber sheet 10 by using the electrospinning device 100A will be described according to an example of manufacturing a nanofiber sheet including a nanofiber layer and a substrate layer. First, a substrate layer is arranged on the collecting unit 40. Then, based on an operation signal transmitted from the control unit (not illustrated), the collecting unit-moving mechanism 80 is operated, to move the collecting unit 40 to a predetermined position. Next, in a state where an electric field is created between the nozzle 20 and the collecting unit 40, a material liquid is supplied to the nozzle 20, and the material liquid is ejected from the nozzle. While ejecting the material liquid, the nozzle-moving mechanism 50 is operated and the nozzle 20 is moved based on an operation signal transmitted from the control unit (not illustrated). After being ejected, the solvent in the material liquid evaporates before reaching the substrate layer, and thereby the ejected material liquid is spun so as to be drawn toward the collecting unit 40 while forming fibers F. The fibers F are deposited onto the substrate layer provided on the collecting unit 40, to thereby form a deposit of fibers F. This deposit becomes the nanofiber layer.

Next, based on an operation signal transmitted from the control unit (not illustrated), the nanofiber sheet 10 is cut by operating the cutting unit-moving mechanism 70 to thereby move the cutting unit 7 while emitting a laser beam from the cutting unit 7. In this way, a nanofiber sheet 10 having a desired planar-view shape is formed. The cutting unit 7 is configured to cut only the nanofiber layer on the substrate layer, or cut only the substrate layer located outside the peripheral edge of the deposited nanofiber layer, or cut the entire nanofiber sheet 10 including both the substrate layer and the nanofiber layer, depending on e.g., conditions for emitting the laser beam.

From the viewpoint of formability of the nanofiber sheet 10, it is preferable that at least one of the nozzle 20, the cutting unit 7, or the collecting unit 40 is moved at a constant speed. The preferable range for the movement speed of each of these components may be the same as the range described above regarding "the movement speed of either one of the nozzle 20 or the collecting unit 40".

Preferably, the entire electrospinning device 100A of the present embodiment is covered by a cover, taking into consideration that the device may be installed at a store counter. It is preferable that a transparent section is provided in at least a portion of the cover. From the viewpoint of attenuating inadvertently-escaping laser beams, it is preferable that the transparent section is made from a material that can easily absorb light with laser beam wavelengths, e.g., acrylic resin, polycarbonate resin, or glass.

In cases where the entire electrospinning device 100A is covered with a cover, it is preferable to provide a dust collection/deodorization mechanism for deodorizing the smell of burning at the time of cutting the nanofiber sheet 10 by irradiation with a laser beam, taking into consideration that the device may be installed at a store counter.

Figure 17:
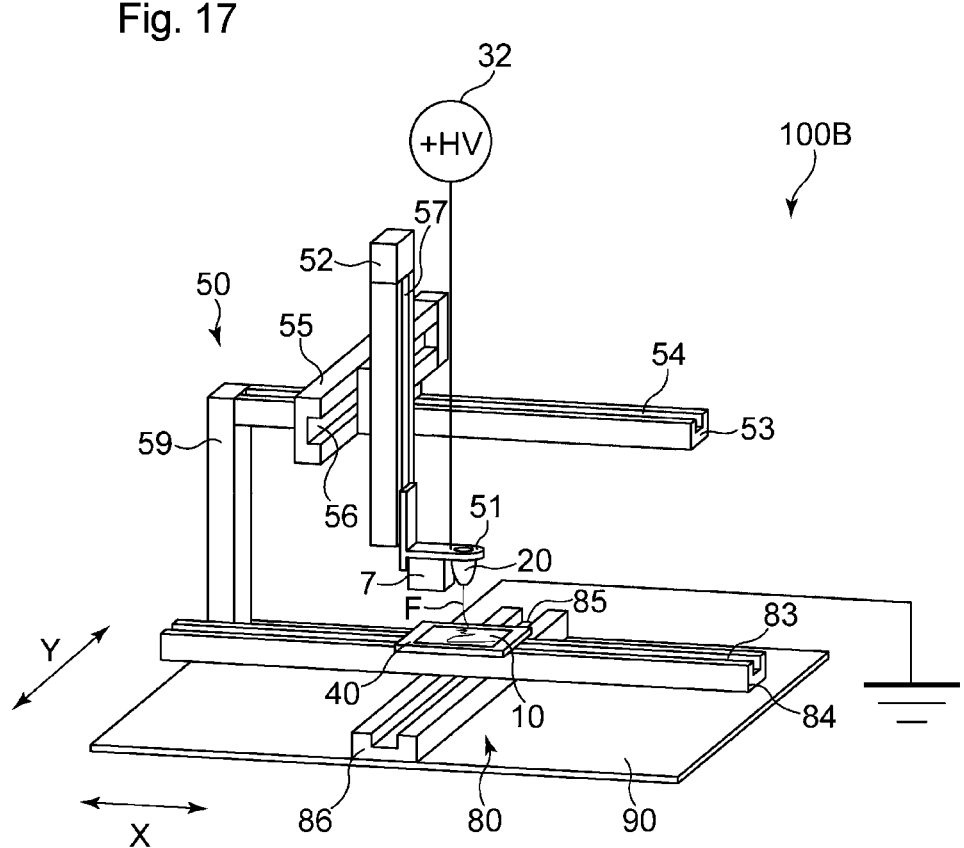
FIG. 17 is a perspective view illustrating yet another embodiment of a manufacturing device for manufacturing a nanofiber sheet of the present invention.

FIG. 17 illustrates a third embodiment of an electrospinning device. As regards electrospinning devices according to the following third, fourth, and fifth embodiments, features that are different from the electrospinning device 100A of the foregoing second embodiment will be described below. Features that are not particularly explained are the same as those in the electrospinning device according to the foregoing second embodiment, and the explanation on the electrospinning device is applicable as appropriate.

The aforementioned electrospinning device 100A includes a nozzle-moving mechanism 50 and a cutting unit-moving mechanism 70 separate from the nozzle-moving mechanism 50. In the electrospinning device 100B of the third embodiment, the cutting unit 7 is mounted to the nozzle-moving mechanism 50.

In the electrospinning device 100B illustrated in FIG. 17, the collecting unit-moving mechanism 80 is placed in a central portion of the base 90. The nozzle-moving mechanism 50 is arranged in a peripheral edge portion of the base 90. The nozzle-moving mechanism 50 of the electrospinning device 100B includes: a slider 51 configured to retain the nozzle 20; and an X-axis rail 53, a Y-axis rail 55 and a Z-axis rail 52. The slider 51 is fitted in a guide groove 57 formed in the Z-axis rail 52. The slider 51 retains the nozzle 20, and also retains the cutting unit 7. With this nozzle-moving mechanism 50, the slider 51 can move freely in the X-axis direction, the Y-axis direction, and the Z-axis direction. As a result, the nozzle 20 and the cutting unit 7 can move freely in the X-axis direction, the Y-axis direction, and the Z-axis direction.

In the electrospinning device 100B of the present embodiment, the nozzle 20 and the cutting unit 7 are supported by the slider 51 constituting the nozzle-moving mechanism 50. Stated differently, the nozzle-moving mechanism 50 and the cutting unit 7 are supported by a common support. As a result, the nozzle 20 and the cutting unit 7 can be moved freely in triaxial directions by the nozzle-moving mechanism 50. Since the electrospinning device 100B includes both the manufacturing unit for manufacturing the nanofiber sheet 10 and the cutting unit for cutting the nanofiber sheet 10 into a predetermined contour shape within the same nozzle-moving mechanism 50, the entire device can be made even more compact.

As in the aforementioned electrospinning device 100A, in a method for manufacturing a nanofiber sheet 10 using the electrospinning device 100B, a nanofiber sheet 10 is manufactured by forming a nanofiber layer on a substrate layer arranged on the collecting unit 40 by ejecting a material liquid from the nozzle 20 while moving the nozzle 20 by operating the nozzle-moving mechanism 50 based on an operation signal transmitted from the control unit (not illustrated). Next, based on an operation signal transmitted from the control unit (not illustrated), the nanofiber sheet 10 is cut by operating the nozzle-moving mechanism 50 to thereby move the cutting unit 7 while emitting a laser beam from the cutting unit 7. In this way, a nanofiber sheet 10 having a desired shape is formed.

The aforementioned electrospinning device 100A illustrated in FIG. 16 includes a collecting unit-moving mechanism 80 placed in a central portion of the base 90, and a nozzle-moving mechanism 50 and a cutting unit-moving mechanism 70 arranged at peripheral edge portions of the base 90 in opposition to one another. Alternatively, the electrospinning device may include a nozzle-moving mechanism 50 and a collecting unit-moving mechanism 80 without including a cutting unit-moving mechanism 70, and instead, a cutting unit 7 may be fixed to a support column provided so as to stand in a peripheral edge portion of the base 90. Also in such a device, the nozzle-moving mechanism 50 and the cutting unit 7 will be supported by the base 90 serving as a common support, and thus, the entire device will be extremely compact.

Figure 18:
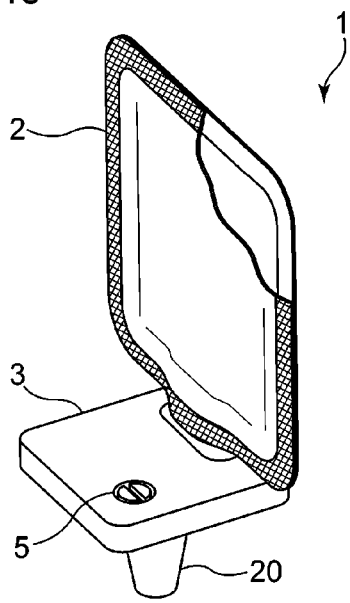
FIG. 18 is a perspective view of a cartridge unit to be used in a nanofiber sheet manufacturing device of the present invention.
Figure 19:
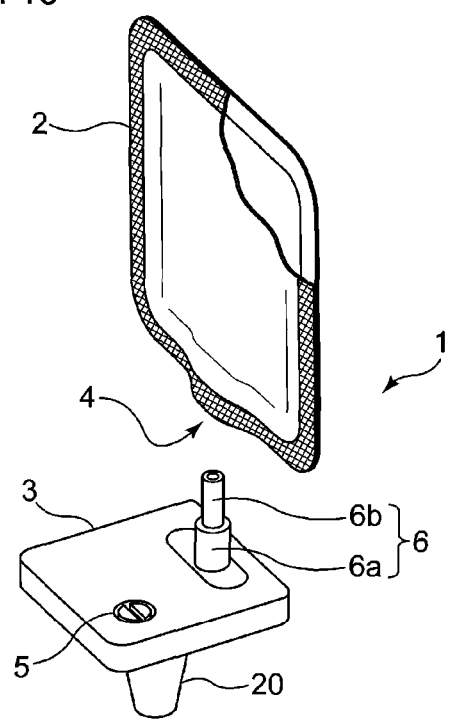
FIG. 19 is an exploded perspective view of the cartridge unit illustrated in FIG. 18.

Next, fourth and fifth embodiments of electrospinning devices will be described. FIGS. 18 and 19 illustrate a cartridge unit 1 used in electrospinning devices according to the fourth and fifth embodiments. As illustrated in FIG. 18, the cartridge unit 1 includes: a housing portion 2 capable of housing a material liquid; and a nozzle 20 configured to eject the material liquid. The cartridge unit 1 also includes a supplying portion 3 configured to supply the material liquid from the housing portion 2 to the nozzle 20.

The housing portion 2 is constituted by one of various containers such as a synthetic resin-made pouch. For example, in cases where the housing portion 2 is constituted by a pouch, the housing portion can be formed by superposing two sheets of synthetic resin-made films having the same shape and same size, and joining the respective peripheral edges thereof in a liquid-tight manner, as illustrated in FIGS. 18 and 19. The housing portion 2 has, in its peripheral edge portion, an opening 4 through which a material liquid can be filled and fed out. The interior space of the housing portion 2 can be filled with the material liquid through the opening 4, and the material liquid filled in the housing portion 2 can be fed to the outside through the opening.

The nozzle 20 includes an ejection hole (not illustrated) having a minute diameter. The nozzle 20 is made from a non-electroconductive material, such as a synthetic resin. An electroconductive needle-shaped electrode (not illustrated) is arranged inside the ejection hole along the longitudinal direction of the ejection hole. The electrode is used for charging the material liquid ejected through the nozzle 20. The electrode is connected to a later-described power supply. As a result, a positive or negative voltage can be applied to the nozzle 20. An end of the ejection hole of the nozzle 20 is directly connected to the supplying portion 3 of the cartridge unit 1. "Directly connected" means that the nozzle 20 and the supplying portion 3 are connected in a state where no supplying tube, which is a separate member from the nozzle and the supplying portion, is interposed therebetween. The other end of the ejection hole is opened toward the outside.

The supplying portion 3 functions to supply the material liquid housed within the housing portion 2 to the nozzle 20. To achieve this, the supplying portion 3 includes a liquid-feeding mechanism (not illustrated) for feeding the material liquid. For the liquid-feeding mechanism, any known mechanism may be used without particular limitation. For example, a gear pump may be used as the liquid-feeding mechanism. A gear pump can suitably be used in the present invention because it is compact and can quantitatively feed the material liquid with high precision. The supplying portion 3 also includes an engagement connection portion 5 for connection with a drive source (described further below) configured to drive the liquid-feeding mechanism. The engagement connection portion 5 is configured to be engaged with an engaging/connecting portion (not illustrated) of the drive source, and thereby, a drive force generated by the drive source is transmitted to the liquid-feeding mechanism.

As illustrated in FIG. 19, the supplying portion 3 includes a receiving portion 6 for receiving the material liquid. The receiving portion 6 has a cylindrical base portion 6a. The receiving portion 6 also has a cylindrical liquid-receiving tube 6b having a smaller diameter than that of the base portion 6a and being contiguous to the upper end of the base portion 6a. In the figure, the tip end of the liquid-receiving tube 6b is opened upward. When the cartridge unit 1 is in use, the receiving portion 6 is inserted in the opening 4 of the housing portion 2, and thereby the housing portion 2 is detachably mounted to the supplying portion 3. More specifically, in a state where the receiving portion 6 is inserted in the opening 4, the tip end of the liquid-receiving tube 6b reaches the space inside the housing portion 2 where the material liquid is housed, which allows the material liquid to be supplied to the supplying portion 3. The base portion 6a is fitted with the opening 4 in a liquid-light manner, thereby maintaining the linked state between the housing portion 2 and the supplying portion 3. In this state where the housing portion 2 is mounted to the supplying portion 3, the housing portion 2 and the supplying portion 3 are directly connected. "Directly connected" means that the housing portion 2 and the supplying portion 3 are connected in a state where no supplying tube, which is a separate member from the housing portion and the supplying portion, is interposed therebetween.

By configuring the cartridge unit 1 as described above, the present embodiment becomes advantageous in that, when a different type of nanofiber sheet is to be manufactured by changing the type of material liquid, this can be achieved by the simple operation of removing the housing portion 2 and exchanging it with another housing portion 2 containing a different material liquid. Further, the nozzle 20, which is a relatively expensive member, can be reused, thus making the device economical. Moreover, the housing portion 2 and the supplying portion 3 are directly connected, and also the supplying portion 3 and the nozzle 20 are directly connected; this configuration is advantageous in that, when exchanging the cartridge unit 1 to use a different material liquid, the flow path for the material liquid inside the cartridge unit 1 can be cleaned easily.

Figure 20:
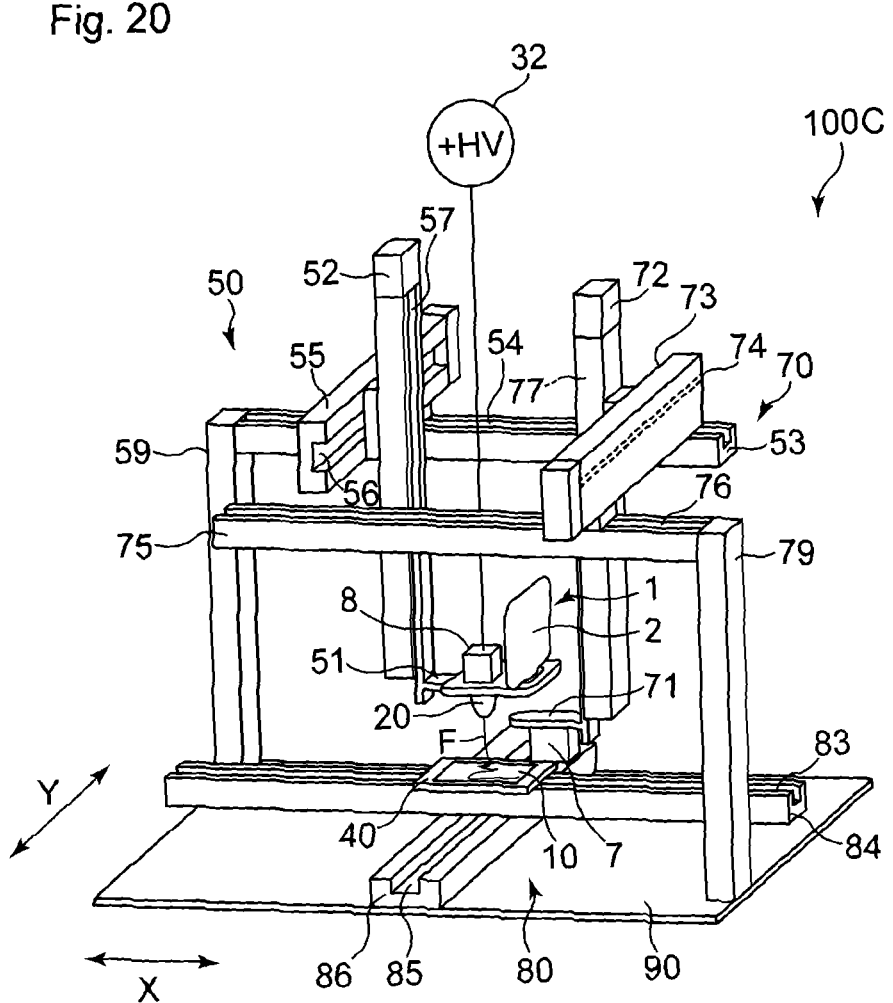
FIG. 20 is a perspective view illustrating yet another embodiment of a nanofiber sheet manufacturing device of the present invention.

FIG. 20 illustrates an electrospinning device 100C according to a fourth embodiment. The electrospinning device 100C illustrated in FIG. 20 includes the cartridge unit 1 illustrated in FIGS. 18 and 19. The electrospinning device 100C has a similar configuration to the electrospinning device 100A according to the second embodiment, except that it includes the cartridge unit 1 which is provided with the nozzle 20, and that the nozzle-moving mechanism 50 is configured to move the entire cartridge unit 1.

The nozzle-moving mechanism 50 is configured so as to be able to move the cartridge unit 1, which includes the nozzle 20, at least within a range in which the collecting unit 40 is movable. Except for this configuration, the nozzle-moving mechanism 50 of the present embodiment has a similar configuration to the nozzle-moving mechanism 50 of the second embodiment.

As described above, in the nozzle-moving mechanism 50, the cartridge unit 1 is detachably mounted to the slider 51. Stated differently, the slider 51 is not only used as a means for raising and lowering the cartridge unit 1, but is also used as a mounting unit for mounting the cartridge unit 1. The slider 51, serving as the mounting unit for the cartridge unit 1, is provided with a drive source 8 configured to drive the supplying portion 3 (see FIGS. 18 and 19) of the cartridge unit 1. The drive source 8 includes an engaging/connecting portion (not illustrated) configured to engage with the engagement connection portion 5 (see FIGS. 18 and 19) of the supplying portion 3. In a state where the cartridge unit 1 is mounted to the slider 51 serving as the mounting unit, the engagement connection portion 5 of the supplying portion 3 is in engagement with the engaging/connecting portion (not illustrated) of the drive source 8, and thereby, the drive force generated by the drive source 8 is transmitted to the supplying portion 3.

As described above, in the present embodiment, the cartridge unit 1 is detachably mounted to the slider S1. This configuration is advantageous in that, when a different type of nanofiber sheet is to be manufactured by changing the type of material liquid, the manufacture of a new type of nanofiber sheet can be achieved by the simple operation of removing the cartridge unit 1 from the slider 51 and exchanging it with another cartridge unit 1 containing a different material liquid. This advantage becomes particularly significant in cases where the housing portion 2 is not detachable from the supplying portion 3 in the cartridge unit 1.

The cartridge unit 1 is detachably mounted to the slider 51, serving as the mounting unit, in an electrically insulated state. In this way, it is possible to effectively suppress unintended discharge, even in cases where a high voltage is applied to the nozzle 20 provided to the cartridge unit 1.

The collecting unit-moving mechanism 80, the nozzle-moving mechanism 50, and the cutting unit-moving mechanism 70 are electrically connected to a control unit (not illustrated), and the collecting unit 40, the cartridge unit 1, and the cutting unit 7 can be moved based on data about movement paths inputted to the control unit and/or operation signals inputted to the control unit by an operator via a controller.

Figure 21:
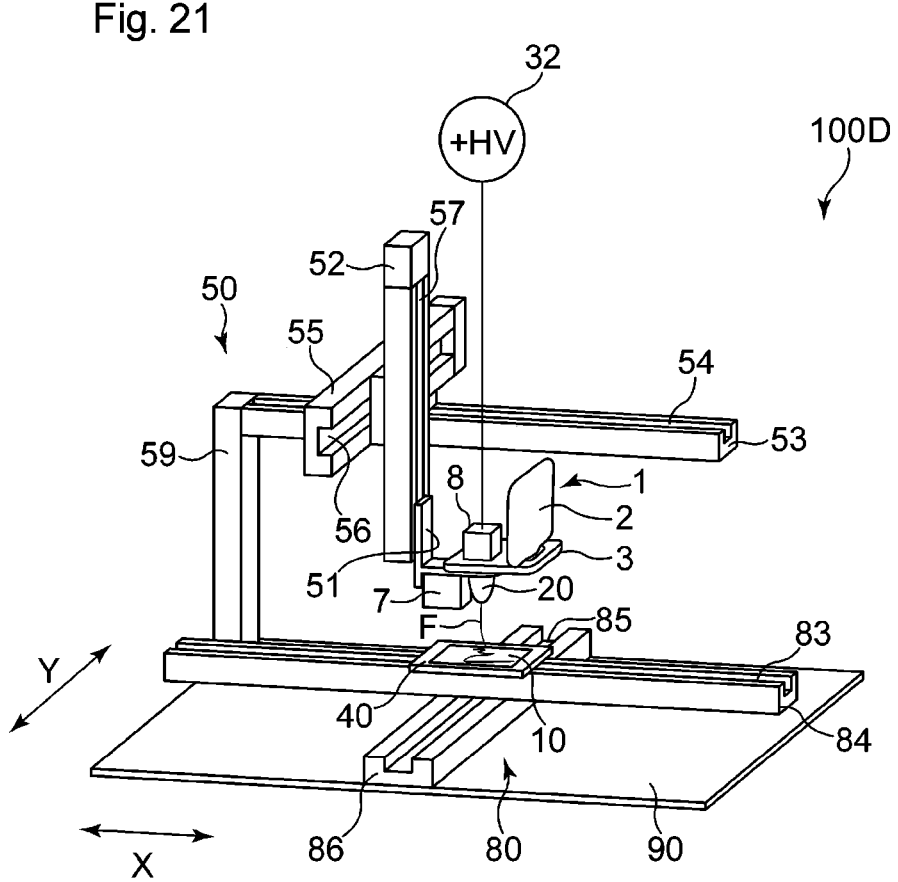
FIG. 21 is a perspective view illustrating yet another embodiment of a nanofiber sheet manufacturing device of the present invention.

FIG. 21 illustrates an electrospinning device 100D according to a fifth embodiment. The electrospinning device 100D illustrated in FIG. 21 includes the cartridge unit 1 illustrated in FIGS. 18 and 19. In the electrospinning device 100D, the cutting unit 7 is mounted to the nozzle-moving mechanism 50.

In the electrospinning device 100D illustrated in FIG. 21, the collecting unit-moving mechanism 80 is placed in a central portion of the base 90. The nozzle-moving mechanism 50 is arranged in a peripheral edge portion of the base 90. The nozzle-moving mechanism 50 of the electrospinning device 100D includes: a slider 51 to which the cartridge unit 1, including the nozzle 20, is detachably mounted; rails 53 and 55; and a Z-axis rail 52. The slider 51 is fitted in a guide groove 57 formed in the Z-axis rail 52. The slider 51 retains the cartridge unit 1 and the cutting unit 7. With this nozzle-moving mechanism 50, the slider 51 can move freely in the X-axis direction, the Y-axis direction, and the Z-axis direction. As a result, the cartridge portion 1, including the nozzle 20, and the cutting unit 7 can move freely in the X-axis direction, the Y-axis direction, and the Z-axis direction.

In the electrospinning device 100D of the present embodiment, the cartridge unit 1, including the nozzle 20, and the cutting unit 7 are supported by the slider 51 constituting the nozzle-moving mechanism 50. Staled differently, the nozzle-moving mechanism 50 and the cutting unit 7 are supported by a common support. As a result, the nozzle 20 and the cutting unit 7 can be moved freely in triaxial directions by the nozzle-moving mechanism 50. Since the electrospinning device 100D includes both the manufacturing unit for manufacturing the nanofiber sheet 10 and the cutting unit for cutting the nanofiber sheet 10 into a predetermined contour shape within the same nozzle-moving mechanism 50, the entire device can be made even more compact.

Next, material liquids that may be used in nanofiber sheet manufacturing methods using the aforementioned electrospinning devices will be described.

For the material liquid, it is possible to use a solution or dispersion in which a fiber-formable polymer compound has been dissolved or dispersed in a solvent. For the fiber-formable polymer compound, it is possible to use any of the aforementioned polymer compounds for the nanofibers.

In addition to the aforementioned polymer compounds, the material liquid may include, for example, inorganic particles, organic particles, plant extracts, surfactants, oily agents, electrolytes for adjusting ion concentration, and the like, as appropriate.

Examples of solvents for the material liquid may include water, methanol, ethanol, 1-propanol, 2-propanol, bexafluoroisopropanol, 1-butanol, isobutyl alcohol, 2-butanol, 2-methyl-2-propanol, tetraethylene glycol, triethylene glycol, dibenzyl alcohol, 1,3-dioxolane, 1,4-dioxane, methyl ethyl ketone, methyl isobutyl ketone, methyl-n-hexyl ketone, methyl-n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, dimethyl phthalate, diethyl phthalate, dipropyl phthalate, methyl chloride, ethyl chloride, methylene chloride, chloroform, o-chlorotoluene, p-chlorotoluene, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylene, p-xylene, m-xylene, acetonitrile, tetrahydrofuran, N,N-dimethylformamide, and pyridine. The aforementioned solvent may be used singly, or a plurality of solvents may be used as a mixture.

The aforementioned nanofiber layer 11 is layered on a sheet-like article, which becomes the substrate layer 12, either directly or with an adhesive layer interposed therebetween. The nanofiber layer 11 and the substrate layer 12 may be integrated, for example, by fixing, such as adhesion using an adhesive, compression-bonding, joining by ultrasonic sealing, fusion-bonding by a laser, or thermal fusion-bonding by heat sealing. In cases where the nanofiber sheet includes an adhesive layer, at least one, or both, of the nanofiber layer 11 and the substrate layer 12, as well as the substrate layer 12 and the adhesive layer, may be integrated by the aforementioned fixing.

The aforementioned nanofiber sheet may be manufactured by forming a gradation region G in which the deposition amount of fibers F gradually increases by changing the spinning direction of the fibers F, without moving the nozzle 20 or the counter electrode 30. For example, the nozzle 20 may be provided with an airflow jetting unit for jetting an airflow, and the fibers F may be deposited while blowing the airflow onto the fibers F such that the fibers F are deposited at desired positions.

The foregoing description relates to producing nanofibers by electrospinning and manufacturing nanofiber sheets by depositing the nanofibers on one surface of a substrate layer. The present invention, however, is applicable to fibers other than nanofibers, such as fibers thicker than nanofibers. Further, the present invention is also applicable to particles produced by electrostatic spraying and collected by a collecting unit.

More specifically, the present invention encompasses laminate sheets, including: a substrate layer; and an ultrathin sheet located on one surface of the substrate layer. Preferably, the ultrathin sheet is made from a deposit of fibers or particles. Stated differently, the ultrathin sheet is preferably a fiber sheet or a film-like sheet. The fibers or particles constituting the ultrathin sheet can be produced from a material liquid for the fibers or particles by ejecting the material liquid from a nozzle. In cases of producing fibers from a material liquid, the method therefor is not particularly limited, and for example, melt spinning may be employed.

The thickness of fibers produced from the material liquid is, for example, preferably 10 nm or greater, more preferably 0.1 µm or greater, even more preferably 0.3 µm or greater. The thickness of fibers produced from the material liquid is preferably 30 µm or less, more preferably 3 µm or less, even more preferably 1 µm or less. Particularly, the thickness of fibers produced from the material liquid is preferably from 10 nm to 30 µm, more preferably from 0.1 to 3 µm, even more preferably from 0.3 to 1 µm.

The materials of the fibers contained in the material liquid may be the same as the materials constituting the aforementioned nanofiber layer 11.

The particle size may preferably be, for example, 0.01 µm or greater, more preferably 0.1 µm or greater, even more preferably 1 µm or greater. The particle size may preferably be 200 µm or less, more preferably 100 µm or less, even more preferably 10 µm or less. Particularly, the particle size may preferably be from 0.01 to 200 µm, more preferably from 0.1 to 100 µm, even more preferably from 1 to 10 µm.

The size of the particles may be expressed in terms of volume cumulative particle diameter, $D_{50}$, at a cumulative volume of 50 vol %, as found by laser diffraction/scattering particle size distribution measurement.

The materials of the particles contained in the material liquid may be the same as the materials constituting nanofibers.

The ultrathin sheet may be constituted by a deposit of fibers or may be constituted by a deposit of particles, but in either case, the thickness thereof may preferably be 5.1 µm or greater, more preferably 10 µm or greater. The thickness of the ultrathin sheet may preferably be 500 µm or less, more preferably 400 µm or less. Particularly, the thickness of the ultrathin sheet may preferably be from 5.1 to 500 µm, more preferably from 10 to 400 µm.

In the laminate sheet, the substrate layer and the ultrathin sheet are layered in a peelable manner. Like the aforementioned nanofiber sheet 10, it is preferable that the laminate sheet includes an adhesive layer. Preferably, the adhesive layer is located between the substrate layer and the ultrathin sheet, or on a surface of the ultrathin sheet on the opposite side from the substrate layer.

Preferably, the ultrathin sheet has a contour shape corresponding to an application-target section to which the ultrathin sheet is to be applied. There is no particular limitation to the application-target section to which the ultrathin sheet is to be applied, and like the aforementioned nanofiber sheet 10, examples of application-target sections may include, although not limited to, surface portions of the human body (i.e., the skin), teeth, gums, or hair of a human being, the skin, teeth, or gums of a non-human mammal, or the surface of a plant such as the branches or leaves.

In cases where the ultrathin sheet is to be applied, for example, to a surface portion of the human body, it is preferable to form the ultrathin sheet into a contour shape corresponding to the usage, or a contour shape corresponding to the surface portion. For example, in cases where the ultrathin sheet is to be applied to a section below the eye, it is preferable to use an ultrathin sheet having an oval-shaped contour provided with a curved part in a portion thereof, as illustrated in FIG. 1, from the viewpoint of improving fittability. From the same viewpoint, in cases where the ultrathin sheet is to be applied to the cheek, it is preferable to use an ultrathin sheet having a triangular contour with rounded corners and/or with arc-shaped sides that bulge outward. From the same viewpoint, in cases where the ultrathin sheet is to be applied to the forehead, it is preferable to use an ultrathin sheet having a substantially elliptic contour. Further, for example, in cases of using the ultrathin sheet for uses to correct/conceal spots or moles on the surface of the human body or unevenly-colored spots on the skin, the shape of the ultrathin sheet may be circular, elliptic, rectangular with rounded corners, or a combination thereof.

Regardless of what kind of contour shape the ultrathin sheet has, it is preferable that the contour outline of the ultrathin sheet a shape wherein more than half the length, of the entire length of the contour outline, is constituted by a curve, from the viewpoint of improving fittability between the ultrathin sheet and the section to which the ultrathin sheet is to be applied. From the viewpoint of further enhancing this advantage, it is preferable that the contour outline of the ultrathin sheet is a shape wherein curvilinear sections occupy preferably at least 60%, more preferably at least 70%, even more preferably at least 80%, of the entire length of the contour outline, and it is further preferable that the entire contour outline of the ultrathin sheet is constituted by curves. The contour outline can be determined from the planar contour curve as described above in "Method for Measuring Thickness of Peripheral Edge."

The ultrathin sheet includes a tapered peripheral edge region having a thickness that gradually increases inward from the peripheral edge of the ultrathin sheet. "Tapered" refers to a cross-sectional shape of the peripheral edge region when the ultrathin sheet is viewed along its thickness direction. The "tapered peripheral edge region" is synonymous to the aforementioned "gradation region G."

Preferably, the tapered peripheral edge region is formed in a region that is within a width of 5 mm or less extending inward from the peripheral edge of the ultrathin sheet. The "width of the tapered peripheral edge region" is synonymous to the width W1 of the gradation region G in the aforementioned nanofiber sheet. The width of the tapered peripheral edge region may be the same at any position in the peripheral edge region, or may vary depending on the position. In cases where the width of the tapered peripheral edge region varies depending on the position, it is preferable that the minimum width is within 5 mm.

The ultrathin sheet includes an inner region surrounded by the tapered peripheral edge region in a position more inward than the peripheral edge region. The inner region is a region having a substantially constant thickness, in contrast to the peripheral edge region. The "thickness of the ultrathin sheet" refers to the thickness at the inner region. The thickness of the inner region—i.e., the thickness of the ultrathin sheet—is preferably 5.1 µm or greater, more preferably 10 µm or greater. The thickness of the ultrathin sheet is preferably 500 µm or less, more preferably 400 µm or less. Particularly, the thickness of the ultrathin sheet is preferably from 5.1 to 500 µm, more preferably from 10 to 400 µm.

As described above, the inner region is a region having a substantially constant thickness. Thus, the thickness of the inner region may slightly vary depending on the position. For example, it is permissible that the thickness varies within a range of around ±25% with respect to the average thickness.

In a cross section along the thickness direction of the ultrathin sheet, the width of the inner region is preferably 100 mm or less, more preferably 50 mm or less, even more preferably 30 mm or less. The minimum value of the width of the inner region is 0 mm; i.e., the inner region does not have to exist. The "width of the inner region" is synonymous to the "width W2 of the inner region M" in the aforementioned nanofiber sheet (see FIG. 2).

The thickness of the inner region and the thickness of the peripheral edge region of the ultrathin sheet can be measured according to the aforementioned "Method for Measuring Three-dimensional Shape of Nanofiber Layer". This measurement method is also applicable to the measurement of the thickness of the gradation region G and the thickness of the inner region M of the aforementioned nanofiber sheet.

Preferably, the substrate layer of the laminate sheet includes a region (also referred to as "extension region") that extends outward from the peripheral edge of the ultrathin sheet. This is the same as the configuration that, in the aforementioned nanofiber sheet 10, the substrate layer 12 includes a region that extends outward from the peripheral edge of the nanofiber layer 11, as illustrated in FIGS. 1 to 3. Providing the substrate layer of the laminate sheet with an extension region allows the ultrathin sheet to be peeled easily from the substrate layer.

The substrate layer of the laminate sheet may extend outward from the entire region of the ultrathin sheet's peripheral edge, or may extend outward from a portion of the peripheral edge. In either case, the degree of extension of the extension region may vary depending on the position, or may be the same. In cases where the substrate layer extends outward from the entire region of the ultrathin sheet's peripheral edge and the degree of extension of the extension region is the same regardless of position, then the contour shape of the substrate layer will have a substantially similar shape to the contour shape of the ultrathin sheet. Making the contour shapes of the substrate layer and the ultrathin sheet similar to one another is advantageous as follows. The ultrathin sheet is extremely thin, and may thus be difficult to observe with the eyes. In contrast, the substrate layer is easily observable with the eyes; so, forming the contour shape of the ultrathin sheet substantially similar to the contour shape of the substrate layer can facilitate recognition of the presence of the ultrathin sheet and also facilitate peeling from the substrate sheet through visual recognition of the contour shape of the substrate layer.

The present invention is applicable to an ultrathin sheet manufacturing method for manufacturing an ultrathin sheet having a thickness from 5.1 to 500 µm by ejecting a material liquid from a nozzle and depositing, onto a collecting unit, fibers or particles produced from the material liquid.

The present invention is also applicable to an ultrathin sheet manufacturing method for manufacturing an ultrathin sheet having a thickness from 5.1 to 500 µm by ejecting a material liquid from a nozzle and depositing, onto a substrate on a collecting unit, particles produced from the material liquid.

The description given above regarding fibers or particles produced from a material liquid is applicable as appropriate to these ultrathin sheet manufacturing methods. Also, the description given above about the ultrathin sheet is applicable as appropriate to ultrathin sheets obtained by these manufacturing methods.

The ultrathin sheet manufacturing method includes an intended-shape forming step. Like the aforementioned nanofiber sheet manufacturing method, in the intended-shape forming step, based on information relating to an intended contour shape of the ultrathin sheet, the material liquid is ejected within a range of the contour shape of the ultrathin sheet while moving at least either the nozzle or the collecting unit. The positional relationship between the nozzle and the collecting unit may be, for example, the same as that in the embodiment illustrated in FIG. 9. The drive mechanism for the nozzle and the collecting unit may also be the same as that in the embodiment illustrated in FIG. 9.

In the intended-shape forming step, the material liquid is ejected so as to form a tapered peripheral edge region having a thickness that gradually increases inward from a peripheral edge of the contour shape of the intended ultrathin sheet. Herein, "tapered" refers to the cross-sectional shape of the peripheral edge region when the ultrathin sheet is viewed along its thickness direction. The "tapered peripheral edge region" is synonymous to the aforementioned "gradation region G", and thus the description given above is applicable as appropriate.

The present invention has been described above according to preferred embodiments thereof, but the present invention is not limited to the foregoing embodiments and can be modified as appropriate.

For example, in the electrospinning device 100 according to the foregoing embodiment, the collecting unit 40 serves also as the counter electrode 30; however, the collecting unit 40 and the counter electrode 30 may be separate members. In this case, the collecting unit 40 and the counter electrode 30 may be arranged adjacent to one another.

In the foregoing embodiments, the nanofiber sheet 10 includes a substrate layer 12; however, the substrate layer 12 does not have to be provided.

In the foregoing embodiments, the factors relating to the deposition distribution of nanofibers employed in the path calculation step are the movement speed of the nozzle 20, the ejection speed of the material liquid, and the distance between the nozzle 20 and the collecting unit 40; instead, other factors may be employed, or the aforementioned factors may be employed in combination with other factors.

In the foregoing embodiments of the electrospinning device, the slider 51, serving as the mounting unit for the nozzle 20 or the cartridge unit 1, is mounted to a biaxial movement mechanism; instead, it may be mounted to an at-least uniaxial movement mechanism. Similarly, the collecting unit 40 and the slider 71 may be mounted to an at-least uniaxial movement mechanism.

In the foregoing embodiments, the base 90 in each device is constituted by a single member, instead, the base may be made of two or more members connected by an optional connection means or fastening means, and may be used as a substantially single member.

In the foregoing embodiments, each device includes a nozzle-moving mechanism 50; instead, the nozzle 20, or the cartridge unit 1 including the same, may be immovably fixed to another support within the device, without using a nozzle-moving mechanism 50. A device according to such an embodiment will require at least a collecting unit-moving mechanism 80. An example of a device in which the nozzle 20 is immovably fixed may include a base 90 located in opposition to the nozzle 20, a collecting unit-moving mechanism 80 placed in a central portion of the base 90, and a cutting unit-moving mechanism 70 located in a peripheral edge portion of the base 90, wherein the collecting unit-moving mechanism 80 and the cutting unit-moving mechanism 70 are supported by the base 90 serving as a common support. This device will also be extremely compact as a whole. Another example of a device in which the nozzle 20 is immovably fixed may include a base 90 located in opposition to the nozzle 20, a collecting unit-moving mechanism 80 placed in a central portion of the base 90, and a cutting unit 7 immovably fixed to a support column provided so as to stand in a peripheral edge portion of the base 90, wherein the collecting unit-moving mechanism 80 and the cutting unit 7 are supported by the base 90 serving as a common support.

The electrospinning device 100A according to the embodiment illustrated in FIG. 16 and the electrospinning device 100C according to the embodiment illustrated in FIG. 20 include a collecting unit-moving mechanism 80 placed in a central portion of the base 90, and a nozzle-moving mechanism 50 and a cutting unit-moving mechanism 70 arranged at peripheral edge portions of the base 90 in opposition to one another. Instead, the electrospinning device may include a nozzle-moving mechanism 50 but may lack a collecting unit-moving mechanism 80, and a collecting unit 40 may be fixed in a central portion of the base 90. Alternatively, the electrospinning device may be configured including a collecting unit-moving mechanism 80 but lacking a cutting unit-moving mechanism 70, and a cutting unit 7 may be fixed to a support column provided so as to stand in a peripheral edge portion of the base 90. Even in these devices, the nozzle-moving mechanism 50 and the cutting unit 7 are supported by the base 90, which serves as a common support, and thus, the entire device will be extremely compact.

The electrospinning device 100B according to the embodiment illustrated in FIG. 17 and the electrospinning device 100D according to the embodiment illustrated in FIG. 21 include a collecting unit-moving mechanism 80 placed in a central portion of the base 90, and a nozzle-moving mechanism 50 arranged in a peripheral edge portion of the base 90, wherein a nozzle 20, or a cartridge unit 1 including the same, and a cutting unit 7 are mounted to the nozzle-moving mechanism 50. Instead, the electrospinning device may include a nozzle-moving mechanism 50 but may lack a collecting unit-moving mechanism 80, and a collecting unit 40 may be fixed in a central portion of the base 90. Even in this device, the nozzle 20 and the cutting unit 7 are supported by the nozzle-moving mechanism 50, which serves as a common support, and thus, the entire device will be extremely compact. Further, the electrospinning device may be configured including a collecting unit-moving mechanism 80 but lacking a cutting unit-moving mechanism 70, and a nozzle 20 and a cutting unit 7 may be fixed to a support column provided so as to stand in a peripheral edge portion of the base 90. Even in this device, the nozzle-moving mechanism 50 and the cutting unit 7 are supported by the base 90, which serves as a common support, and thus, the entire device will be extremely compact.

The electrospinning devices according to the foregoing embodiments include a voltage application unit 32 serving as a power supply configured to apply a voltage to the nozzle 20. Instead, the electrospinning device may include a material jetting unit provided with a nozzle, a counter electrode located in opposition to the nozzle and having a concave-curved surface configured to create an electric field between it and the nozzle, and a voltage-generating unit serving as a power supply configured to apply a voltage between the nozzle and the counter electrode, as disclosed in JP 2017-31517A. According to the device disclosed in this publication, nanofibers can be deposited on a substrate layer arranged on a collecting unit while blowing an airflow toward the collecting unit.

In relation to the foregoing embodiments, the present invention further discloses the following nanofiber sheets, methods for using the same, methods for manufacturing the same, and nanofiber sheet manufacturing devices.

{1}

A nanofiber sheet comprising:

a substrate layer; and a nanofiber layer located on one surface side of the substrate layer and containing nanofibers of a polymer compound, wherein:

a peripheral edge of the nanofiber layer has a thickness of from 0.1 to 10 μm; and the nanofiber layer includes at least 3 mm of a gradation region having a thickness that gradually increases inward from the peripheral edge.

{2}

A laminate sheet comprising, a substrate layer; and an ultrathin sheet located on one surface of the substrate layer and having a thickness of from 5.1 to 500 μm, wherein:

the ultrathin sheet has a contour shape corresponding to an application-target section to which the ultrathin sheet is to be applied;

the ultrathin sheet includes a tapered peripheral edge region having a thickness that gradually increases inward from a peripheral edge of the ultrathin sheet; and the substrate layer includes a region that extends outward from the peripheral edge of the ultrathin sheet.

{3}
The nanofiber sheet as set forth in clause {1} or the laminate sheet as set forth in clause {2}, wherein the thickness of the peripheral edge is 0.3 µm or greater, preferably 0.5 µm or greater, and 9 µm or less, preferably 8 µm or less, and from 0.3 to 9 µm, preferably from 0.5 to 8 µm.

{4}
The nanofiber sheet or the laminate sheet as set forth in any one of clauses {1} to {3}, wherein thickness D3 of a maximum thickness portion, which is the inner end of the gradation region or the tapered peripheral edge region, is 5.1 µm or greater, preferably 10 µm or greater, and 500 µm or less, preferably 400 µm or less, and from 5.1 to 500 µm, preferably from 10 to 400 µm.

{5}
The nanofiber sheet or the laminate sheet as set forth in any one of clauses {1} to {4}, wherein an inclination angle of the gradation region or the tapered peripheral edge region is 0.001° or greater, preferably 0.002° or greater, and 10° or less, preferably 8° or less, and from 0.001° to 10°, preferably from 0.002° to 8°.

{6}
The nanofiber sheet or the laminate sheet as set forth in any one of clauses {1} to {5}, wherein a difference in thickness between the peripheral edge and the inner end of the gradation region or the tapered peripheral edge region is 5 µm or greater.

{7}
The nanofiber sheet or the laminate sheet as set forth in any one of clauses {1} to {6}, wherein a difference in thickness between the peripheral edge and a maximum thickness portion, which is the inner end of the gradation region or the tapered peripheral edge region, is 5 µm or greater, preferably 10 µm or greater, and 500 µm or less, preferably 400 µm or less, and from 5 to 500 µm, preferably from 10 to 400 µm.

{8}
The nanofiber sheet or the laminate sheet as set forth in any one of clauses {1} to {7}, wherein a ratio (D3/D1) of thickness D3 of the maximum thickness portion, which is the inner end of the gradation region or the tapered peripheral edge region, to thickness D1 of the peripheral edge is 50 or greater, preferably 100 or greater, and 5000 or less, preferably 4000 or less, and from 50 to 5000, preferably from 100 to 4000.

{9}
The nanofiber sheet or the laminate sheet as set forth in any one of clauses {1} to {8}, wherein a planar-view shape of the nanofiber layer or the ultrathin sheet is
a shape including, in its contour, a plurality of curvilinear sections having different curvatures,
a shape including, in its contour, a plurality of rectilinear sections, or
a shape including, in its contour, both the curvilinear sections and the rectilinear sections.

{10}
The nanofiber sheet or the laminate sheet as set forth in any one of clauses {1} to {9}, wherein:
the nanofiber layer or the ultrathin sheet is located adjacent to the substrate layer; and
the substrate layer has air permeability.

{11}
The nanofiber sheet or the laminate sheet as set forth in any one of clauses {1} to {10}, wherein the substrate layer is a nonwoven fabric.

{12}
The nanofiber sheet or the laminate sheet as set forth in any one of clauses {1} to {10}, wherein the substrate layer is a sponge.

{13}
The nanofiber sheet or the laminate sheet as set forth in any one of clauses {1} to {12}, wherein:
the nanofiber layer or the ultrathin sheet is located adjacent to the substrate layer; and
the substrate layer has, on a surface facing the nanofiber layer or the ultrathin sheet, a plurality of depressions or projections each having a width greater than a fiber diameter of the nanofiber.

{14}
The nanofiber sheet or the laminate sheet as set forth in any one of clauses {1} to {13}, wherein the nanofiber layer or the ultrathin sheet is water-insoluble.

{15}
The nanofiber sheet or the laminate sheet as set forth in clause {14}, wherein:
the content of a water-insoluble polymer compound contained in the nanofiber layer or the ultrathin sheet is more than 50 mass %, preferably 80 mass % or greater; and
the content of a water-soluble polymer compound contained in the nanofiber layer or the ultrathin sheet is preferably less than 50 mass %, more preferably 20 mass % or less.

{16}
The nanofiber sheet or the laminate sheet as set forth in any one of clauses {1} to {15}, wherein:
the nanofiber layer or the ultrathin sheet contains another component in addition to the nanofibers;
the content of the nanofibers in the nanofiber layer or the ultrathin sheet is from 40 to 95 mass %, preferably from 70 to 90 mass %; and
the content of the other component in the nanofiber layer or the ultrathin sheet is from 5 to 60 mass %, preferably from 10 to 30 mass %.

{17}
The nanofiber sheet or the laminate sheet as set forth in any one of clauses {1} to {16}, wherein:
the nanofiber layer or the ultrathin sheet includes an inner region surrounded by the gradation region or the tapered peripheral edge region;
the inner region includes a depression; and
the thickness at the depression of the inner region, with respect to the thickness at the maximum thickness portion, is 50% or greater, preferably 60% or greater, and 100% or less, preferably 90% or less, and from 50 to 100%, preferably from 60 to 90%.

{18}
The nanofiber sheet or the laminate sheet as set forth in clause {17}, wherein the thickness at the depression of the inner region is 5.1 µm or greater, preferably 10 µm or greater, and 500 µm or less, preferably 400 µm or less, and from 5.1 to 500 µm, preferably from 10 to 400 µm.

{19}
The nanofiber sheet or the laminate sheet as set forth in clause {17} or {18}, wherein:
the inner region includes, as the depressions,
a shallow depression forming a section having a greater thickness than the maximum thickness portion, which is the inner end of the gradation region or the tapered peripheral edge region, and a deep depression forming a section having a smaller thickness than the maximum thickness portion; and the thickness at the shallow depression of the inner region is 5.1 μm or greater, preferably 10 μm or greater, and 500 μm or less, preferably 400 μm or less, and from 5.1 to 500 μm, preferably from 10 to 400 μm.

{20}

The nanofiber sheet or the laminate sheet as set forth in clause {19}, wherein the thickness at the deep depression is 5.1 μm or greater, preferably 10 μm or greater, and 500 μm or less, more preferably 400 μm or less, and from 5.1 to 500 μm, more preferably from 10 to 400 μm.

{21}

The nanofiber sheet or the laminate sheet as set forth in any one of clauses {1} to {20}, further comprising an adhesive layer adherable to a surface of an object, wherein the adhesive layer is located between the substrate layer and the nanofiber layer or the ultrathin sheet, or on a surface of the nanofiber layer or the ultrathin sheet on an opposite side from the substrate layer.

{22}

The laminate sheet as set forth in any one of clauses {2} to {21}, wherein the ultrathin sheet is formed by a nanofiber layer containing nanofibers of a polymer compound.

{23}

The laminate sheet as set forth in any one of clauses {2} to {22}, wherein the thickness of the peripheral edge of the ultrathin sheet is from 0.1 to 10 μm.

{24}

The laminate sheet as set forth in any one of clauses {2} to {23}, wherein the tapered peripheral edge region is formed in a region that is within a width of 5 mm or less extending inward from the peripheral edge of the ultrathin sheet.

{25}

The laminate sheet as set forth in any one of clauses {2} to {24}, wherein a contour outline of the ultrathin sheet is a shape wherein more than half the length, of an entire length of the contour outline, is constituted by a curve.

{26}

A method for using the nanofiber sheet or the laminate sheet as set forth in any one of clauses {1} to {25}, comprising placing the nanofiber layer or the ultrathin sheet in contact with a surface of an object, and using the nanofiber layer or the ultrathin sheet in a moistened state.

{27}

The method for using the nanofiber sheet or the laminate sheet as set forth in clause {26}, comprising making the nanofiber layer or the ultrathin sheet adhere to the object's surface in a state where the object's surface is moistened.

{28}

The method for using the nanofiber sheet or the laminate sheet as set forth in clause {26}, comprising moistening the nanofiber layer or the ultrathin sheet in a state where the nanofiber layer or the ultrathin sheet is adhering to the object's surface.

{29}

The method for using the nanofiber sheet or the laminate sheet as set forth in clause {26}, comprising making the nanofiber layer or the ultrathin sheet adhere to the object's surface in a state where the nanofiber layer or the ultrathin sheet is moistened.

{30}

A method for manufacturing a nanofiber sheet or a laminate sheet, comprising ejecting a material liquid from a nozzle while applying a high voltage between the nozzle and a counter electrode, and depositing, onto a collecting unit, nanofibers produced from the material liquid by electrospinning, wherein a predetermined nanofiber sheet or laminate sheet including a gradation region or tapered peripheral edge region having a thickness that gradually increases inward from a peripheral edge is manufactured by depositing the nanofibers onto the collecting unit by moving at least either the nozzle or the collecting unit.

{31}

The method for manufacturing a nanofiber sheet or a laminate sheet as set forth in clause {30}, comprising:

a path calculation step of determining a movement path for at least either the nozzle or the collecting unit along which the predetermined nanofiber sheet or laminate sheet can be formed, the determining being based on a correlation between a factor relating to deposition distribution of the nanofibers and a deposition thickness of the nanofibers; and a deposition step of depositing the nanofibers, while moving at least either the nozzle or the collecting unit, in accordance with the movement path determined in the path calculation step.

{32}

The method for manufacturing a nanofiber sheet or a laminate sheet as set forth in clause {31}, wherein the factor relating to deposition distribution of the nanofibers is one factor, or a combination of two or more factors, selected from the group consisting of a movement speed of the nozzle or the collecting unit, an ejection speed of the material liquid, a potential difference between the nozzle and the counter electrode, a distance between the nozzle and the collecting unit, an inner diameter of the nozzle, and a material of the nozzle.

{33}

The method for manufacturing a nanofiber sheet or a laminate sheet as set forth in clause {31} or {32}, wherein.

in a planar view, the predetermined nanofiber sheet or laminate sheet includes an inner region surrounded by the gradation region; and in the path calculation step, the movement path is calculated such that a minimum thickness of the inner region is equal to or greater than a predetermined setting value.

{34}

The method for manufacturing a nanofiber sheet or a laminate sheet as set forth in any one of clauses {31} to {33}, wherein the deposition step of depositing the nanofibers on the collecting unit while moving at least either the nozzle or the collecting unit comprises:

a first step of moving either one of the nozzle or the collecting unit along a first movement path such that a deposited portion of the nanofibers forms a continuous first deposition region; and at least one second step of moving either one of the nozzle or the collecting unit along a second movement path such that the deposited portion of the nanofibers forms a second continuous deposition region having a portion, in a width direction, that continuously overlaps a portion, in the width direction, of the first continuous deposition region or of a previously-formed continuous deposition region.

{35}

The method for manufacturing a nanofiber sheet or a laminate sheet as set forth in clause {34}, wherein, when a position that bisects the widthwise length of the continuous deposition region is defined as a midpoint of said continuous region, and a region where said continuous deposition region and another continuous deposition region overlap one another is defined as an overlap region, the overlap region is located between, in the width direction, the midpoint of said continuous deposition region and an outer edge of said continuous deposition region located on the side of the other continuous deposition region.

{36}

The method for manufacturing a nanofiber sheet or a laminate sheet as set forth in clause {35}, wherein, in the width direction, the midpoint of said continuous deposition region and a midpoint of said other continuous deposition region are both located within the range of the overlap region.

{37}

The method for manufacturing a nanofiber sheet or a laminate sheet as set forth in any one of clauses {34} to {36}, wherein, when a previously-determined movement path is defined as a determined path and a region surrounded by the first movement path or a region surrounded by the determined path is defined as a determined-path inner region, the path calculation step calculates, within the determined-path inner region, a circulating similar path, which is substantially similar to the planar-view shape of the deposit of nanofibers, or a non-circulating path.

{38}

The method for manufacturing a nanofiber sheet or a laminate sheet as set forth in clause {37}, wherein the path calculation step calculates said similar path or said non-circulating path depending on the area and/or shape of a range in which the movement path is to be set.

{39}

The method for manufacturing a nanofiber sheet or a laminate sheet as set forth in clause {37} or {38}, wherein, in the path calculation step, assessment is made as to whether or not said similar path can be arranged in a manner such that mutually corresponding sections in said determined path and said similar path are adjoined adjacent to one another.

{40}

The method for manufacturing a nanofiber sheet or a laminate sheet as set forth in any one of clauses {30} to {39}, wherein the nozzle and/or the collecting unit are/is moved at a constant speed.

{41}

The method for manufacturing a nanofiber sheet or a laminate sheet as set forth in any one of clauses {30} to {40}, wherein the movement path along which either one of the nozzle or the collecting unit moves is a combination of a path group that includes, in a nested manner, a plurality of paths substantially similar to one another, and a crossover line that connects the plurality of paths, or a linear shape that can be rendered in one stroke.

{42}

The method for manufacturing a nanofiber sheet or a laminate sheet as set forth in any one of clauses {30} to {41}, wherein a planar-view shape of the nanofiber sheet or the laminate sheet is a shape including, in its contour, a plurality of curvilinear sections having different curvatures, a shape including, in its contour, a plurality of rectilinear sections, or a shape including, in its contour, both the curvilinear sections and the rectilinear sections.

{43}

The method for manufacturing a nanofiber sheet or a laminate sheet as set forth in any one of clauses {30} to {42}, comprising:

arranging a substrate layer on the collecting unit; and depositing the nanofibers on the substrate layer.

{44}

The method for manufacturing a nanofiber sheet or a laminate sheet as set forth in clause {43}, comprising a cutting step of cutting the nanofiber sheet, the substrate layer, or both the nanofiber sheet and the substrate layer, or cutting the laminate sheet, the substrate layer, or both the laminate sheet and the substrate layer.

{45}

The method for manufacturing a nanofiber sheet or a laminate sheet as set forth in any one of clauses {34} to {39}, wherein:

in a planar view, the predetermined nanofiber sheet or laminate sheet includes an inner region surrounded by the gradation region; and when a region in which the continuous deposition region and another continuous deposition region overlap one another is defined as an overlap region, the minimum thickness of the overlap region in the width direction with respect to the minimum thickness of the inner region is 100% or greater, preferably 125% or greater, and 250% or less, preferably 200% or less, and from 100 to 250%, preferably from 125 to 200%.

{46}

The method for manufacturing a nanofiber sheet or a laminate sheet as set forth in clause {45}, wherein the minimum thickness of the overlap region is 0.2 µm or greater, preferably 1 µm or greater, and 100 µm or less, preferably 10 µm or less, and from 0.2 to 100 µm, preferably from 1 to 10 µm.

{47}

The method for manufacturing a nanofiber sheet or a laminate sheet as set forth in clause {45} or {46}, wherein the overlap region's width with respect to the separation distance, in the width direction, between the midpoint of one deposition region and the midpoint of another deposition region is 1% or greater, preferably 5% or greater, and 90% or less, preferably 80% or less, and from 1 to 90%, preferably from 5 to 80%.

{48}

The method for manufacturing a nanofiber sheet or a laminate sheet as set forth in any one of clauses {45} to {47}, wherein the overlap region's width in the width direction is 1 mm or greater, preferably 4 mm or greater, and 80 mm or less, preferably 60 mm or less, and from 1 to 80 mm, preferably from 4 to 60 mm.

{49}

A device for manufacturing a nanofiber sheet or a laminate sheet, comprising:
- a nozzle configured to eject a material liquid;
- a counter electrode located in opposition to the nozzle and configured to create an electric field between the nozzle and the counter electrode;
- a collecting unit configured to collect nanofibers produced by electrically stretching the material liquid; and
- a mechanism configured to move at least either the nozzle or the collecting unit, wherein:
- the manufacturing device is configured to be capable of depositing the nanofibers onto the collecting unit while moving at least either the nozzle or the collecting unit based on data of a movement path inputted to a control unit; and
- data on the movement path determined in the path calculation step of the method for manufacturing a nanofiber sheet or laminate sheet as set forth in clause {31} is inputted or is inputtable to the control unit.

{50}

A device for manufacturing a nanofiber sheet or a laminate sheet, comprising:
- a nozzle configured to eject a material liquid;
- a power supply configured to apply a voltage to the nozzle, or
- a counter electrode located in opposition to the nozzle and configured to create an electric field between the nozzle and the counter electrode, and a power supply configured to apply a voltage between the nozzle and the counter electrode;
- a collecting unit for depositing nanofibers produced from the material liquid;
- a nozzle-moving mechanism configured to move the nozzle relative to the collecting unit; and
- a cutting unit configured to cut the laminate sheet or the nanofiber sheet, including a layer of the nanofibers deposited on the collecting unit, into a predetermined shape, wherein
- the nozzle-moving mechanism and the cutting unit are supported by a common support.

{51}

The manufacturing device as set forth in clause {50}, wherein the cutting unit is provided to the nozzle-moving mechanism, and thereby, the nozzle-moving mechanism and the cutting unit are supported by the common support.

{52}

The manufacturing device as set forth in clause {50}, further comprising a cutting unit-moving mechanism configured to move the cutting unit relative to the collecting unit, wherein the cutting unit-moving mechanism is supported by the support and thereby the cutting unit and the nozzle-moving mechanism are supported by the common support.

{53}

The manufacturing device as set forth in any one of clauses {50} to {52}, further comprising a collecting unit-moving mechanism configured to move the collecting unit within its collecting plane, the collecting unit-moving mechanism being supported by the support.

{54}

A device for manufacturing a nanofiber sheet or a laminate sheet, comprising:
- a nozzle configured to eject a material liquid;
- a power supply configured to apply a voltage to the nozzle, or
- a counter electrode located in opposition to the nozzle and configured to create an electric field between the nozzle and the counter electrode, and a power supply configured to apply a voltage between the nozzle and the counter electrode;
- a collecting unit for depositing nanofibers produced from the material liquid;
- a collecting unit-moving mechanism configured to move the collecting unit relative to the nozzle; and
- a cutting unit configured to cut the laminate sheet or the nanofiber sheet, including a layer of the nanofibers deposited on the collecting unit, into a predetermined shape, wherein
- the collecting unit-moving mechanism and the cutting unit are supported by a common support.

{55}

The manufacturing device as set forth in clause {54}, further comprising a cutting unit-moving mechanism configured to move the cutting unit relative to the collecting unit, wherein the cutting unit-moving mechanism is supported by the support and thereby the cutting unit and the collecting unit-moving mechanism are supported by the common support.

{56}

The manufacturing device as set forth in any one of clauses {50} to {55}, wherein the cutting unit is a laser processing machine.

{57}

The manufacturing device as set forth in any one of clauses {50} to {56}, wherein the collecting unit is air-permeable.

{58}

The manufacturing device as set forth in any one of clauses {50} to {57}, wherein: the entire manufacturing device is covered by a cover having a transparent section in at least a portion thereof; and
- the transparent section is constituted by acrylic resin, polycarbonate resin, or glass.

{59}

The manufacturing device as set forth in any one of clauses {50} to {58}, further comprising a dust collection/deodorization mechanism.

{60}

The manufacturing device as set forth in any one of clauses {50} to {59}, wherein:
- the nanofiber sheet or laminate sheet includes a layer of the nanofibers, and a substrate layer supporting the layer; and
- the cutting unit is configured to cut only the layer of nanofibers, or cut only the substrate layer, or cut the entire nanofiber sheet or laminate sheet.

{61}

A device for manufacturing a nanofiber sheet or a laminate sheet, comprising:
- a cartridge unit that includes a housing portion capable of housing a material liquid, a nozzle configured to eject the material liquid, and a supplying portion configured to supply the material liquid from the housing portion to the nozzle;
- a power supply configured to apply a voltage to the nozzle, or
- a counter electrode located in opposition to the nozzle and configured to create an electric field between the nozzle and the counter electrode, and a power supply configured to apply a voltage between the nozzle and the counter electrode;

a mounting unit for the cartridge unit; and a collecting unit configured to collect nanofibers produced by electrically stretching the material liquid, wherein:

the cartridge unit is detachably mounted to the mounting unit; and the mounting unit is provided with a drive source configured to drive the supplying portion of the cartridge unit in a state where the cartridge unit is mounted to the mounting unit.

{62}

A device for manufacturing a nanofiber sheet or a laminate sheet, comprising:

a cartridge unit that includes a housing portion capable of housing a material liquid, a nozzle configured to eject the material liquid, and a supplying portion configured to supply the material liquid from the housing portion to the nozzle;

a power supply configured to apply a voltage to the nozzle, or a counter electrode located in opposition to the nozzle and configured to create an electric field between the nozzle and the counter electrode, and a power supply configured to apply a voltage between the nozzle and the counter electrode;

a mounting unit for the cartridge unit; and a collecting unit configured to collect nanofibers produced by electrically stretching the material liquid, wherein:

the mounting unit is provided with a drive source configured to drive the supplying portion of the cartridge unit in a state where the cartridge unit is mounted to the mounting unit; and in the cartridge unit, the housing portion is detachably mounted to the supplying portion.

{63}

The manufacturing device as set forth in clause {61} or {62}, wherein, in the cartridge unit, the housing portion is detachably mounted to the supplying portion.

{64}

The manufacturing device as set forth in any one of clauses {61} to {63}, wherein the mounting unit is constituted by an at-least uniaxial movement mechanism.

{65}

The manufacturing device as set forth in any one of clauses {61} to {64}, wherein the collecting unit comprises an at-least uniaxial movement mechanism.

{66}

The manufacturing device as set forth in any one of clauses {61} to {65}, wherein the cartridge unit is mounted to the mounting unit in an electrically insulated state.

{67}

The manufacturing device as set forth in any one of clauses {61} to {66}, wherein the mounting unit, the collecting unit, and the power supply are supported by a common support.

{68}

The manufacturing device as set forth in any one of clauses {61} to {67}, wherein, in the cartridge unit, the housing portion, the supplying portion, and the nozzle are directly connected.

{69}

An ultrathin sheet manufacturing method for manufacturing an ultrathin sheet having a thickness from 5.1 to 500 μm by ejecting a material liquid from a nozzle and depositing, onto a collecting unit, fibers or particles produced from the material liquid, the method comprising an intended-shape forming step of ejecting, based on information relating to an intended contour shape of the ultrathin sheet, the material liquid within a range of the contour shape of the ultrathin sheet while moving at least either the nozzle or the collecting unit, wherein, in the intended-shape forming step, the material liquid is ejected so as to form a tapered peripheral edge region having a width of 5 mm or less and having a thickness that gradually increases inward from a peripheral edge of the contour shape.

EXAMPLES

The present invention will be described in further detail below according to examples. The scope of the present invention, however, is not limited to the following examples. Unless specifically stated otherwise, refers to "mass % (percent by mass)".

Examples 1 to 9

A nanofiber layer having a planar-view shape, in which a plurality of curvilinear sections with different curvatures form projections and depressions as illustrated in FIG. 1, was manufactured such that the width of the gradation region was 3 mm or greater, or 4 mm or greater. The nanofiber layer had a maximum length of 30 mm in its planar-view shape. More specifically, a nanofiber layer constituted by nanofibers made from polyvinyl butyral (PVB; S-LEC B BM-1 from Sekisui Chemical Co., Ltd.) was formed according to the aforementioned manufacturing method. The thickness of the nanofibers was 100 nm. The nanofiber layer was formed by an electrospinning method, using a material liquid containing 12% of PVB, 61.25% of ethanol, 26.25% of 1-butanol, and 0.5% of a quaternary salt-type surfactant (product name "Sanisol C" from Kao Corporation). The conditions for executing the electrospinning method were as follows: voltage: 30 kV; separation distance between the nozzle tip and the counter electrode: 200 mm; ejection amount: 1 ml/h. Deposition of fibers by electrospinning was performed by moving the nozzle in the planar direction. For the obtained nanofiber layer, the thickness D1 of the peripheral edge of the nanofiber layer, the width W1 of the gradation region, and the thickness D3 of the maximum thickness portion 15 were measured according to the aforementioned measurement methods. The inclination angle θ was calculated from the difference D2 in thickness between the peripheral edge 17 of the gradation region G and the maximum thickness portion 15, and the width W1 of the gradation region G. The measurement results and calculation results are shown in Table 1 below. According to visual observation, in each of the nanofiber layers in Examples 1 to 5, the width W1 of the gradation region was the same over the entire region of the nanofiber layer. According to visual observation, also in each of the nanofiber layers in Examples 6 to 9, the width W1 of the gradation region was the same over the entire region of the nanofiber layer. In all of the Examples, each nanofiber layer had a shape wherein the percentage (%), with respect to the entire length of the planar-view contour outline, occupied by sections constituted by curves was 100%. Stated differently, each nanofiber layer had a shape wherein the entire length of the contour outline in a planar view was constituted by curves.

Comparative Examples 1 and 2

A nanofiber layer was formed by an electrospinning method according to similar conditions as Example 1, except that: a material liquid containing 12% of PVB and 88.0% of ethanol was used; the thickness of the peripheral edge of the nanofiber layer was set to either 12 μm or 15 μm; and the thickness D3 of the maximum thickness portion of the gradation region G was set to either 15 μm or 20 μm. The thickness of the nanofibers was 500 nm. The measurement results are shown in Table 1 below.

Evaluation:

For each of the nanofiber layers obtained according to the Examples and Comparative Examples, the visual recognizability of the nanofiber layer in a state attached to the skin and the appearance of the nanofiber layer applied with a foundation were evaluated according to the following methods. The evaluation results are shown in Table 1 below.

Visual Recognizability of Nanofiber Layer:

The inner side of the upper arm of a subject was moistened by applying 5 mL/cm$^2$ of a cosmetic serum (product name "Rise Lotion II (non-greasy)" from Kao Corporation). The first surface—i.e., the protruding surface—of the nanofiber layer was attached to that section. Then, the attached nanofiber layer was visually observed, to evaluate the visual recognizability according to the following criteria. The evaluation results are shown in Table 1.

A: The entire nanofiber layer is highly transparent, and quality is excellent in terms that the nanofiber layer is hard to visually recognize.

B: The nanofiber layer's peripheral edge is transparent, and quality is good in terms that the nanofiber layer is hard to visually recognize.

C: The nanofiber layer has poor transparency, which makes the nanofiber layer easy to visually recognize, and quality is poor in terms of making the nanofiber layer hard to visually recognize.

Appearance of Nanofiber Layer Applied with Foundation:

0.71 mg/cm$^2$ of a powder foundation (product name "Sofina Primavista Powder Foundation (moist touch) Beige Ochre OS" from Kao Corporation) was applied onto the nanofiber layer attached to the skin in the aforementioned "Visual Recognizability of Nanofiber Layer." Then, the nanofiber layer was visually observed, to evaluate the appearance according to the following criteria. The evaluation results are shown in Table 1.

A: The nanofiber layer fitted seamlessly in the surrounding skin, and had a natural finish.

B: The peripheral edge of the nanofiber layer stood out and did not fit in the surrounding skin, and had an unnatural finish.

Evaluation was made according to the following method, regarding the nanofiber layer's concealability of spots and wrinkles on the skin in a state where the nanofiber layer was attached to the skin, and the nanofiber layer's concealability of spots and wrinkles on the skin when a foundation was applied onto the nanofiber layer.

Concealability of Spots and Wrinkles:

As in the method of the aforementioned "Appearance of Nanofiber Layer Applied with Foundation," each nanofiber layer was attached to a section on the skin having spots and wrinkles, and a foundation was applied thereon. Then, the spots and wrinkles in that section were visually observed, to evaluate concealability according to the following criteria.

3: Spots and wrinkles on the skin are concealed to an extent that they are invisible.

2: Spots and wrinkles on the skin are slightly visible, but are hard to visually recognize.

1: Spots and wrinkles on the skin are easy to visually recognize.

The evaluation regarding the aforementioned "Concealability of Spots and Wrinkles" was performed using the nanofiber layer of Example 4 and a nanofiber layer of Example 10. The nanofiber layer of Example 10 was manufactured according to the same method as in Example 4, except that the thickness D3 of the maximum thickness portion of the gradation region was set to 50 μm. The evaluation results are shown in Table 2 below.

TABLE 2

| Example | Concealability of spots and wrinkles |
|---------|--------------------------------------|
| 4       | 2                                    |
| 10      | 3                                    |

Nanofiber layers according to the present invention are improved in concealability by applying a foundation

TABLE 1

|  |  | Thickness D1 of peripheral edge of nanofiber layer (μm) | Width W1 or gradation region (mm) | Thickness D3 of maximum thickness portion of gradation region (μm) | Inclination angle θ of gradation region | Percentage of curves occupying entire length of planar-view contour outline (%) | Visual recognizability of nanofiber layer | Appearance of nanofiber layer applied with foundation |
|---|---|---|---|---|---|---|---|---|
| Example | 1 | 0.1 | 3 mm or greater | 3 | 0.002 | 100 | A | A |
|  | 2 | 8 | 3 mm or greater | 15 | 0.134 | 100 | A | A |
|  | 3 | 9 | 3 mm or greater | 15 | 0.115 | 100 | A | A |
|  | 4 | 10 | 3 mm or greater | 15 | 0.095 | 100 | A | A |
|  | 5 | 0.1 | 3 mm or greater | 500 | 9.460 | 100 | B | A |
|  | 6 | 0.4 | 4 mm or greater | 15 | 0.209 | 100 | A | A |
|  | 7 | 0.6 | 4 mm or greater | 15 | 0.206 | 100 | A | A |
|  | 8 | 1 | 4 mm or greater | 5.5 | 0.064 | 100 | A | A |
|  | 9 | 0.1 | 4 mm or greater | 15 | 0.213 | 100 | A | A |
| Comparative Example | 1 | 12 | 3 mm or greater | 15 | 0.057 | 100 | C | B |
|  | 2 | 15 | 3 mm or greater | 20 | 0.095 | 100 | C | B |

Table 1 shows that the nanofiber layers according to the Examples are hard to visually recognize in a state attached to the skin, and offer a natural finish by seamlessly fitting in the skin, even when a foundation is applied thereto. In contrast, the nanofiber layers according to the Comparative Examples stand out when attached to the skin and are visually recognizable. Further, the nanofiber layers according to the Comparative Examples exhibit a color (shade) that is different from the surrounding skin when a foundation is applied thereto, and thus do not fit in the skin and result in an unnatural finish.

thereon. For example. Examples 4 and 10 were able to effectively conceal spots and wrinkles. Further, by increasing the thickness of the maximum thickness portion of the gradation region, it was possible to conceal spots and wrinkles to an extent that they were invisible.

Reference Example

Figure 22:
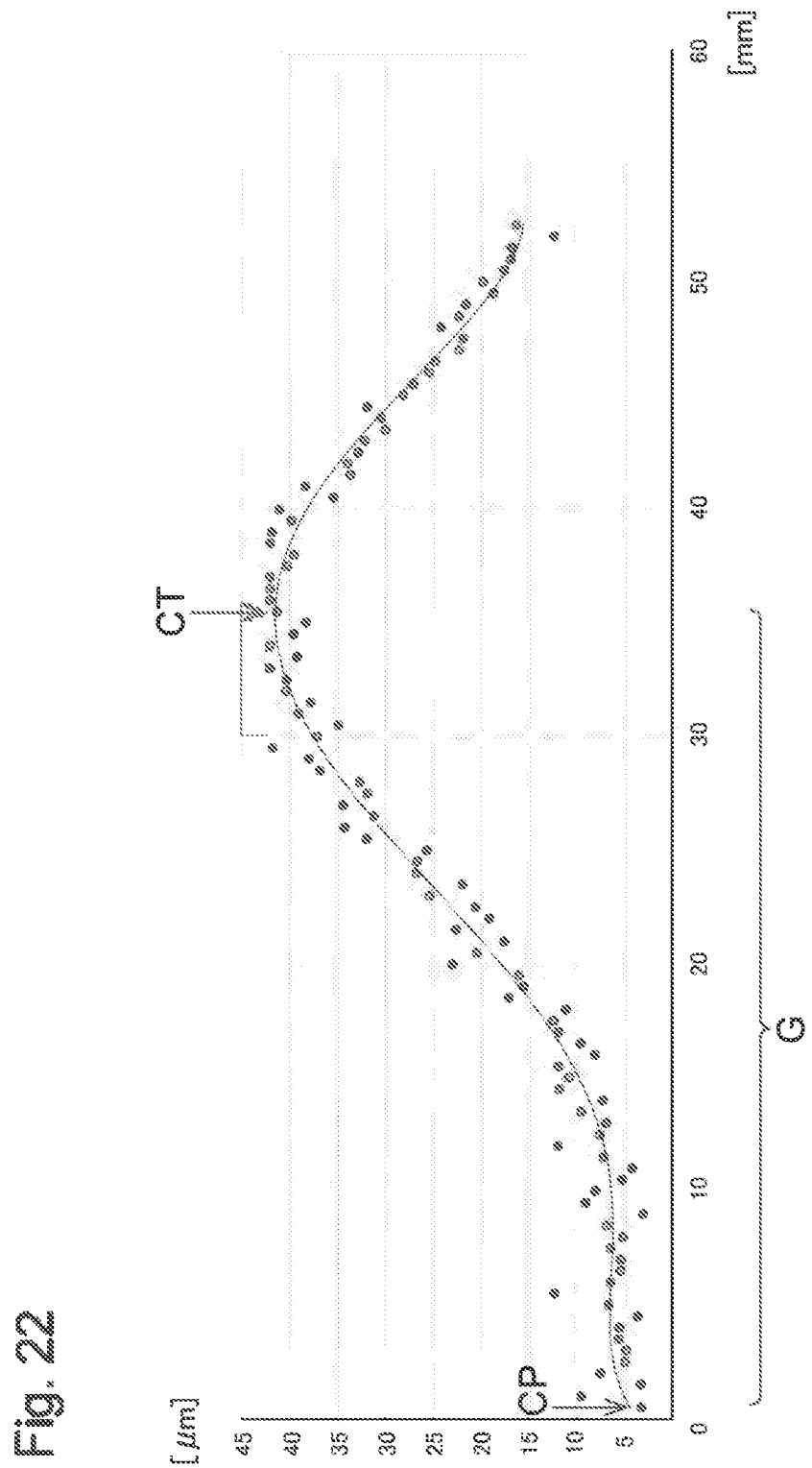
FIG. 22 is a graph illustrating a sectional contour curve of a nanofiber layer according to a reference example.

According to the same procedure as in Example 1, a nanofiber layer was manufactured, wherein the thickness at the apex position was 41 μm. The nanofiber layer had the same planar-view contour as illustrated in FIG. 1. Three-dimensional shape data of the manufactured nanofiber layer was acquired according to the aforementioned method, and based thereon, a graph illustrating the sectional contour curve was created. FIG. 22 illustrates the sectional contour curve from the obtained graph, found along a cross section corresponding to the position of line II-II in FIG. 1. Along with the sectional contour curve, FIG. 22 also shows the peripheral edge CP of the nanofiber layer, the gradation region G, and the apex position CT. In the sectional contour curve illustrated in FIG. 22, the thickness D1 of the peripheral edge is 4.5 µm, and the thickness of the gradation region increases from the peripheral edge CP to the apex position in the shape of a sigmoid curve.

INDUSTRIAL APPLICABILITY

According to the present invention, it is possible to provide a nanofiber sheet including a nanofiber layer that is hard to visually recognize in a state attached to the skin, and a method for using the nanofiber sheet. Further, according to the present invention, it is possible to manufacture a nanofiber sheet including a nanofiber layer that is hard to visually recognize in a state attached to the skin.

The invention claimed is:
1. A nanofiber sheet comprising:
a substrate layer; and
a nanofiber layer located on one surface side of the substrate layer and containing nanofibers of a polymer compound, wherein:
a peripheral edge of the nanofiber layer has a thickness of from 0.1 to 10 µm;
the nanofiber layer includes at least 3 mm of a gradation region having a thickness that gradually increases inward from the peripheral edge;
the nanofiber layer is located adjacent to the substrate layer; and
the substrate layer has, on a surface facing the nanofiber layer, a plurality of depressions or projections each having a width greater than a fiber diameter of the nanofiber.
2. The nanofiber sheet according to claim 1, wherein the substrate layer includes a region that extends outward from the peripheral edge of the nanofiber layer.
3. The nanofiber sheet according to claim 1, wherein the nanofiber layer and the substrate layer are layered in a peelable manner.
4. The nanofiber sheet according to claim 1, wherein a difference in thickness between an inner end of the gradation region and the peripheral edge is 5 µm or greater.
5. The nanofiber sheet according to claim 1, wherein a planar-view shape of the nanofiber layer is
a shape including, in its contour, a plurality of curvilinear sections having different curvatures,
a shape including, in its contour, a plurality of rectilinear sections, or
a shape including, in its contour, both the curvilinear sections and the rectilinear sections.
6. The nanofiber sheet according to claim 1, wherein:
the substrate layer has air permeability.
7. The nanofiber sheet according to claim 1, wherein the nanofiber layer is water-insoluble.
8. The nanofiber sheet according to claim 1, wherein:
the nanofiber sheet comprises an adhesive layer adherable to a surface of an object; and
the adhesive layer is located on a surface of the nanofiber layer on an opposite side from the substrate layer.

9. A method for attaching a nanofiber sheet according to claim 1 to a surface of an object, wherein
said method comprises attaching the nanofiber sheet by placing the nanofiber layer in contact with a surface of an object.
10. The method for attaching the nanofiber sheet according to claim 9, comprising attaching the nanofiber layer in a moistened state.
11. The method for attaching the nanofiber sheet according to claim 9, wherein said nanofiber layer remains attached to said surface of said object after peeling the substrate layer.
12. The method for attaching the nanofiber sheet according to claim 9, comprising peeling the substrate layer and attaching the nanofiber layer to the surface of a skin.
13. A method for manufacturing a nanofiber sheet according to claim 1, comprising
ejecting a material liquid from a nozzle while applying a high voltage between the nozzle and a counter electrode, and depositing, onto a collecting unit, nanofibers produced from the material liquid by electrospinning, wherein
a predetermined nanofiber sheet including a gradation region having a thickness that gradually increases inward from a peripheral edge is manufactured by depositing the nanofibers onto the collecting unit by moving at least either the nozzle or the collecting unit.
14. The method for manufacturing a nanofiber sheet according to claim 13, comprising:
a path calculation step of determining a movement path for at least either the nozzle or the collecting unit along which the predetermined nanofiber sheet can be formed, the determining being based on a correlation between a factor relating to deposition distribution of the nanofibers and a deposition thickness of the nanofibers; and
a deposition step of depositing the nanofibers, while moving at least either the nozzle or the collecting unit, in accordance with the movement path determined in the path calculation step.
15. The method for manufacturing a nanofiber sheet according to claim 14, wherein the factor relating to deposition distribution of the nanofibers is one factor, or a combination of two or more factors, selected from the group consisting of a movement speed of the nozzle or the collecting unit, an ejection speed of the material liquid, a potential difference between the nozzle and the counter electrode, a distance between the nozzle and the collecting unit, an inner diameter of the nozzle, and a material of the nozzle.
16. The method for manufacturing a nanofiber sheet according to claim 14, wherein:
in a planar view, the predetermined nanofiber sheet includes an inner region surrounded by the gradation region; and
in the path calculation step, the movement path is calculated such that a minimum thickness of the inner region is equal to or greater than a predetermined setting value.

17. The method for manufacturing a nanofiber sheet according to claim 14, wherein the movement path along which either one of the nozzle or the collecting unit moves is a combination of a path group that includes, in a nested manner, a plurality of paths substantially similar to one another, and a crossover line that connects the plurality of paths, or a linear shape that can be rendered in one stroke.

* * * * *